US010158855B2

United States Patent
Terada et al.

(10) Patent No.: US 10,158,855 B2
(45) Date of Patent: Dec. 18, 2018

(54) IMAGE DECODING METHOD, AND IMAGE DECODING APPARATUS USING A SELECTED CONTEXT RELATED TO NEIGHBORING COEFFICIENTS

(71) Applicant: Panasonic Intellectual Property Corporation of America, Torrance, CA (US)

(72) Inventors: Kengo Terada, Osaka (JP); Takahiro Nishi, Nara (JP); Youji Shibahara, Osaka (JP); Kyoko Tanikawa, Osaka (JP); Hisao Sasai, Osaka (JP); Toshiyasu Sugio, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 320 days.

(21) Appl. No.: 13/788,162

(22) Filed: Mar. 7, 2013

(65) Prior Publication Data
US 2013/0259124 A1    Oct. 3, 2013

Related U.S. Application Data

(60) Provisional application No. 61/608,149, filed on Mar. 8, 2012.

(51) Int. Cl.
*H04N 19/13* (2014.01)
*H04N 19/18* (2014.01)
*H04N 19/91* (2014.01)

(52) U.S. Cl.
CPC ............. *H04N 19/13* (2014.11); *H04N 19/18* (2014.11); *H04N 19/91* (2014.11)

(58) Field of Classification Search
CPC .................. H04N 19/00781; H04N 19/91
See application file for complete search history.

(56) References Cited

U.S. PATENT DOCUMENTS

| | | | | |
|---|---|---|---|---|
| 2004/0131272 | A1* | 7/2004 | Kobayashi | H04N 19/197 382/247 |
| 2005/0123207 | A1* | 6/2005 | Marpe | H04N 19/196 382/239 |
| 2009/0096643 | A1* | 4/2009 | Chang | H03M 7/4006 341/51 |
| 2009/0273491 | A1* | 11/2009 | Sakaguchi | H03M 7/4006 341/51 |
| 2012/0082233 | A1* | 4/2012 | Sze | H04N 19/13 375/240.18 |

(Continued)

FOREIGN PATENT DOCUMENTS

WO    2013/109914    7/2013

OTHER PUBLICATIONS

U.S. Appl. No. 61/606,300.*

(Continued)

*Primary Examiner* — Mohammed Jebari
(74) *Attorney, Agent, or Firm* — Wenderoth, Lind & Ponack, L.L.P.

(57) ABSTRACT

With an image coding method, when performing arithmetic coding on parameters corresponding to a current coefficient to be coded, a related parameter which is a parameter related to a value to be referred to for selecting a context is arithmetically coded per coefficient among the parameters corresponding to the coefficient, and unrelated parameters which are parameters unrelated to a value to be referred to for selecting the context are collectively arithmetically coded per coefficient subset among the parameters corresponding to the coefficients in the coefficient subset.

4 Claims, 48 Drawing Sheets

(56) References Cited

U.S. PATENT DOCUMENTS

| | | | | |
|---|---|---|---|---|
| 2013/0188698 A1* | 7/2013 | Chien | ............. | H04N 19/00781 375/240.12 |
| 2013/0188699 A1* | 7/2013 | Joshi | ............... | H04N 19/00569 375/240.12 |
| 2013/0188725 A1* | 7/2013 | Wang | .................. | H04N 19/176 375/240.18 |
| 2014/0140400 A1* | 5/2014 | George | ................. | H04N 19/52 375/240.12 |

OTHER PUBLICATIONS

Benjamin Bross et al., "WD5: Working Draft 5 of High-Efficiency Video Coding", Joint Collaborative Team on Video Coding (JCT-VC) OF ITU-T SG16 WP3 and ISO/IEC JTC1/SC29/WG11, JCTVC-G1103_d8, 7th Meeting: Geneva, CH, Nov. 21-30, 2011, http://phenix.it-sudparis.eu/jct/doc_end_user/documents/7_Geneva/wg11/JCTVC-G1103-v11.zip.

T. Nguyen et al., Non-CE11: Proposed Cleanup for Transform Coefficient Coding, Joint Collaborative Team on Video Coding (JCT-VC) OF ITU-T SG16 WP3 and ISO/IEC JTC1/SC29/WG11 8th Meeting: San Jose, CA, USA, Feb. 1-10, 2012, JCTVC-H0228, reference print date: Jan. 27, 2012.

Xiang Yu , et al., Multiple Sign Bits Hiding, Joint Collaborative Team on Video Coding (JCT-VC) OF ITU-T SG16 WP3 and ISO/IEC JTC1/SC29/WG11 8th Meeting: San Jose, CA, USA, Feb. 1-10, 2012, JCTVC-H0481, reference print date: Jan. 30, 2012.

* cited by examiner

FIG. 28

|  | Parameter value | | | |
|---|---|---|---|---|
| significant_flag | 0 | 1 | 1 | 1 |
| greater1_flag | - | 0 | 1 | 1 |
| geater2_flag | - | - | 0 | 1 |
| 3 clip value of coefficient absolute value | 0 | 1 | 2 | 3 |

FIG. 38
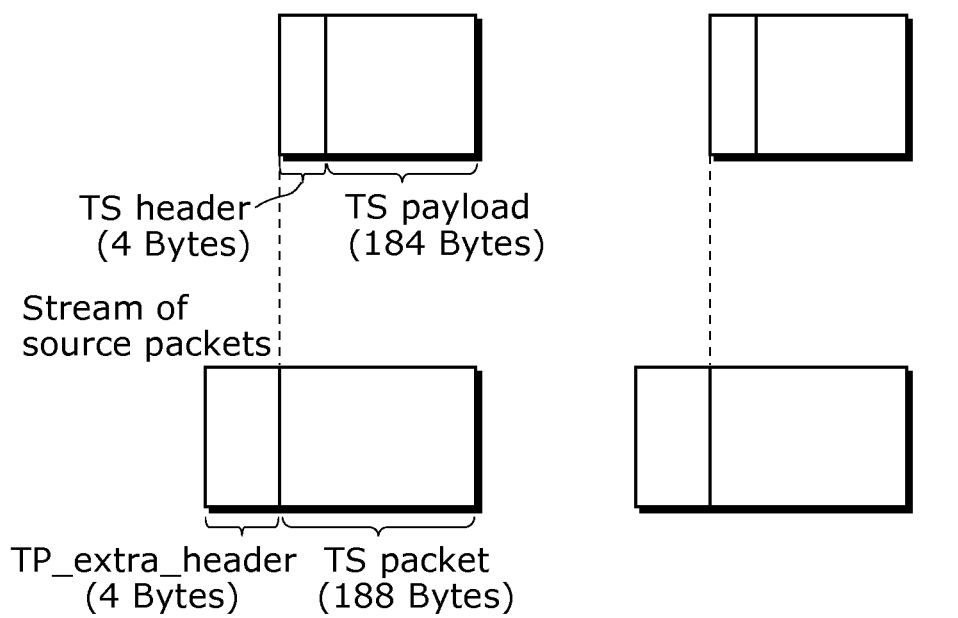
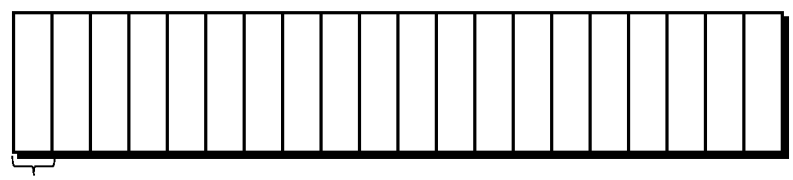

FIG. 46

| Corresponding standard | Driving frequency |
|---|---|
| MPEG-4 AVC | 500 MHz |
| MPEG-2 | 350 MHz |
| ⋮ | ⋮ |

IMAGE DECODING METHOD, AND IMAGE DECODING APPARATUS USING A SELECTED CONTEXT RELATED TO NEIGHBORING COEFFICIENTS

CROSS REFERENCE TO RELATED APPLICATION

The present application claims the benefit of U.S. Provisional Patent Application No. 61/608,149 filed on Mar. 8, 2012. The entire disclosure of the above-identified application, including the specification, drawings and claims is incorporated herein by reference in its entirety.

FIELD

The present disclosure relates to an apparatus and a method for coding or decoding video, and in particular, coding and decoding of a coefficient parameter.

BACKGROUND

In recent years, the significant technological advancement in digital video devices has given more opportunities to record on a recording medium such as a DVD and a hard disk or to distribute on the Internet video signals (a plurality of video pictures aligned in time series), by compressing and coding the video signals. There is H.264/AVC (MPEG-4 AVC) as an image coding standard, and HEVC (High Efficiency Video Coding) standard is under consideration as a next-generation standard (see Non Patent Literature (NPL 1)).

CITATION LIST

Non Patent Literature

[NPL 1]
Joint Collaborative Team on Video Coding (JCT-VC) of ITU-T SG16 WP3 and ISO/IEC JTC1/SC29/WG11, 7th Meeting: Geneva, CH, 21-30 Nov. 2011 JCTVC-G1103_d8, Title: WD5: Working Draft 5 of High-Efficiency Video Coding

SUMMARY

Technical Problem

However, with the image coding method and the image decoding method disclosed by the above-described NPL 1, there is a problem that a coding efficiency is poor.

In view of the above, one non-limiting and exemplary embodiment provides an image coding method, an image decoding method, and the like with improved coding efficiency.

Solution to Problem

An image coding method according to an aspect of the present disclosure is an image coding method comprising: dividing the current image into a plurality of coding blocks; generating a prediction image; generating a differential image from the prediction image and a corresponding one of the coding blocks; generating a plurality of coefficients by performing frequency transformation on the differential image; dividing a set including the coefficients into a plurality of coefficient subsets; replacing each of the coefficients in each of the coefficient subsets with a plurality of parameters; selecting a context to be used in arithmetic coding, by referring to a value related to a coefficient neighboring a current coefficient to be coded which is one of the coefficients included in the coefficient subset; and performing arithmetic coding on a parameter corresponding to the current coefficient, using a symbol occurrence probability that is determined according to the selected context, wherein in the performing of arithmetic coding, the arithmetic coding is performed, for each of the coefficients, on a related parameter among a plurality of parameters corresponding to the coefficient, the related parameter being a parameter related to a value which is referred to for selecting the context, and the arithmetic coding is performed, for each of the coefficient subsets, collectively on a plurality of unrelated parameters, among a plurality of parameters corresponding to the coefficients in the coefficient subset, the unrelated parameters being parameters not related to the value which is referred to for selecting the context.

These general and specific aspects may be implemented using a system, a method, an integrated circuit, a computer program, or a computer-readable recording medium such as a CD-ROM, or any combination of systems, methods, integrated circuits, computer programs, or computer-readable recording media. Additional benefits and advantages of the disclosed embodiments will be apparent from the Specification and Drawings.

The benefits and/or advantages may be individually obtained by the various embodiments and features of the Specification and Drawings, which need not all be provided in order to obtain one or more of such benefits and/or advantages.

Advantageous Effects

The image coding method, the image decoding method, and the like disclosed herein make it possible to improve the coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 28 is a diagram illustrating a relationship between a parameter value and a value resulting from clipping a coefficient absolute value by 3 according to Embodiment 4.

FIG. 38 shows a structure of TS packets and source packets in the multiplexed data.

FIG. 46 shows an example of a look-up table in which video data standards are associated with driving frequencies.

Figure 1:
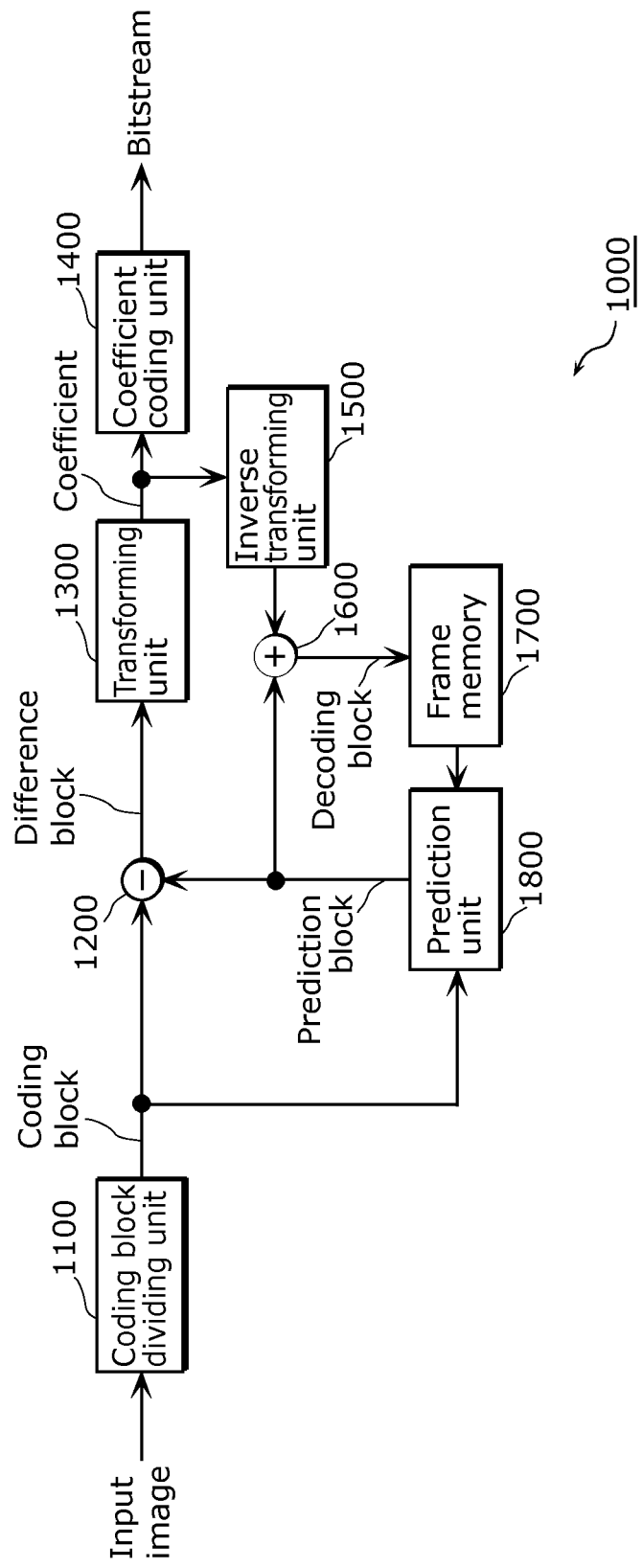
FIG. 1 is a diagram illustrating a configuration of a video coding apparatus according to Embodiment 1.

DESCRIPTION OF EMBODIMENT (Underlying Knowledge Forming Basis of the Present Disclosure)

An image coding method according to the current HEVC standard includes: a step of predicting a coded image; a step of calculating a difference between a prediction image and an image to be coded; a step of transforming a differential image into a frequency coefficient; and a step of performing arithmetic coding on the frequency coefficient. In the arithmetic coding, each of the coefficients (frequency coefficients) is coded in the order of frequency component of the current block to be coded from the highest frequency to the lowest frequency. At this time, a context is selected according to a coded coefficient neighboring a current coefficient to be coded, and the current coefficient is arithmetically coded using a symbol occurrence probability that is determined corresponding to the selected context. In a general image, a coefficient has a larger value as being closer to the low-frequency component. It is therefore possible to provide deviation to the symbol occurrence probability by determining a context referring to a coded neighboring coefficient (a higher-frequency coefficient than the current coefficient to be coded). For example, a large value of the coded neighboring coefficient (the higher-frequency coefficient than the current coefficient to be coded) indicates a high probability of also a large value of the current coefficient to be coded, and thus it is possible to reduce the generated amount of coded data by using a context for a large value. In addition, the coefficient is represented by multiple parameters, such as a flag indicating whether a coefficient absolute value is 0 or greater than or equal to 1, a flag indicating a coefficient absolute value, a flag indicating whether the coefficient is positive or negative, and so on.

However, since a context is determined by referring to not a coefficient value of a neighboring coefficient but a value of a parameter according to conventional methods, providing deviation to the symbol occurrence probability is not achieved when compared to the method of referring to the coefficient value, and thus there is a problem that a coding efficiency is poor.

In order to solve such a problem, an image coding method according to an aspect of the present disclosure is an image coding method for coding a current image, the image coding method comprising: dividing the current image into a plurality of coding blocks; generating a prediction image; generating a differential image from the prediction image and a corresponding one of the coding blocks; generating a plurality of coefficients by performing frequency transformation on the differential image; dividing a set including the coefficients into a plurality of coefficient subsets; replacing each of the coefficients in each of the coefficient subsets with a plurality of parameters; selecting a context to be used in arithmetic coding, by referring to a value related to a coefficient neighboring a current coefficient to be coded which is one of the coefficients included in the coefficient subset; and performing arithmetic coding on a parameter corresponding to the current coefficient, using a symbol occurrence probability that is determined according to the selected context, wherein in the performing of arithmetic coding, the arithmetic coding is performed, for each of the coefficients, on a related parameter among a plurality of parameters corresponding to the coefficient, the related parameter being a parameter related to a value which is referred to for selecting the context, and the arithmetic coding is performed, for each of the coefficient subsets, collectively on a plurality of unrelated parameters, among a plurality of parameters corresponding to the coefficients in the coefficient subset, the unrelated parameters being parameters not related to the value which is referred to for selecting the context.

With this, since a context is selected by referring to a value related to a coefficient, such as an absolute value of a coefficient or a 3 clip value, it is possible to provide deviation to the symbol occurrence probability, thereby allowing improvement of the coding efficiency. In addition, since a plurality of unrelated parameters which are parameters not related to a value which is referred to for selecting a context are collectively arithmetically coded for each of the coefficient subsets, it is possible to speed up the processing speed in coding. It is therefore possible to accomplish both improvement of the coding efficiency and speeding up of the processing speed.

In addition, in the selecting, the context may be selected by referring to an absolute value of the coefficient neighboring the current coefficient, and in the performing of arithmetic coding, the arithmetic coding may be performed on the related parameters which are related to the absolute value of the coefficient, and the arithmetic coding may be performed collectively on the unrelated parameters indicating whether each of the coefficients is positive or negative.

With this, it is possible to properly accomplish both improvement of the coding efficiency and speeding up of the processing speed.

In addition, in the performing of arithmetic coding, the related parameters may be coded through arithmetic coding in which the selected context is used, and the unrelated parameters are collectively coded through bypass coding that is arithmetic coding in which a context is not used, and in the selecting, the context may be selected by referring to a value identified by at least one parameter other than all of the unrelated parameters coded through the bypass coding among the parameters corresponding to the coefficient neighboring the current coefficient.

Since a plurality of unrelated parameters are collectively arithmetically coded through the bypass coding which is arithmetic coding in which a context is not used, it is possible to further speed up the processing speed.

In addition, in the performing of arithmetic coding, among the parameters corresponding to the current coefficient, a first parameter and a second parameter may be coded as the unrelated parameters through the bypass coding, the first parameter indicating whether the current coefficient is positive or negative, the second parameter being capable of indicating three or more types of values concerning an absolute value of the current coefficient, and among the parameters, a parameter capable of indicating only two types of values concerning the absolute value of the current coefficient may be arithmetically coded as the related parameters, using the selected context.

With this, it is possible to properly accomplish both improvement of the coding efficiency and speeding up of the processing speed.

In addition, in the performing of arithmetic coding: a value of the coefficient in the coefficient subset may be changed to make a sum of coefficient absolute values of all of the coefficients in the coefficient subset become an even number or an odd number, depending on whether a predetermined coefficient in the coefficient subset indicates positive or negative, and the unrelated parameters other than an unrelated parameter indicating whether the predetermined coefficient is positive or negative may be collectively arithmetically coded.

With this, since arithmetic coding is not performed on an unrelated parameter which indicates whether a predetermined coefficient is positive or negative, it is possible to further improve the coding efficiency.

In addition, an image decoding method according to an aspect of the present disclosure is an image decoding method for decoding a bitstream generated by coding an image, the bitstream including a plurality of coefficient subsets each of which includes a plurality of frequency coefficients as coefficients each of which is replaced with a plurality of parameters and coded, the image decoding method comprising: selecting a context to be used in arithmetic coding, by referring to a value related to a coefficient neighboring a current coefficient to be decoded which is one of the coefficients included in each of the coefficient subsets; performing arithmetic decoding on a parameter corresponding to the current coefficient, using a symbol occurrence probability that is determined according to the selected context; reconstructing the current coefficient as a coefficient value, using the parameter that is arithmetically decoded; generating a decoding block by combining the coefficient subsets each including the coefficients which are reconstructed; generating a differential image by performing inverse frequency transformation on the decoding block; generating a prediction image; and generating a decoded image from the differential image and the prediction image, wherein in the performing of arithmetic decoding, the arithmetic decoding is performed, for each of the coefficients, on a related parameter among a plurality of parameters corresponding to the coefficient, the related parameter being a parameter related to a value which is referred to for selecting the context, and the arithmetic decoding is performed, for each of the coefficient subsets, collectively on a plurality of unrelated parameters, among a plurality of parameters corresponding to the coefficients in the coefficient subset, the unrelated parameters being parameters not related to the value which is referred to for selecting the context.

With this, since a context is selected by referring to a value related to a coefficient, such as an absolute value of a coefficient or a 3 clip value, it is possible to provide deviation to the symbol occurrence probability, thereby allowing properly decoding a bitstream with improved coding efficiency. In addition, since a plurality of unrelated parameters which are parameters not related to a value which is referred to for selecting a context are collectively arithmetically decoded for each of the coefficient subsets, it is possible to speed up the processing speed in decoding. It is therefore possible to accomplish both enhancing the coding efficiency and speeding up the processing speed.

These general and specific aspects may be implemented using a system, a method, an integrated circuit, a computer program, or a computer-readable recording medium such as a CD-ROM, or any combination of systems, methods, integrated circuits, computer programs, or computer-readable recording media. Hereinafter, embodiments of a video coding apparatus (image coding apparatus) which codes an image using an image coding method according to an aspect of the present disclosure and a video decoding apparatus (image decoding apparatus) which decodes an image using an image decoding method according to an aspect of the present disclosure are specifically described with reference to the Drawings.

Each of the embodiments described below shows a general or specific example.

The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Embodiment 1

[Overall Configuration]

FIG. 1 illustrates a configuration of a video coding apparatus according to Embodiment 1.

A video coding apparatus 1000 includes: a coding block dividing unit 1100: a subtracting unit 1200; a transforming unit 1300; a coefficient coding unit 1400; an inverse transforming unit 1500; an adder 1600; a frame memory 1700; and a prediction unit 1800.

[Operation (Entirety)]

Figure 2:
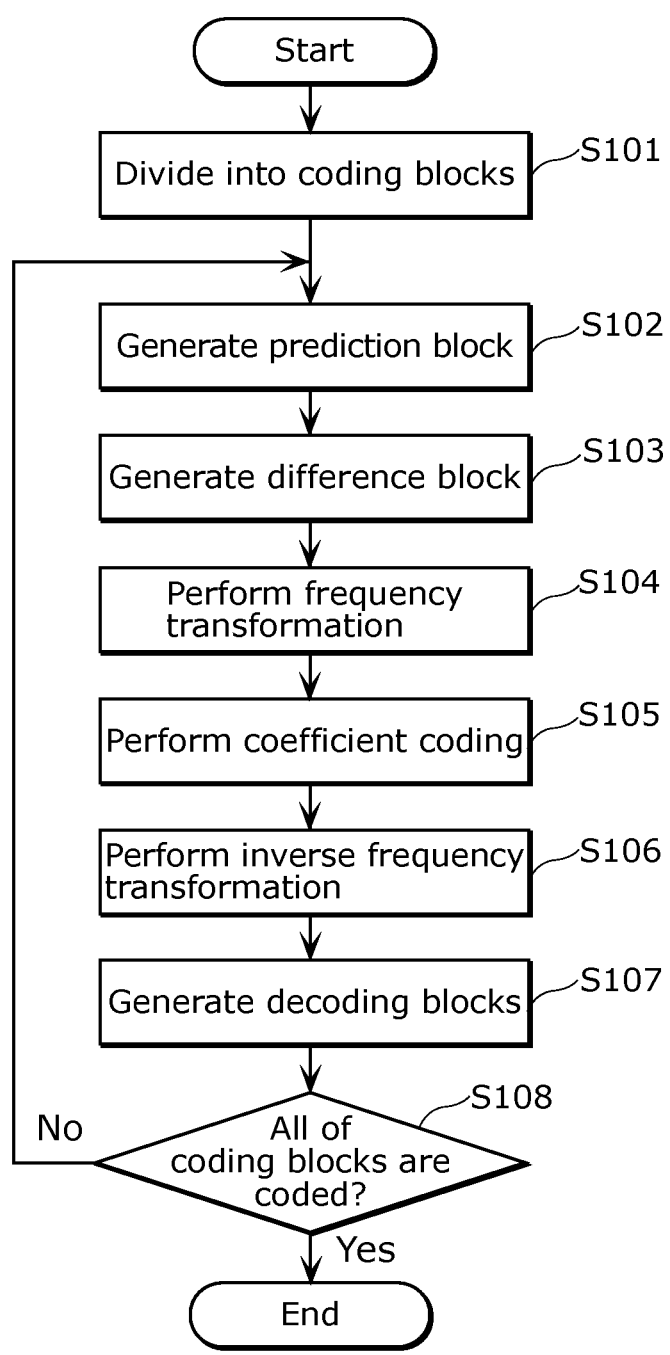
FIG. 2 is a flowchart illustrating entire coding processing according to Embodiment 1.

Next, the entire flow of coding will be described with reference to FIG. 2.

(Step S101)

The coding block dividing unit 1100 divides an input image into coding blocks and sequentially outputs the coding blocks to the subtracting unit 1200 and the prediction unit 1800. At this time, each of the coding blocks has a variable size and is divided using a feature of the image. The types of the coding block according to Embodiment 1 include four types of 4×4 pixels, 8×8 pixels, 16×16 pixels, and 32×32 pixels. Hereinafter these types are called 4×4, 8×8, 16×16, and 32×32.

(Step S102)

The prediction unit 1800 generates a prediction block from each of the coding blocks and a decoded image stored in the frame memory 1700.

(Step S103)

The subtracting unit 1200 generates a difference block from the input image and a corresponding one of the prediction blocks.

(Step S104)

The transforming unit 1300 transforms the difference block into a frequency coefficient.

(Step S105)

The coefficient coding unit 1400 codes the frequency coefficient and outputs a bitstream.

(Step S106)

The inverse transforming unit 1500 transforms each of the frequency coefficients into pixel data and reconstructs the difference block.

(Step S107)

The adder 1600 adds the reconstructed difference block and the prediction block to generate a decoding block and stores the decoding block in the frame memory 1700.

(Step S108)

The video coding apparatus 1000 repeats the processes from Step S102 to Step S107 until all of the coding blocks in the current image to be coded are coded.

The following describes in detail the coefficient coding unit 1400 that is a characteristic component.

[Configuration of the Coefficient Coding Unit]

Figure 3:
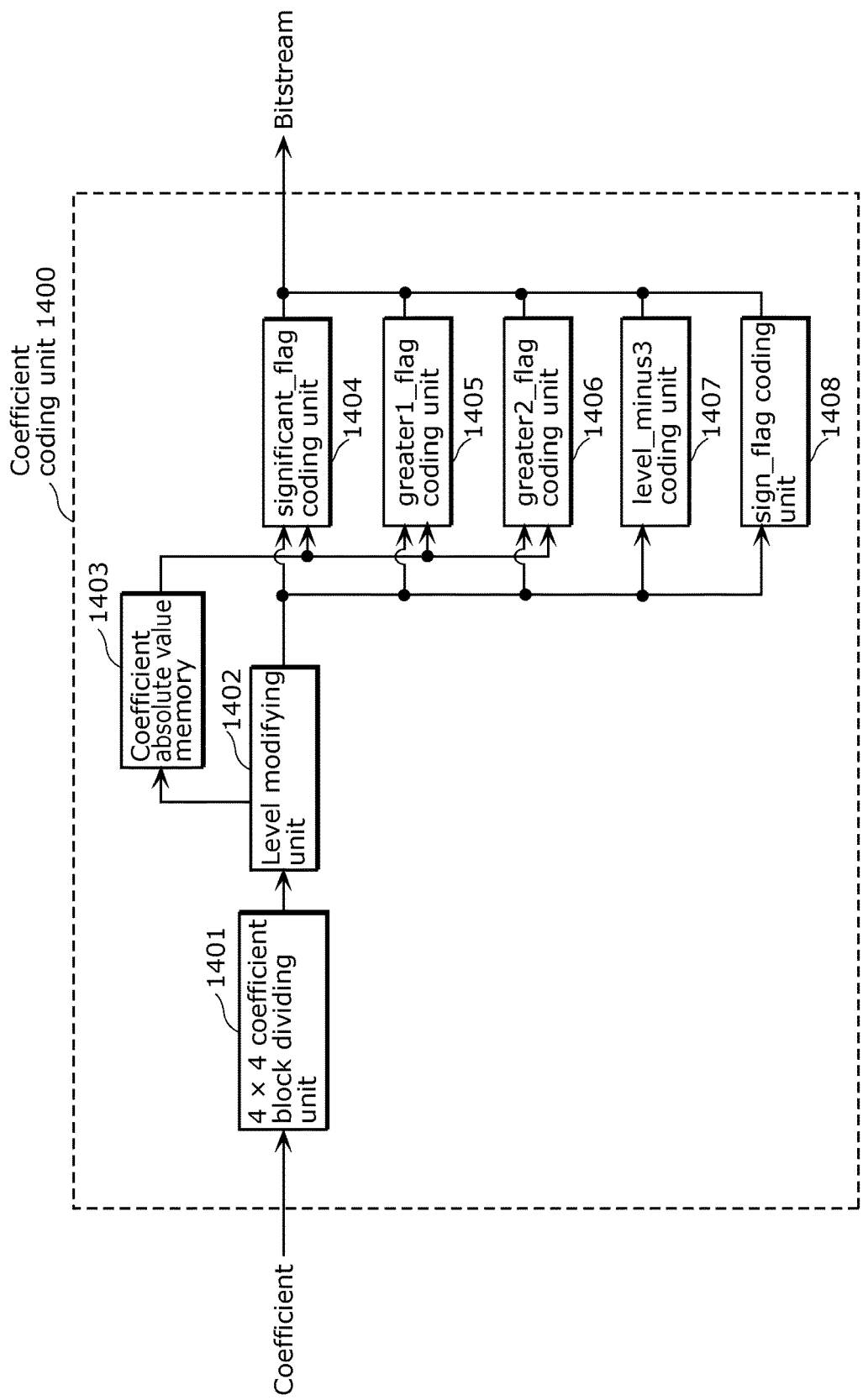
FIG. 3 is a diagram illustrating an internal configuration of a coefficient coding unit according to Embodiment 1.

FIG. 3 illustrates the internal configuration of the coefficient coding unit 1400.

The coefficient coding unit 1400 includes: a 4×4 coefficient block dividing unit 1401; a level modifying unit 1402; a coefficient absolute value memory 1403; a significant_flag coding unit 1404; a greater1_flag coding unit 1405; a greater2_flag coding unit 1406; a level_minus3 coding unit 1407; and a sign_flag coding unit 1408.

In Embodiment 1, a coefficient is coded using five parameters of significant_flag, greater1_flag, greater2_flag, level_minus3, and sign_flag. The significant_flag is a flag indicating whether or not a coefficient is 0, and indicates that the coefficient is 0 when the value of the flag indicates 0 and that the coefficient is other than 0 when the value of the flag indicates 1. The greater1_flag is a flag that is present only in a coefficient having the significant_flag indicating 1 (a coefficient other than 0), and indicates whether or not the coefficient absolute value is greater than or equal to 2. The greater1_flag indicates that the coefficient absolute value is 1 when the value of the flag indicates 0 and that the coefficient absolute value is greater than or equal to 2 when the value of the flag indicates 1. The greater2_flag is a flag that is present only in a coefficient having the greater1_flag indicating 1 (a coefficient whose absolute value is greater than or equal to 2), and indicates whether or not the coefficient absolute value is greater than or equal to 3. The greater2_flag indicates that the coefficient absolute value is 2 when the value of the flag indicates 0 and that the coefficient absolute value is greater than or equal to 3 when the value of the flag indicates 1. The level_minus3 is present only in a coefficient having the greater2_flag indicating 1 (a coefficient whose absolute value is greater than or equal to 3), and is set to a value resulting from subtracting 3 from the coefficient absolute value. The sign_flag is a flag that is present only in a coefficient having the significant_flag indicating 1 (a coefficient other than 0), and indicates whether or not the value of coefficient is negative. The sign_flag indicates that the value of a coefficient is positive when the value of the flag is 0 and that the value of a coefficient is positive negative when the value of the flag is 1.

[Operation (Coefficient Coding)]

Figure 4:
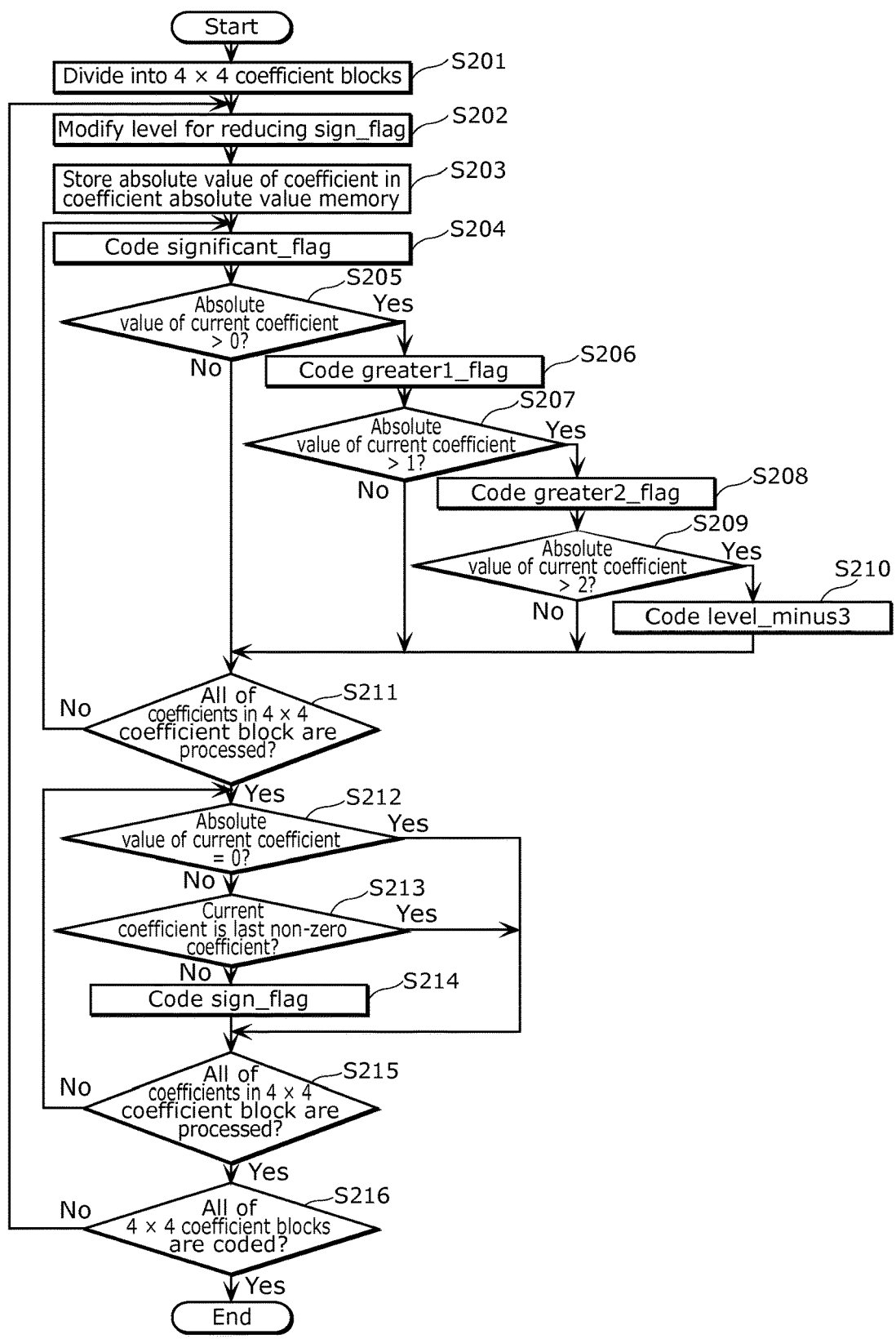
FIG. 4 is a flowchart illustrating coefficient coding according to Embodiment 1.

Next, a coefficient coding flow will be described with reference to FIG. 4.

(Step S201)

The 4×4 coefficient block dividing unit 1401 divides a coding block into 4×4 coefficient blocks. When the coding block is a 32×32 coding block, the coding block is vertically divided into eight and horizontally divided into eight. When the coding block is a 4×4 coding block, division is not carried out. It is to be noted that, in the subsequent steps from Step S202 to Step S216, processing is carried out for each of the 4×4 coefficient blocks.

(Step S202)

The level modifying unit 1402 modifies a level for reducing the sign_flag. The details will be described later.

(Step S203)

The level modifying unit 1402 stores an absolute value (level) of a coefficient in the coefficient absolute value memory 1403 so that the absolute value is used afterward for referring to a neighboring coefficient.

(Step S204)

The significant_flag coding unit 1404 performs setting and coding on the significant_flag. The details will be described later.

(Step S205)

The greater1_flag coding unit 1405 determines whether the absolute value of a current coefficient is larger than 0, and performs Step S206 when the absolute value is larger than 0. When the absolute value is 0, the coding of the current coefficient absolute value is completed, and Step S211 is performed.

(Step S206)

The greater1_flag coding unit 1405 performs setting and coding on the greater1_flag.

(Step S207)

The greater2_flag coding unit 1406 determines whether the absolute value of a current coefficient is larger than 1, and performs Step S208 when the absolute value is larger than 1. When the absolute value is not larger than 1, the coding of the current coefficient absolute value is completed, and Step S211 is performed.

(Step S208)

The greater2_flag coding unit 1406 performs setting and coding on the greater2_flag.

(Step S209)

The level_minus3 coding unit 1407 determines whether the absolute value of a current coefficient is larger than 2, and performs Step S210 when the absolute value is larger than 2. When the absolute value is not larger than 2, the coding of the current coefficient absolute value is completed, and Step S211 is performed.

(Step S210)

The level_minus3 coding unit 1407 performs setting and coding on the level_minus3.

(Step S211)

The coefficient coding unit 1400 repeats the processes from Step S204 to Step S210 until all of the coefficients in the 4×4 coefficient block are processed.

(Step S212)

The sign_flag coding unit 1408 determines whether or not the absolute value of a current coefficient is 0, performs Step S215 without coding the sign_flag when the absolute value is 0, and performs Step S213 when the absolute value is greater than or equal to 1.

(Step S213)

The sign_flag coding unit 1408 determines whether or not a current coefficient is a coefficient which is not the last 0 (non-zero coefficient) in the 4×4 coefficient block in order of scanning, performs Step S215 without coding the sign_flag when the current coefficient is the last non-zero coefficient, and performs Step S214 when the current coefficient is not the last non-zero coefficient.

(Step S214)

The sign_flag coding unit 1408 performs setting and coding on the significant_flag. The details will be described later.

(Step S215)

The sign_flag coding unit 1408 repeats the processes from Step S212 to Step S214 until all of the coefficients in the 4×4 coefficient block are processed.

(Step S216)

The coefficient coding unit 1400 repeats the processes from Step S202 to Step S215 until all of the 4×4 coefficient blocks in the coding block are coded.

Figure 11:
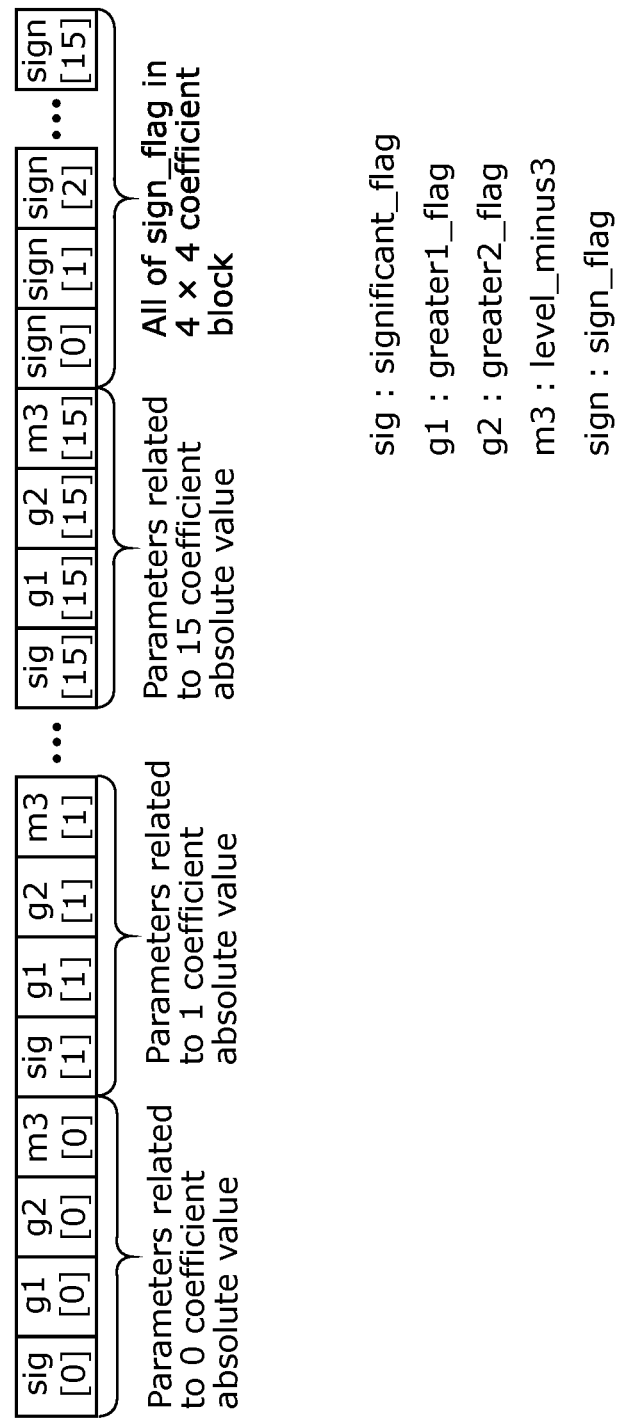
FIG. 11 is a diagram illustrating an example of a bitstream according to Embodiment 1.
Figure 12:
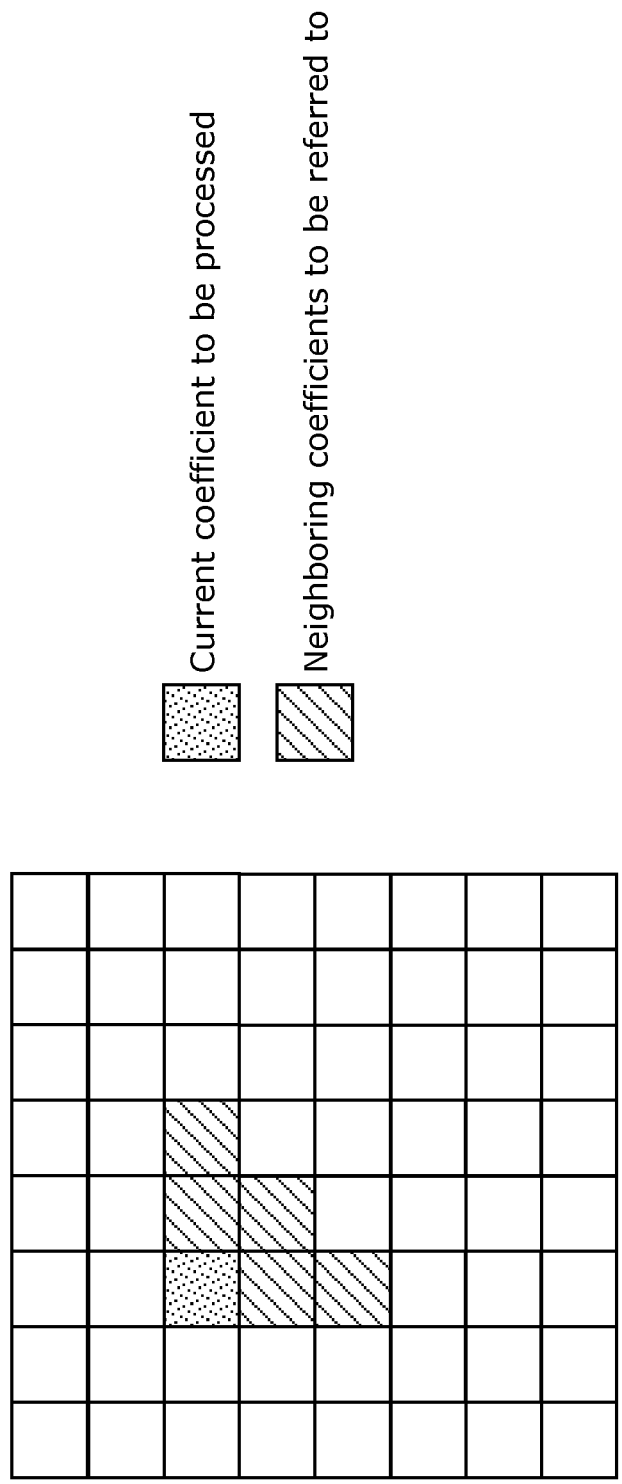
FIG. 12 is a diagram illustrating five neighboring coefficients according to Embodiment 1.

FIG. 11 illustrates an example of a bitstream. The parameter related to the coefficient absolute value (level) is coded per coefficient, however, the sign_flags of coding information are collectively coded in the 4×4 coefficient block. It is to be noted that there is the case where a parameter other than the significant_flag is not present depending on the values of other parameters, however, FIG. 11 illustrates the case where all of the parameters are present for simplifying the description.

The following describes in detail the level modifying unit 1402, the significant_flag coding unit 1404, and the sign_flag coding unit 1408.

[Configuration of the Level Modifying Unit]

Figure 5:
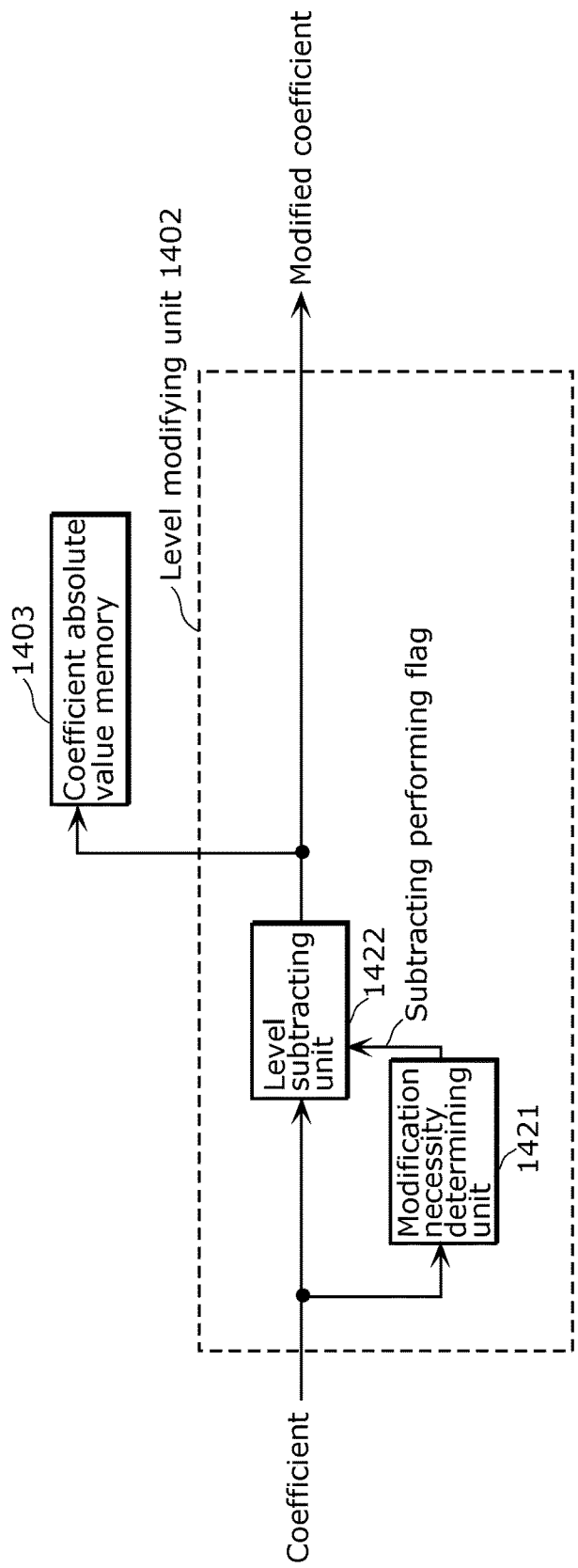
FIG. 5 is a diagram illustrating an internal configuration of a level modifying unit according to Embodiment 1.

FIG. 5 illustrates an internal configuration of the level modifying unit 1402.

The level modifying unit 1402 includes a level subtracting unit 1422 and a modification necessity determining unit 1421.

[Operation (Level Modification)]

Figure 6:
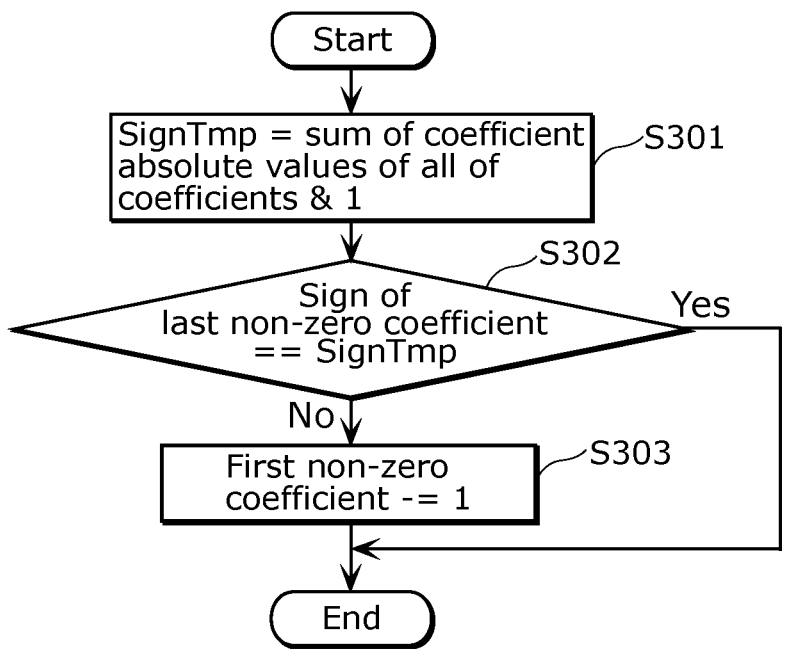
FIG. 6 is a flowchart illustrating level modification according to Embodiment 1.

The following describes a level modification flow with reference to FIG. 6.

(Step S301)

The modification necessity determining unit 1421 calculates the sum of the coefficient absolute values of all of the coefficients in the 4×4 coefficient block, and obtains the least significant bit to set as SignTmp to be used in the next step. As SignTmp, 0 is set when the sum of the coefficient absolute values is an even number, and 1 is set when the sum of the coefficient absolute values is an odd number.

(Step S302)

The modification necessity determining unit 1421 determines whether or not the coding information (information which is 0 in the case of positive and 1 in the case of negative) of a coefficient which is not the last 0 (non-zero coefficient) in order of scanning in the 4×4 coefficient block is the same as the SignTmp, ends the processing without causing the level subtracting unit 1422 to modify the level when it is determined as the same, and causes the level subtracting unit 1422 to execute the process of Step S303 when it is determined as different.

(Step S303)

The level subtracting unit 1422 subtracts 1 from the coefficient which is not the first 0 (non-zero coefficient) in order of scanning in the 4×4 coefficient block. This allows the even/odd number of the sum of the coefficient absolute values in the 4×4 coefficient block to be inverted, and thus it is possible to match the above-described least significant bit with the coding information of the last non-zero coefficient in order of scanning. The level subtracting unit 1422 stores a modified coefficient absolute value in the coefficient absolute value memory so that the modified coefficient absolute value is used afterward for referring to a neighboring coefficient.

[Configuration of Significant_Flag Coding Unit]

Figure 7:
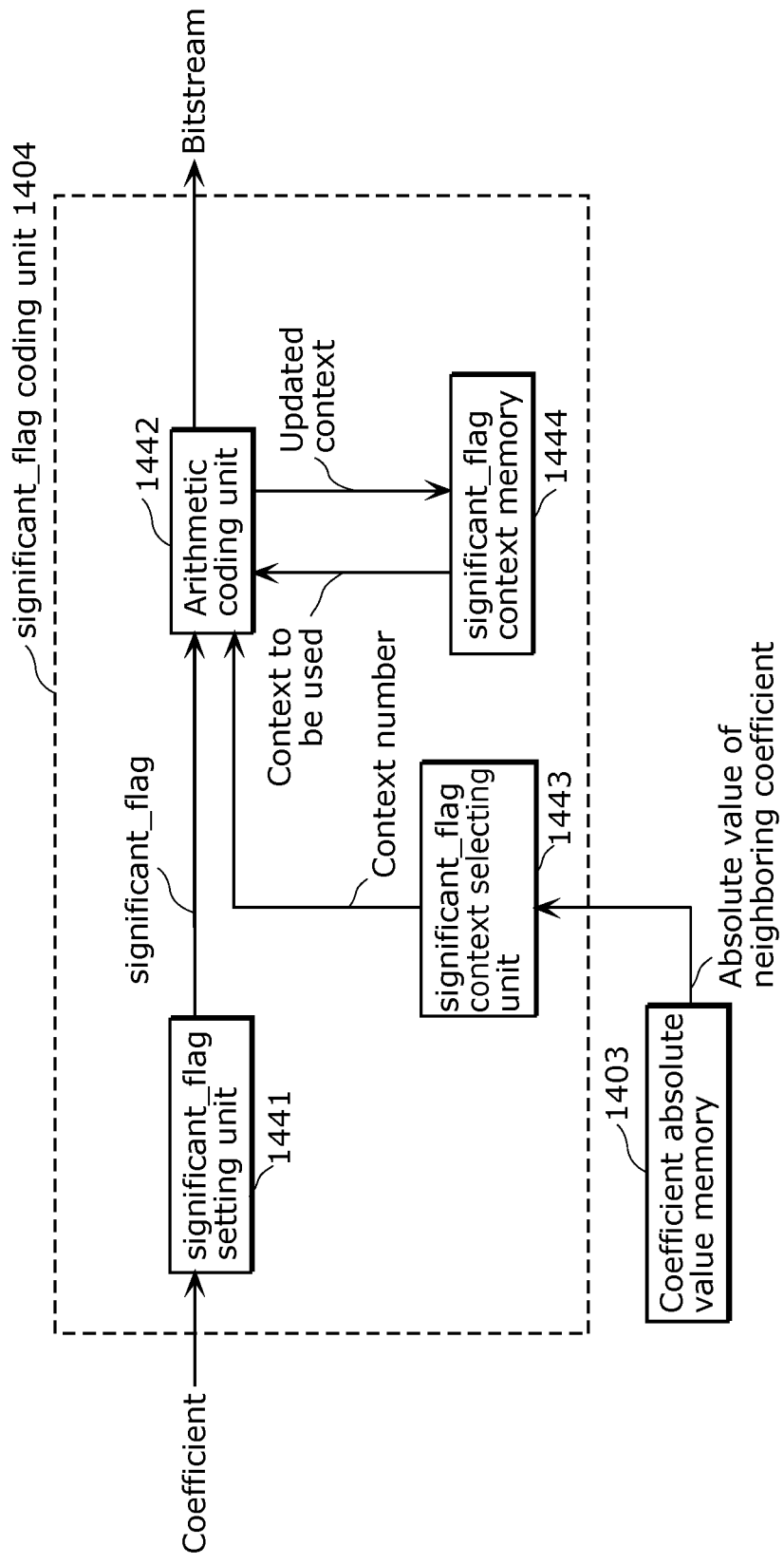
FIG. 7 is a diagram illustrating an internal configuration of a significant_flag coding unit according to Embodiment 1.

FIG. 7 illustrates an internal configuration of the significant_flag coding unit 1404. The significant_flag coding unit 1404 includes: a significant_flag setting unit 1441; an arithmetic coding unit 1442; a significant_flag context selecting unit 1443; and a significant_flag context memory 1444.

It is to be noted that since the coding of the greater1_flag and the coding of the greater2_flag are substantially the same as the coding of the significant_flag, explanation will be omitted. In addition, coding of the level_minus3 is performed through bypass coding in which a context is not used, however, other than that, the level_minus3 is substantially the same as other parameters, and thus explanation will be omitted.

[Operation (Significant_Flag Coding)]

Figure 8:
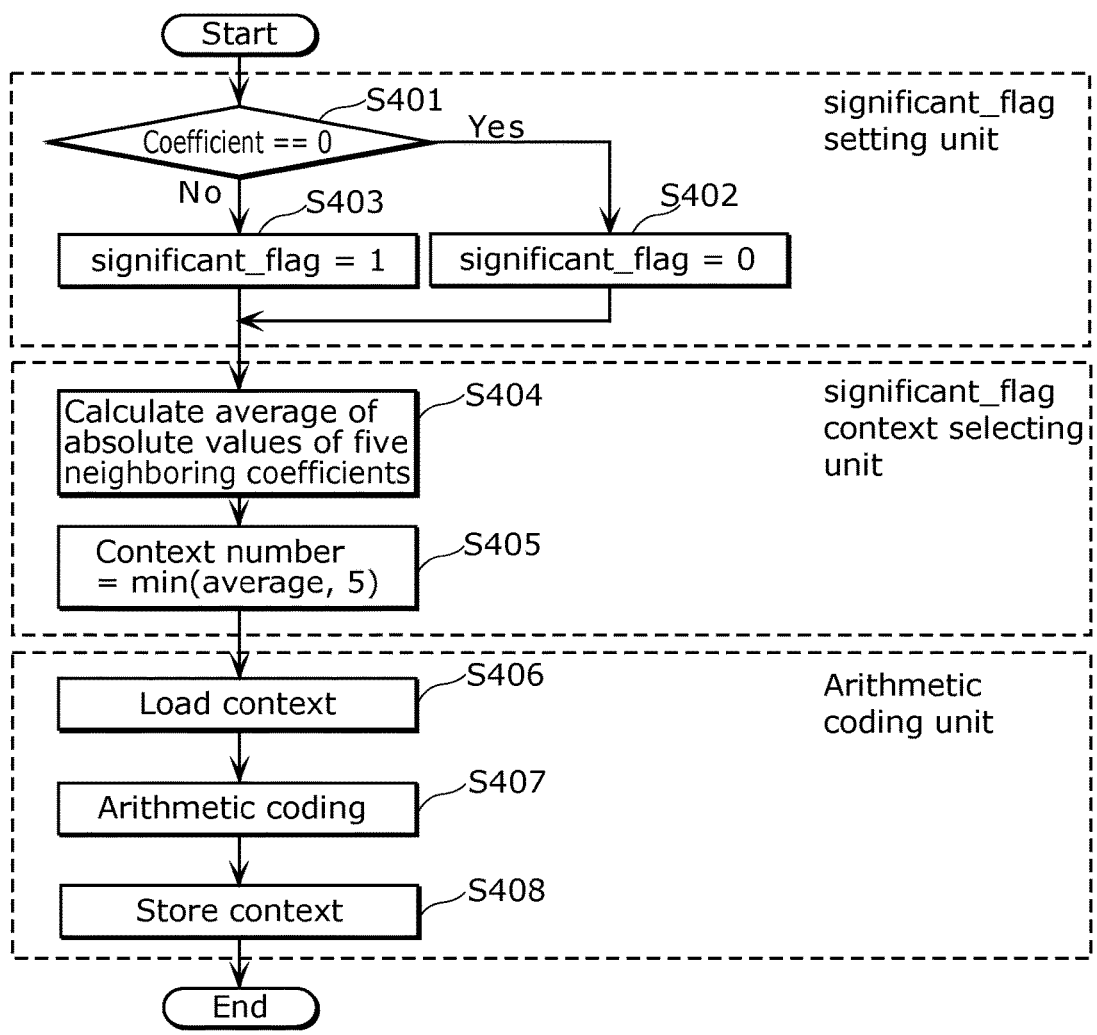
FIG. 8 is a flowchart illustrating significant_flag coding according to Embodiment 1.

Next, significant_flag coding flow will be described with reference to FIG. 8.

(Step S401 to Step S403)

The significant_flag setting unit 1441 determines whether or not a current coefficient to be processed is 0, sets 0 to the significant_flag in the case of 0, and sets 1 to the significant_flag in the case of not 0.

(Step S404 to Step S405)

The significant_flag context selecting unit 1443 calculates an average of absolute values of five coefficients neighboring the current coefficient. The five neighboring coefficients are two coefficients positioned to the right of the current coefficient, two coefficients positioned under the current coefficient, and a lower right coefficient. The five neighboring coefficients are obtained from the coefficient absolute value memory 1403. Next, the significant_flag context selecting unit 1443 compares five and the average of the absolute values of the five neighboring coefficients, and sets a smaller value as a context number.

(Step S406 to Step S408)

The arithmetic coding unit 1442 loads, from the significant_flag context memory 1444, a context to be used according to the context number, executes arithmetic coding, and outputs a bitstream. Then, the context updated by the arithmetic coding is stored in the significant_flag context memory 1444.

[Configuration of the Sign_Flag Coding Unit]

Figure 9:
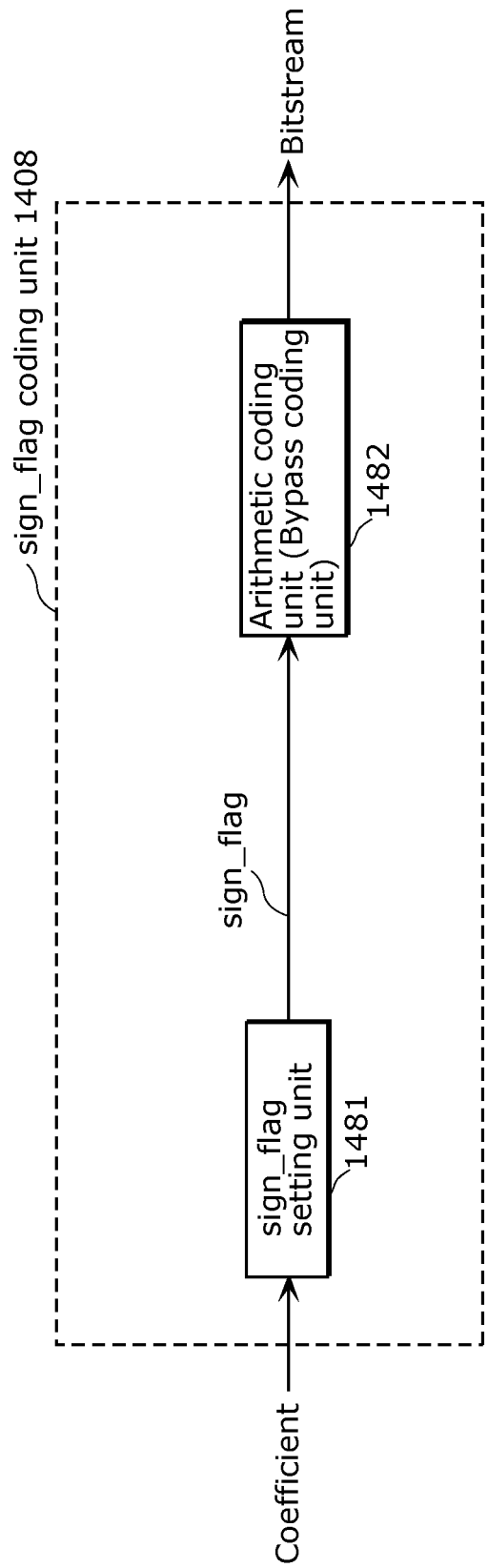
FIG. 9 is a diagram illustrating an internal configuration of a sign_flag coding unit according to Embodiment 1.

FIG. 9 illustrates an internal configuration of the sign_flag coding unit 1408.

The sign_flag coding unit 1408 includes a sign_flag setting unit 1481 and an arithmetic coding unit 1482.

[Operation (Sign_Flag Coding)]

Figure 10:
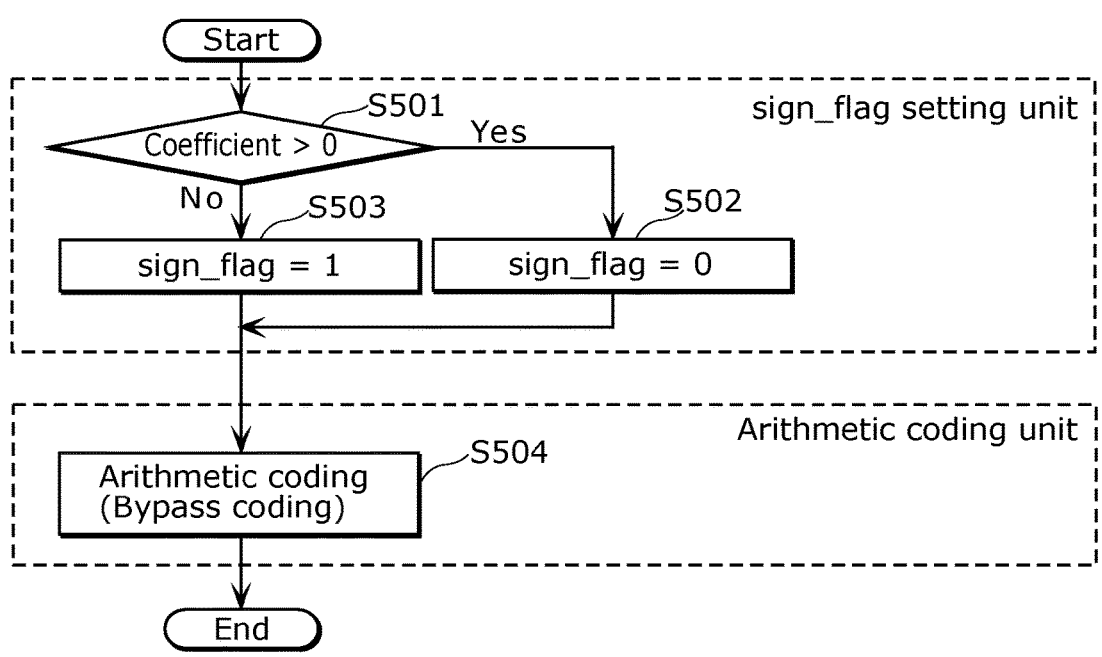
FIG. 10 is a flowchart illustrating sign_flag coding according to Embodiment 1.

Next, sign_flag coding flow will be described with reference to FIG. 10.

(Step S501 to Step S503)

The sign_flag setting unit 1481 determines whether or not a current coefficient to be processed is larger than 0, sets 0 to the sign_flag when the current coefficient is larger than 0 (in the case of a positive number), and sets 1 to the sign_flag when the current coefficient is not larger than 0 (in the case of a negative number). Incidentally, since the sign_flag coding is not executed when the current coefficient is 0 as in the coefficient coding flow illustrated in FIG. 4, the coefficient value is a negative number when the current coefficient is not larger than 0.

(Step S504)

The arithmetic coding unit 1482 arithmetically codes the sign_flag and outputs a bitstream. In the arithmetic coding here, the arithmetic coding unit 1482 performs bypass coding in which a context is not used.

The image coding method according to an aspect of the present disclosure has been described above using Embodiment 1, and the image coding method includes steps below. To be specific, the image coding method is an image coding method for coding a current image, the image coding method comprising: dividing the current image into a plurality of coding blocks (S101); generating a prediction image (S102); generating a differential image from the prediction image and a corresponding one of the coding blocks (S103); generating a plurality of coefficients by performing frequency transformation on the differential image (S104); dividing a set including the coefficients into a plurality of coefficient subsets (S201); replacing each of the coefficients in each of the coefficient subsets with a plurality of parameters (S204, S206, and the like. Specifically, S402, S403, and the like); selecting a context to be used in arithmetic coding, by referring to a value related to a coefficient neighboring a current coefficient to be coded which is one of the coefficients included in the coefficient subset (S405); and performing arithmetic coding on a parameter corresponding to the current coefficient, using a symbol occurrence probability that is determined according to the selected context (S407 and the like). In the performing of arithmetic coding, the arithmetic coding is performed, for each of the coefficients, on a related parameter among a plurality of parameters corresponding to the coefficient, the related parameter being a parameter related to a value which is referred to for selecting the context (S204 to S210), and the arithmetic coding is performed, for each of the coefficient subsets, collectively on a plurality of unrelated parameters, among a plurality of parameters corresponding to the coefficients in the coefficient subset, the unrelated parameters being parameters not related to the value which is referred to for selecting the context (S214).

[Advantageous Effect]

As described above, according to Embodiment 1, it is possible to further provide deviation to the symbol occurrence probability by determining a context referring to not a neighboring coefficient parameter but a coefficient absolute value, thereby allowing improvement of coding efficiency. This has been accomplished by coding, per coefficient, a parameter that is referred to by another coefficient; that is, a parameter related to a coefficient absolute value. To be more specific, in view of decoding of a bitstream, data to be referred to needs to be present prior to data to be decoded. For example, the neighboring parameter to be referred to when decoding a coefficient needs to be already decoded. More specifically, the parameter related to the coefficient absolute value is coded per coefficient, thereby allowing referring to a coefficient absolute value of an immediately before coefficient when coding a next coefficient.

In addition, parameters which are not referred to by another coefficient are collectively coded at the end in a coefficient sub-block, thereby achieving higher processing speed. More specifically, it is generally known that processing efficiency is enhanced by coding the same parameters consecutively. For example, the types of contexts to be used are limited when the parameters are the same, and thus it is possible to load contexts in advance in a cache memory or a register to allow accessing at high speed. Furthermore, coding logic is the same for the same parameters, and thus forming of pipeline processing is facilitated. In addition, it is possible to know the number of bits of a bitstream to be output prior to coding and eliminate the need to update a context, by collecting parameters of bypass coding in which a context is not used as in Embodiment 1, thereby making it possible to speed up the processing. Trade off exists between (i) which parameters are to be collected at the end and (ii) which parameters are to be made referable by another coefficient to improve coding efficiency as described above. In view of the above, the inventors have found that, coding efficiency of a Sign parameter (sign_flag) was not improved even when the Sign parameter was made referable by another coefficient, and thus collected only the Sign parameters at the end according to Embodiment 1.

Furthermore, it is possible to reduce the generated amount of coded data with almost none of image degradation, by eliminating the need to code the Sign parameter of one coefficient. More specifically, the generated amount of coded data is reduced by not coding the Sign parameters of one coefficient in a 4×4 coefficient block and representing the Sign parameters which are not coded according to whether the sum of the coefficient absolute values in the 4×4 coefficient block is an even number or an odd number.

Furthermore, the position of the last Sign parameter (the position of the non-zero coefficient) is clarified by collecting the Sign parameters at the end, thereby allowing deleting the last Sign para meter.

When the Sign parameters are coded per coefficient in the same manner as other parameters, it is hard to tell which of the coefficients is the last non-zero coefficient, and thus the coefficient of which the Sign parameters are not coded cannot be found at the time of decoding.

It is to be noted that, coding is not performed on sign_flag of the last non-zero coefficient in order of scanning according to Embodiment 1, however, the coding is not always avoided, and performing/not-performing of the coding may be switched according to the state of the flag or the coefficient value.

In addition, although five neighboring coefficients are referred to, there is no restriction on the number of coefficients to be referred to, and the number may be larger or smaller than five.

Furthermore, a position distant from the current coefficient may be referred to. In addition, although an average of five neighboring coefficients is used, an intermediate value may be used instead of the average. Furthermore, although the average and five is compared and a smaller one is set as the context number, the value to be compared with the average may be larger or smaller than five, and the average value itself may be set as the context number.

In addition, although the coefficient absolute value in the 4×4 coefficient block is used to calculate SignTmp, a numerical value obtained by modifying the coefficient absolute value, such as "coefficient absolute value−1" or "coefficient absolute value−2", may be used instead of the coefficient absolute value.

Furthermore, although the Sign parameter of the last non-zero coefficient in order of scanning in the 4×4 coefficient block is not coded, the subject is not necessarily the last non-zero coefficient, and the first non-zero coefficient or the Sign parameter of the intermediate non-zero coefficient may be set as the subject.

In addition, although one is subtracted from the coefficient value of the first non-zero coefficient when the Sign parameter of the last non-zero coefficient in order of scanning in the 4×4 coefficient block is different from SignTmp, a different method may be employed as long as the sum of the coefficient absolute values in the 4×4 coefficient block is an even number or an odd number. For example, one may be subtracted from or added to a different coefficient value, or two may be added to (subtracted from) a different coefficient value and one may be subtracted from (added to) another coefficient value.

In addition, although a coefficient is coded using five parameters of significant_flag, greater1_flag, greater2_flag, level_minus1, and sign_flag, parameters to be used are not limited to the five parameters, and for example, three parameters of significant_flag, level_minus1, and sign_flag may be used for the coding.

In addition, although the bypass coding is performed on the level_minus 3 and the sign_flag, the bypass coding may also be performed on the significant_flag, the greater1_flag, and so on.

In addition, as to a coefficient to be referred to, coefficients outside the coding block to be processed may be avoided from being referred to, or not only spatially neighboring coefficients but also temporally neighboring coefficients may be referred to. For example, a coefficient which is at the same position as the current coefficient in the picture immediately before may be referred to.

In addition, although the size of the coding block is 32×32 at a maximum and 4×4 at a minimum, the size may be larger or smaller. Furthermore, the size of the coding block may be fixed.

In addition, although the coding block is divided into 4×4 coefficient blocks, the coding block may be divided into 8×8 or 2×2 coefficient blocks, or into 4×8 rectangle. Furthermore, the coding block may be divided not per block but for every 16 coefficients in order of scanning, for example.

In addition, the processing according to Embodiment 1 may be implemented by software. The software may be distributed through downloading or the like. In addition, the software may be recorded on a recording medium such as a CD-ROM and spread. It is to be noted that the aforementioned applies to other embodiments of this application.

Embodiment 2

[Overall Configuration and Operation (Entirety)]

The overall configuration and the overall operation of a video coding apparatus according to Embodiment 2 are the same as those in Embodiment 1, and thus descriptions for them will be omitted.

[Configuration of the Coefficient Coding Unit]

Figure 13:
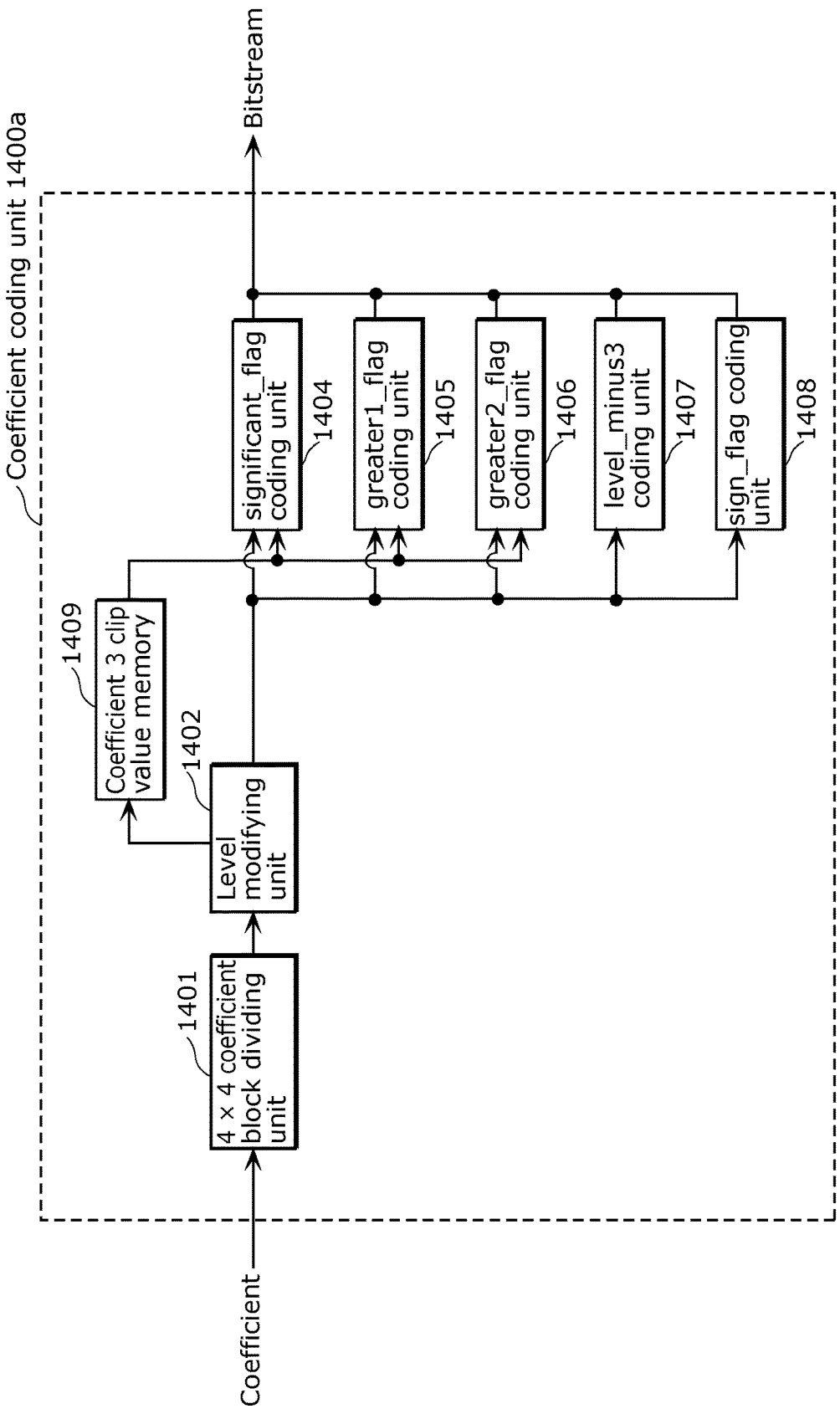
FIG. 13 is a diagram illustrating an internal configuration of a coefficient coding unit according to Embodiment 2.

FIG. 13 illustrates an internal configuration of a coefficient coding unit according to Embodiment 2.

A coefficient coding unit 1400a includes: a 4×4 coefficient block dividing unit 1401; a level modifying unit 1402; a coefficient 3 clip value memory 1409; a significant_flag coding unit 1401; a greater1_flag coding unit 1405; a greater2_flag coding unit 1406; a level_minus3 coding unit 1407; and a sign_flag coding unit 1408. In other words, the coefficient coding unit 1400a according to Embodiment 2 has the same structural elements as those in Embodiment 1 other than that the coefficient coding unit 1400a includes the coefficient 3 clip value memory 1409 instead of the coefficient absolute value memory 1403 of Embodiment 1.

[Operation (Coefficient Coding)]

Figure 14:
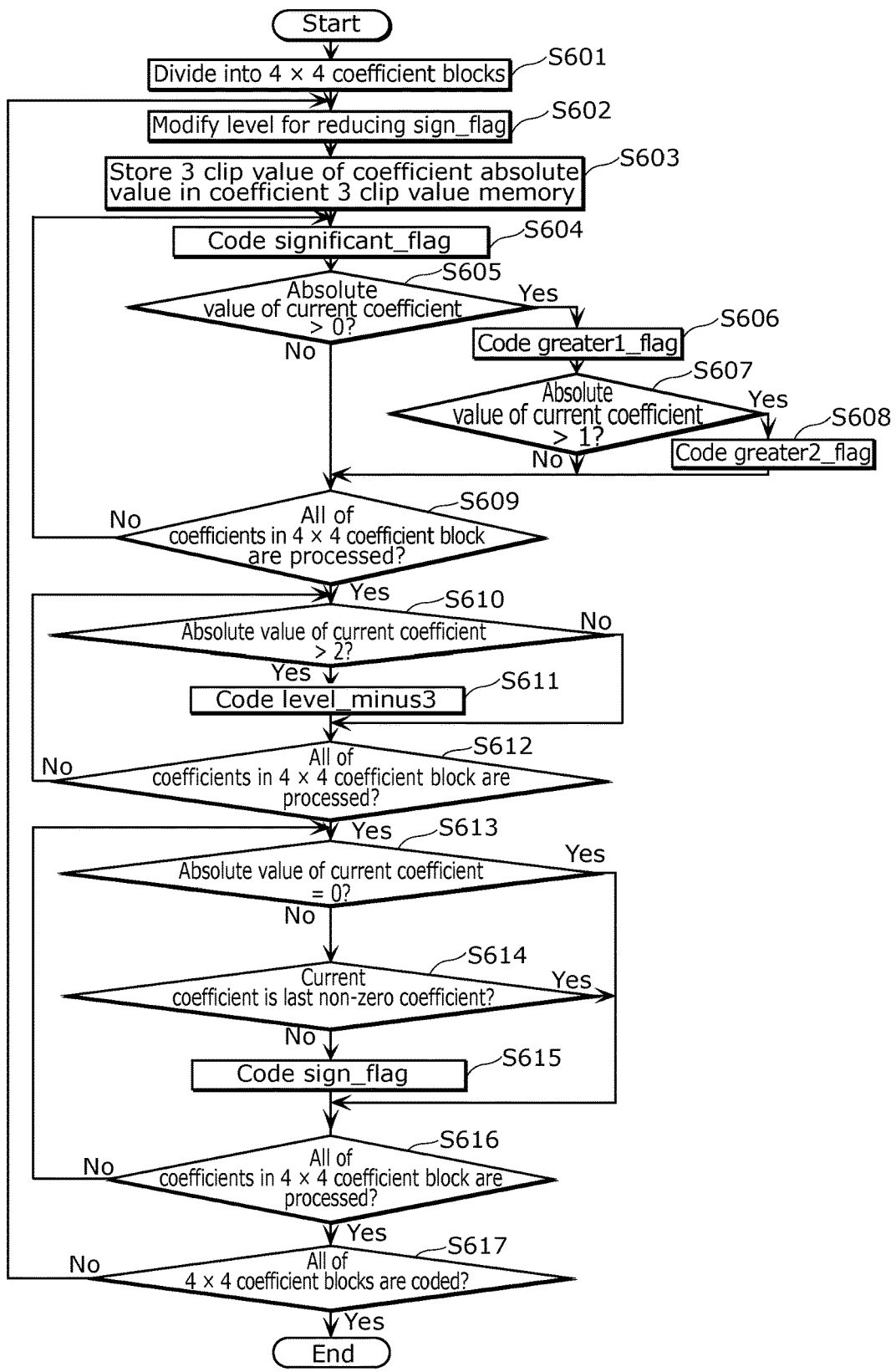
FIG. 14 is a flowchart illustrating coefficient coding according to Embodiment 2.

Next, a coefficient coding flow will be described with reference to FIG. 14. The coefficient coding flow is the same as that in Embodiment 1 other than Step S603 and Step S610 to Step S612, and thus description for Steps other than those will be omitted. More specifically, Steps S601, S602, S604 to S608, S609, and S613 to S617 according to Embodiment 2 are equivalent to Steps S201, S202, S204 to S208, S211, and S212 to S216.

(Step S603)

The level modifying unit 1402 compares a coefficient absolute value with 3, and stores a smaller value (3 clip value) in the coefficient 3 clip value memory 1409 so that the value is used afterward for referring to a neighboring coefficient.

(Step S610 to Step S612)

The level_minus3 coding unit 1407 performs setting of the level_minus3 and coding on a coefficient whose coefficient absolute value is larger 2. The level_minus3 coding unit 1407 repeats this process until all of the coefficients in the 4×4 coefficient block are processed. The level_minus3 is coded through the bypass coding in which a context is not used.

Figure 17:
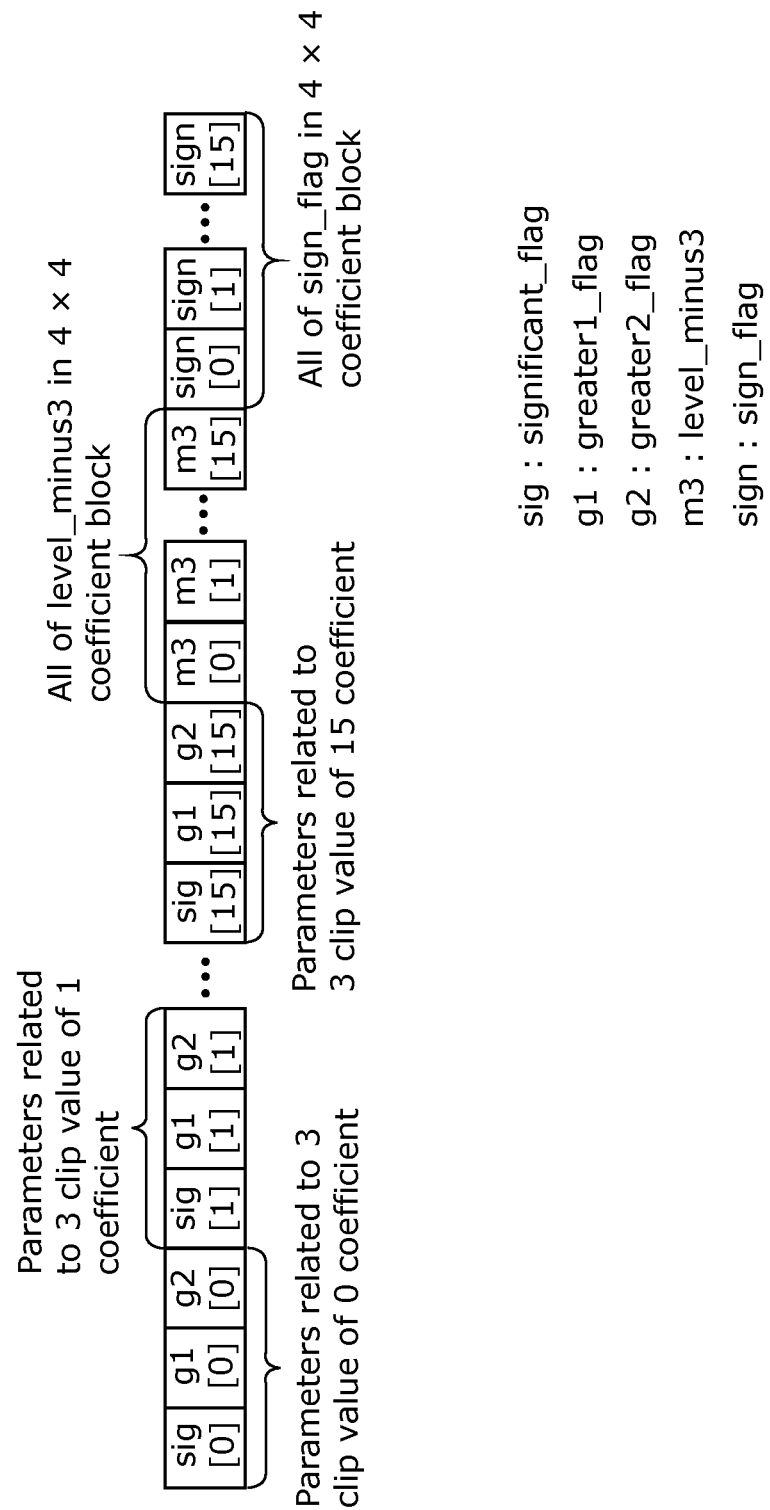
FIG. 17 is a diagram illustrating an example of a bitstream according to Embodiment 2.

FIG. 17 illustrates an example of a bitstream. Parameters (significant_flag, greater1_flag, greater2_flag) related to a value resulting from clipping a coefficient value by 3 are coded per coefficient, however, other parameters of level_minus3 and sign_flag are collectively coded in the 4×4 coefficient block. It is to be noted that there is the case where a parameter other than the significant_flag is not present depending on the values of other parameters, however, FIG. 17 illustrates the case where all of the parameters are present for simplifying the description.

The following describes in detail the significant_flag coding unit 1404. It is to be noted that other parts such as the level modifying unit 1402 and the sign_flag coding unit 1408 are the same as those in Embodiment 1.

[Configuration of Significant_Flag Coding Unit]

Figure 15:
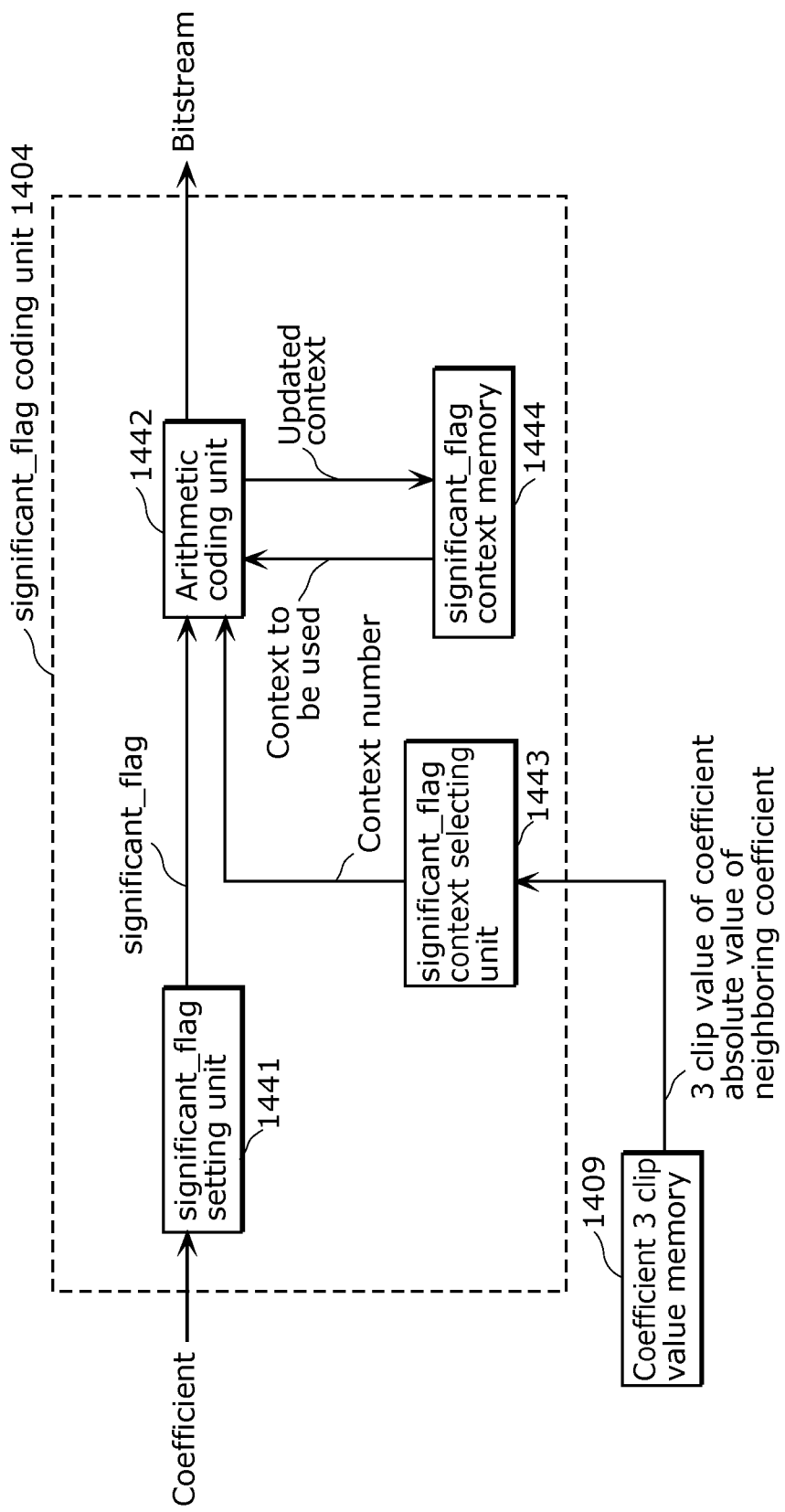
FIG. 15 is a diagram illustrating an internal configuration of a significant_flag coding unit according to Embodiment 2.

FIG. 15 illustrates an internal configuration of the significant_flag coding unit 1404.

The significant_flag coding unit 1404 includes: a significant_flag setting unit 1441; an arithmetic coding unit 1442; a significant_flag context selecting unit 1443; and a significant_flag context memory 1444 as with Embodiment 1. Here, the significant_flag context selecting unit 1443 according to Embodiment 2 uses the coefficient 3 clip value memory 1409 instead of the coefficient absolute value memory 1403 of Embodiment 1.

[Operation (Significant_Flag Coding)]

Figure 16:
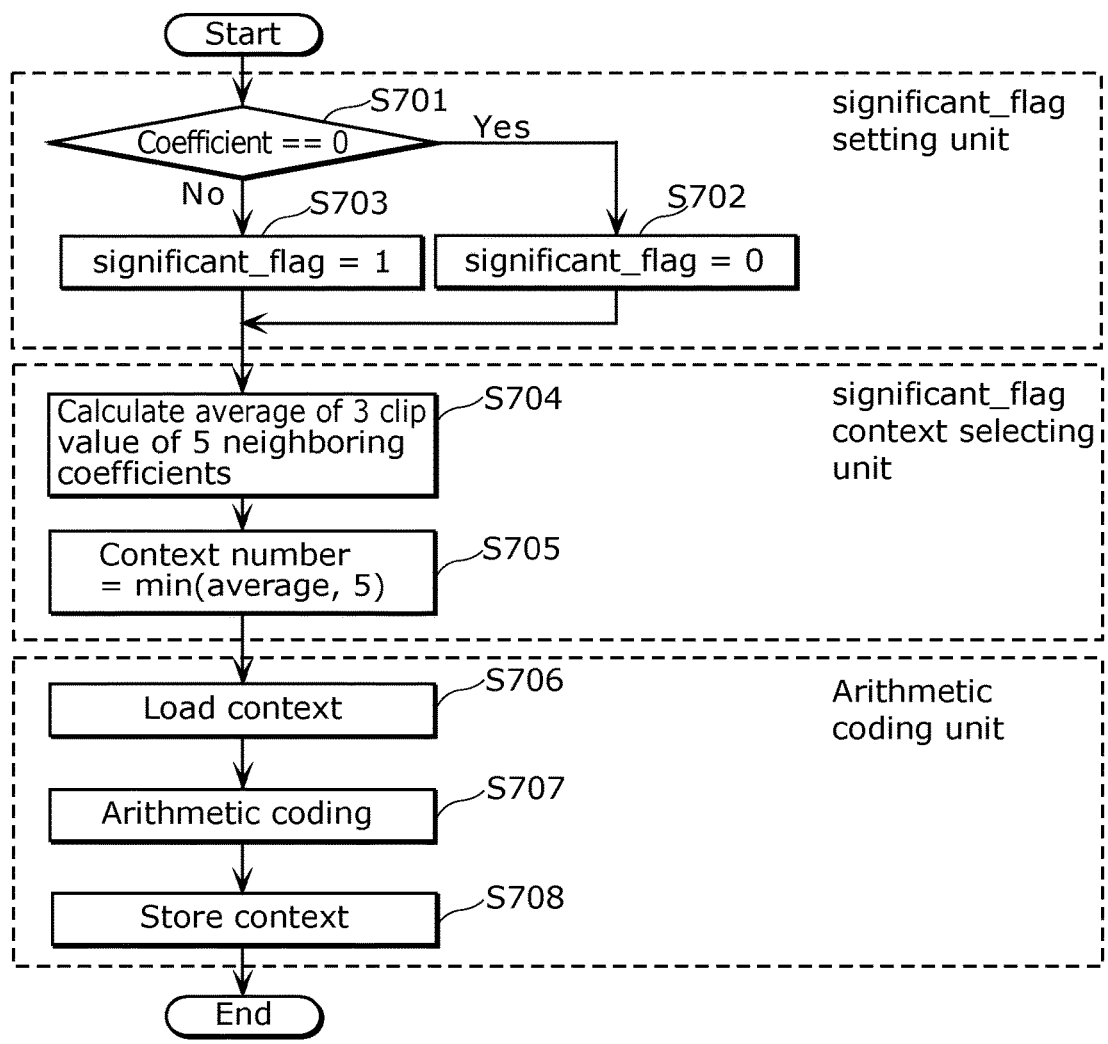
FIG. 16 is a flowchart illustrating significant_flag coding according to Embodiment 2.

Next, a significant_flag coding flow will be described with reference to FIG. 16. The coefficient coding flow is the same as that in Embodiment 1 other than Step S704, and thus description for Steps other than that will be omitted. More specifically, Steps S701 to S703 and S705 to S708 are equivalent to Steps S401 to S403 and S405 to S408 in Embodiment 1.

(Step S704)

The significant_flag context selecting unit 1443 calculates an average of 3 clip values of five coefficients neighboring the current coefficient to be processed. The positions of the five neighboring coefficients are the same as those in Embodiment 1. The 3 clip values of the five neighboring coefficients are obtained from the coefficient 3 clip value memory 1409.

[Advantageous Effect]

As described above, according to Embodiment 2, it is possible to further provide deviation to the symbol occurrence probability by determining a context referring to not a neighboring coefficient parameter but a value obtained by clipping the coefficient absolute value by 3, thereby allowing improvement of coding efficiency. This has been accomplished by coding, per coefficient, a parameter that is referred to by another coefficient; that is, a parameter related to a value obtained by clipping the coefficient absolute value by 3.

In addition, it is possible to reduce the capacity of a reference memory by using, for reference, not a coefficient value but a value obtained by clipping a coefficient absolute value by 3. According to the current HEVC standard, a coefficient value is data of 16 bits, and thus 16 bits are required per coefficient for referring to the coefficient value. However, only 2 bits are necessary per coefficient when the value obtained by clipping the coefficient absolute value by 3 is used for reference, making it possible to reduce the capacity of the reference memory by approximately 88%.

In addition, parameters which are not referred to by another coefficient are collectively coded at the end in a coefficient sub-block, thereby achieving higher processing speed. More specifically, it is generally known that processing efficiency is enhanced by coding the same parameters consecutively. For example, the types of contexts to be used are limited when the parameters are the same, and thus it is possible to load contexts in advance in a cache memory or a register to allow accessing at high speed. Furthermore, coding logic is the same for the same parameters, and thus forming of pipeline processing is facilitated.

In addition, it is possible to know the number of bits of a bitstream to be output prior to coding and eliminate the need to update a context by collecting parameters of bypass coding in which a context is not used as in Embodiment 1, thereby making it possible to speed up the processing. Trade off exists between (i) which parameters are to be collected at the end and (ii) which parameters are to be made referable by another coefficient to improve coding efficiency as described above. In view of the above, the inventors have found that, coding efficiency of the Sign parameter (sign_flag) was not improved even when the Sign parameter was made referable by another coefficient, and thus collected the Sign parameters at the end. Furthermore, the inventors also collected the level_minus3 at the end in view of the facts 1 to 3 below. That is, the first fact is that since coding of the level_minus3 is performed through the bypass coding, the advantageous effect of speeding up of processing increases when the parameters are collected. In addition, the second fact is that the capacity of the reference memory is enlarged when the parameter is made referable. Furthermore, the third fact, which is the fact found by the inventors, is that the coding efficiency is not improved that much by making the parameters referable.

Furthermore, it is possible to reduce the generated amount of coded data with almost none of image degradation, by eliminating the need to code the Sign parameter of one coefficient. More specifically, the generated amount of coded data is reduced by not coding the Sign parameters of one coefficient in a 4×4 coefficient block and representing the Sign parameters which are not coded according to whether the sum of the coefficient absolute values in the 4×4 coefficient block is an even number or an odd number. Furthermore, the position of the last Sign parameter (the position of the non-zero coefficient) is clarified by collecting the Sign parameters at the end, thereby allowing deleting the last Sign parameter. When the Sign parameters are coded per coefficient in the same manner as other parameters, it is hard to tell which of the coefficients is the last non-zero coefficient, and thus the coefficient of which the Sign parameters are not coded cannot be found at the time of decoding.

It is to be noted that, although the value obtained by clipping the coefficient absolute value by 3 is referred to by another coefficient according to Embodiment 2, greater3_flag which indicates that the coefficient absolute value is greater than or equal to 4 may newly be provided and a value obtained by clipping by 4 may be made referable by the other coefficient.

In addition, parameters of the greater2_flag may be collected in the 4×4 coefficient block as with the level_minus3, and a value obtained by clipping by 2 may be made referable by the other coefficient.

It is to be noted that, coding is not performed on sign_flag of the last non-zero coefficient in order of scanning, however, the coding is not always avoided, and performing/not-performing of the coding may be switched according to the state of the flag or the coefficient value.

In addition, although five neighboring coefficients are referred to, there is no restriction on the number of coefficients to be referred to, and the number may be larger or smaller than five. Furthermore, a position distant from the current coefficient may be referred to. In addition, although an average of five neighboring coefficients is used, an intermediate value may be used instead of the average.

Furthermore, although the average and 5 are compared and a smaller one of the average and five is set as the context number, the value to be compared with the average may be larger or smaller than 5, and the average value itself may be set as the context number.

In addition, although the coefficient absolute value in the 4×4 coefficient block is used to calculate SignTmp, a numerical value obtained by modifying the coefficient absolute value, such as "coefficient absolute value−1" or "coefficient absolute value−2", may be used instead of the coefficient absolute value.

Furthermore, although the Sign parameter of the last non-zero coefficient in order of scanning in the 4×4 coefficient block is not coded, the subject is not necessarily the last non-zero coefficient, and the first non-zero coefficient or the Sign parameter of the intermediate non-zero coefficient may be set as the subject.

In addition, although one is subtracted from the coefficient value of the first non-zero coefficient when the Sign parameter of the last non-zero coefficient in order of scanning in the 4×4 coefficient block is different from SignTmp, a different method may be employed as long as the sum of the coefficient absolute values in the 4×4 coefficient block is an even number or an odd number. For example, one may be subtracted from or added to a different coefficient value, or two may be added to (subtracted from) a different coefficient value and one may be subtracted from (added to) another coefficient value.

In addition, although a coefficient is coded using five parameters of significant_flag, greater1_flag, greater2_flag, level_minus1, and sign_flag, parameters to be used are not limited to the five parameters, and for example, three parameters of significant_flag, level_minus1, and sign_flag may be used for the coding.

In addition, although the bypass coding is performed on the level_minus 3 and the sign_flag, the bypass coding may also be performed on the significant_flag, the greater1_flag, and so on.

In addition, as to a coefficient to be referred to, coefficients outside the coding block to be processed may be avoided from being referred to, or not only spatially neighboring coefficients but also temporally neighboring coefficients may be referred to. For example, a coefficient which is at the same position as the current coefficient in the picture immediately before may be referred to.

In addition, although the size of the coding block is 32×32 at a maximum and 4×4 at a minimum, the size may be larger or smaller. Furthermore, the size of the coding block may be fixed.

In addition, although the coding block is divided into 4×4 coefficient blocks, the coding block may be divided into 8×8 or 2×2 coefficient blocks, or into 4×8 rectangle. Furthermore, the coding block may be divided not per block but for every 16 coefficients in order of scanning, for example.

Embodiment 3

Figure 18:
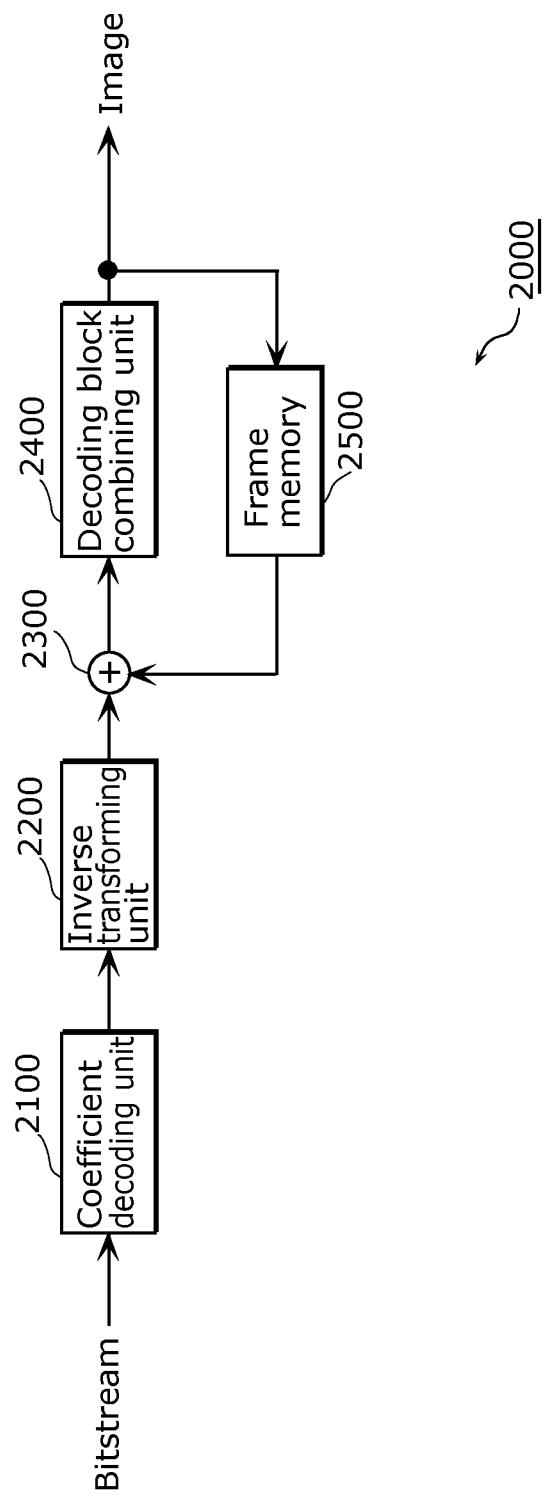
FIG. 18 is a diagram illustrating a configuration of a video decoding apparatus according to Embodiment 3.

[Overall Configuration]
FIG. 18 illustrates a configuration of a video decoding apparatus according to Embodiment 3.

A video decoding apparatus 2000 includes: a coefficient decoding unit 2100; an inverse transforming unit 2200; an adder 2300; a decoding block combining unit 2400; and a frame memory 2500.

Figure 19:
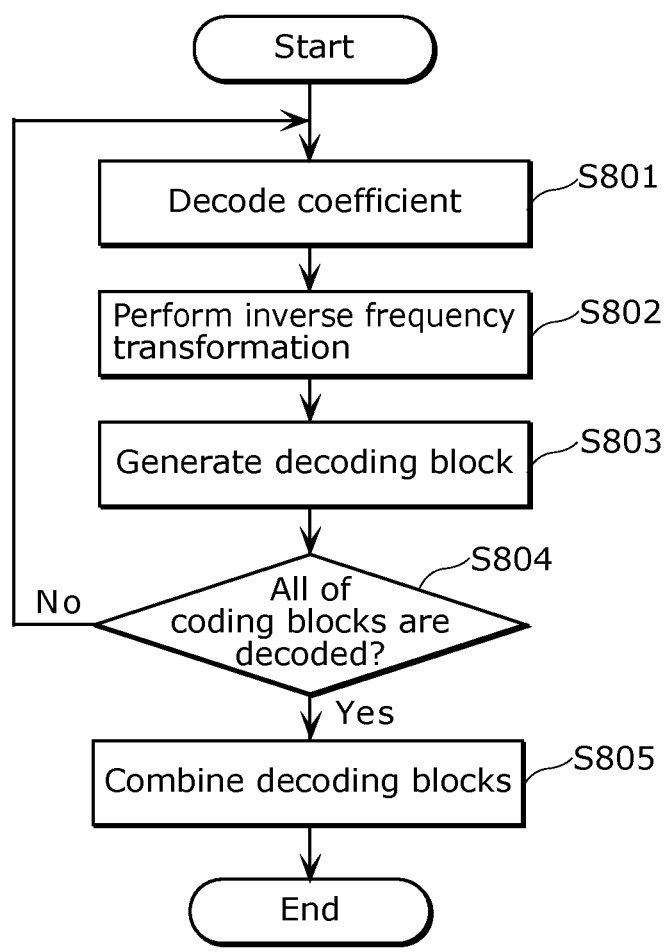
FIG. 19 is a flowchart illustrating entire decoding processing according to Embodiment 3.

[Operation (Entirety)]
Next, the entire flow of decoding will be described with reference to FIG. 19.

(Step S801)
The coefficient decoding unit 2100 decodes a frequency coefficient from a bitstream and outputs the frequency coefficient to the inverse transforming unit 2200.
(Step S802)
The inverse transforming unit 2200 transforms the frequency coefficient into pixel data and generates a difference block.
(Step S803)
The adder 2300 adds the decoded image stored in the frame memory 2500 and the difference block to generate a decoding block.
(Step S804)
The video decoding apparatus 2000 repeats the processes from Step S801 to Step S803 until all of the decoding blocks in the current image to be decoded are decoded.
(Step S805)
The decoding block combining unit 2400 generates a decoded image by combining all of the decoding blocks and stores the decoded image in the frame memory 2500.

Figure 20:
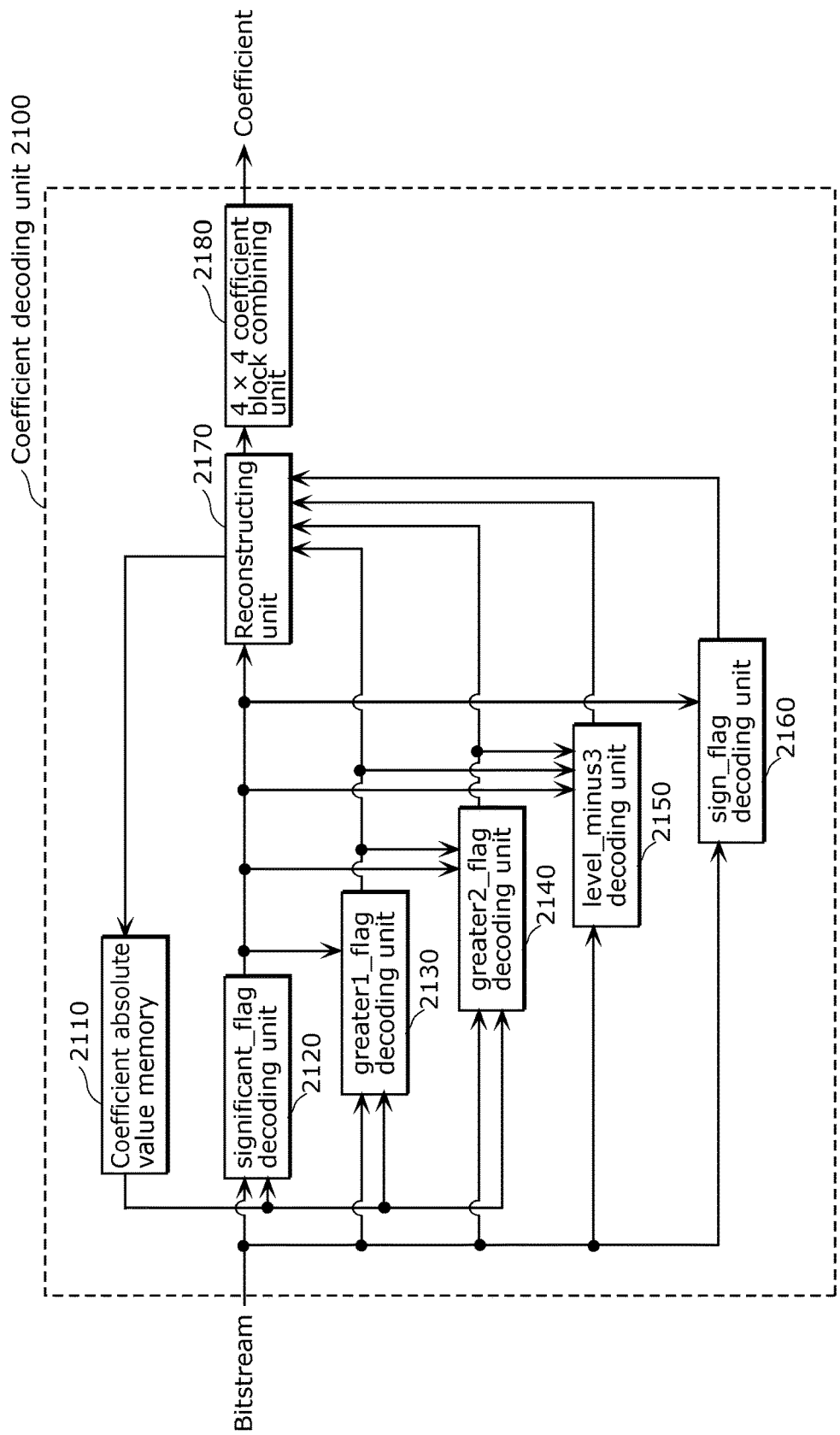
FIG. 20 is a diagram illustrating an internal configuration of a coefficient decoding unit according to Embodiment 3.

[Configuration of the Coefficient Decoding Unit]
FIG. 20 illustrates an internal configuration of the coefficient decoding unit 2100. According to Embodiment 3, a coefficient is represented by dividing into significant_flag, greater1_flag, greater2_flag, level_minus3, and sign_flag, in the same manner as Embodiment 1.

The coefficient decoding unit 2100 includes: a coefficient absolute value memory 2110; a significant_flag decoding unit 2120; a greater1_flag decoding unit 2130; a greater2_flag decoding unit 2140; a level_minus3 decoding unit 2150; a sign_flag decoding unit 2160; a reconstructing unit 2170; and a 4×4 coefficient block combining unit 2180.

Figure 21:
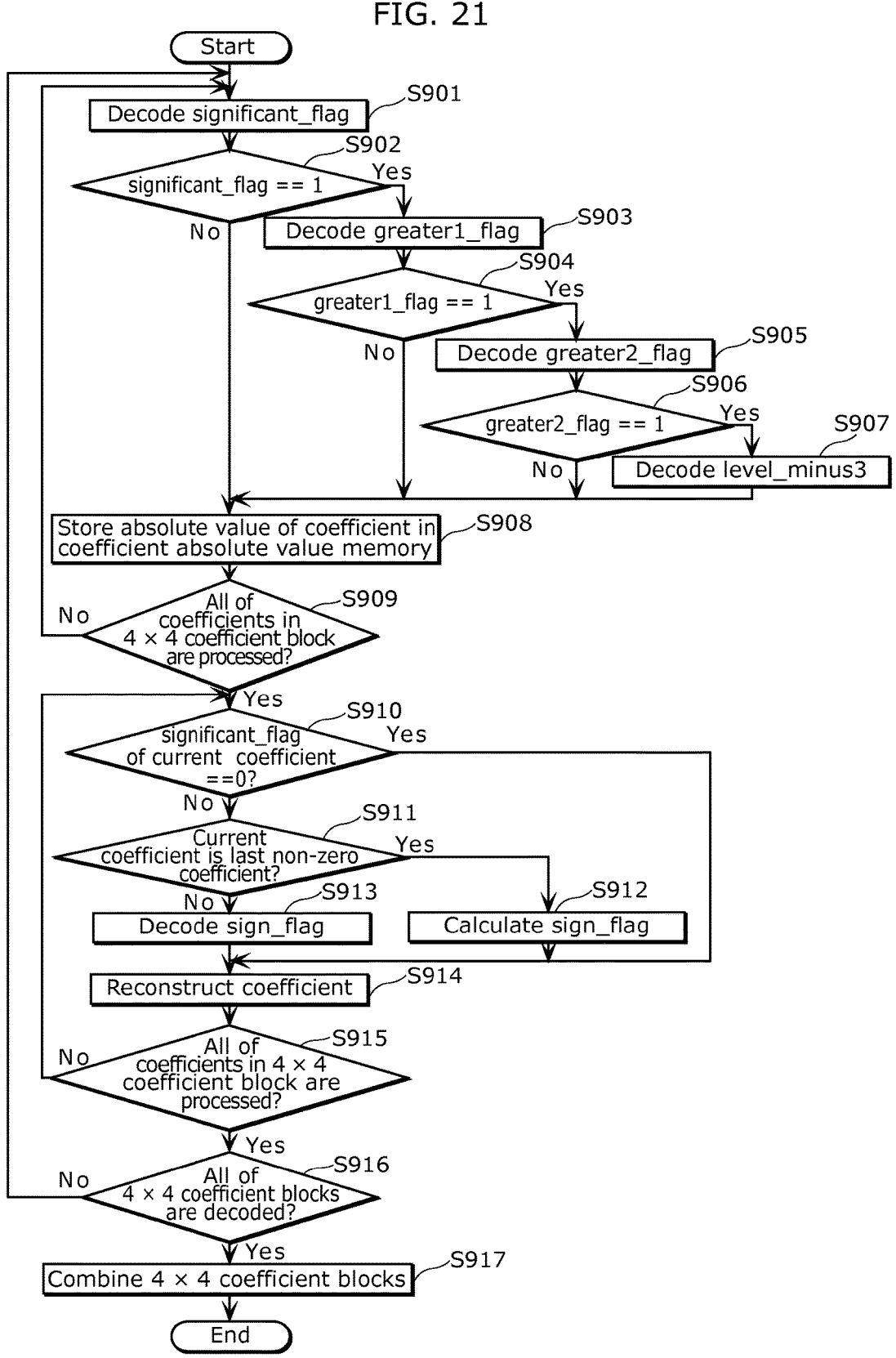
FIG. 21 is a flowchart illustrating coefficient decoding according to Embodiment 3.

[Operation (Coefficient Decoding)]
Next, a coefficient decoding flow will be described with reference to FIG. 21.
(Step S901)
The significant_flag decoding unit 2120 decodes the significant_flag. The details will be described later.
(Step S902)
The greater1_flag decoding unit 2130 determines whether the significant_flag is 1 or not, and performs Step S903 when it is determined that the significant_flag is 1. When the significant_flag is 0, the decoding of the current coefficient absolute value is completed, and Step S908 is performed.
(Step S903)
The greater1_flag decoding unit 2130 decodes the greater1_flag.
(Step S904)
The greater2_flag decoding unit 2140 determines whether the greater2_flag is 1 or not, and performs Step S905 when it is determined that the greater2_flag is 1. When the greater2_flag is 0, the decoding of the current coefficient absolute value is completed, and Step S908 is performed.
(Step S905)
The greater2_flag decoding unit 2140 decodes the greater2_flag.
(Step S906)
The level_minus3 decoding unit 2150 determines whether the greater2_flag is 1 or not, and performs Step S907 when it is determined that the greater2_flag is 1. When the greater2_flag is 0, the decoding of the current coefficient absolute value is completed, and Step S908 is performed.
(Step S907)
The level_minus3 decoding unit 2150 decodes the level_minus3. It is to be noted that the level_minus3 is decoded through the bypass decoding in which a context is not used.

(Step S908)

The reconstructing unit 2170 reconstructs a coefficient absolute value using the decoded significant_flag and the like, and stores the reconstructed coefficient absolute value in the coefficient absolute value memory 2110 so that the absolute value is used afterward for referring to a neighboring coefficient.

(Step S909)

The coefficient decoding unit 2100 repeats the processes from Step S901 to Step S908 until all of the coefficients in the 4×4 coefficient block are processed.

(Step S910)

The sign_flag decoding unit 2160 determines whether the significant_flag of a current coefficient is 1 or not, and performs Step S911 when it is determined that the significant_flag is 1. Since the current coefficient is 0 when the significant_flag is 0 and thus does not have the sign_flag, decoding is completed, and Step S915 is performed.

(Step S911)

The sign_flag decoding unit 2160 determines whether or not a current coefficient is a coefficient which is not the last 0 (non-zero coefficient) in the 4×4 coefficient block in order of scanning, performs Step S912 when the current coefficient is the last non-zero coefficient, and otherwise performs Step S913.

(Step S912)

The sign_flag coding unit 2160 calculates the sum of the coefficient absolute values in all of the coefficients in the 4×4 coefficient block, and sets 0 to the sign_flag when the sum is an even number or sets 1 to the sign_flag when the sum is an odd number.

(Step S913)

The sign_flag decoding unit 2160 decodes the sign_flag. It is to be noted that the sign_flag is decoded through the bypass decoding in which a context is not used.

(Step S914)

The reconstructing unit 2170 reconstructs a coefficient value using the decoded significant_flag, the decoded sign_flag, and the like.

(Step S915)

The sign_flag decoding unit 2160 and the reconstructing unit 2170 repeat the processes from Step S910 to Step S914 until all of the coefficients in the 4×4 coefficient block are processed.

(Step S916)

The coefficient decoding unit 2100 repeats the processes from Step S901 to Step S915 until all of the 4×4 coefficient blocks in the decoding block are decoded.

(Step S917)

The 4×4 coefficient block combining unit 2100 combines all of the 4×4 coefficient blocks in the decoding block and outputs all of the coefficients in the decoding block.

The following describes in detail the significant_flag decoding unit 2120.

[Configuration of Significant_Flag Decoding Unit]

Figure 22:
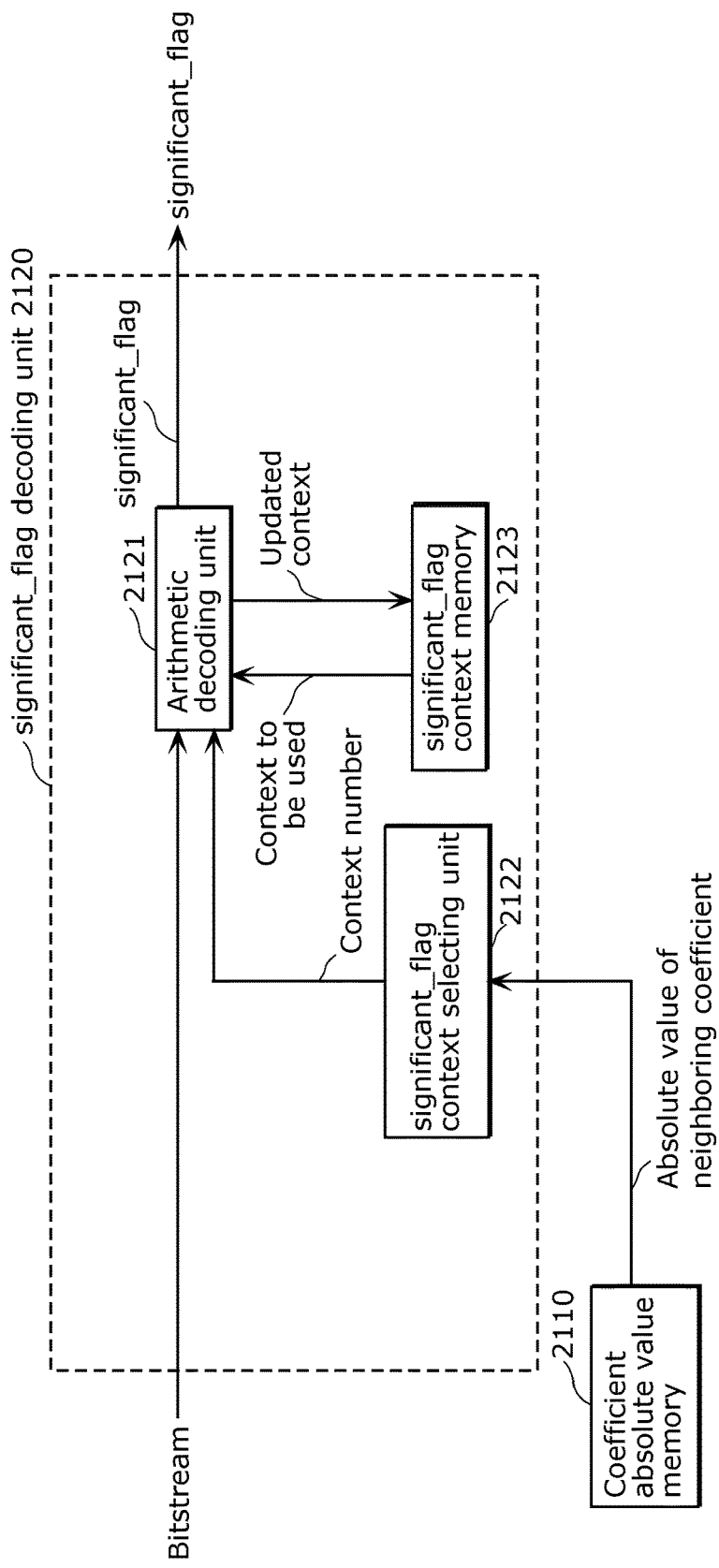
FIG. 22 is a diagram illustrating an internal configuration of a significant_flag decoding unit according to Embodiment 3.

FIG. 22 illustrates an internal configuration of the significant_flag decoding unit 2120. It is to be noted that since the decoding of the greater1_flag and the decoding of the greater2_flag are substantially the same as the decoding of the significant_flag, explanation will be omitted. In addition, the decoding of the level_minus3 and the decoding of the sign_flag are performed through the bypass decoding in which a context is not used, however, other than that, the decoding is substantially the same as decoding of other parameters, and thus explanation will be omitted.

The significant_flag decoding unit 2120 includes: a significant_flag context selecting unit 2122; an arithmetic decoding unit 2121; and a significant_flag context memory 2123.

Operation (Significant_Flag Decoding)]

Figure 23:
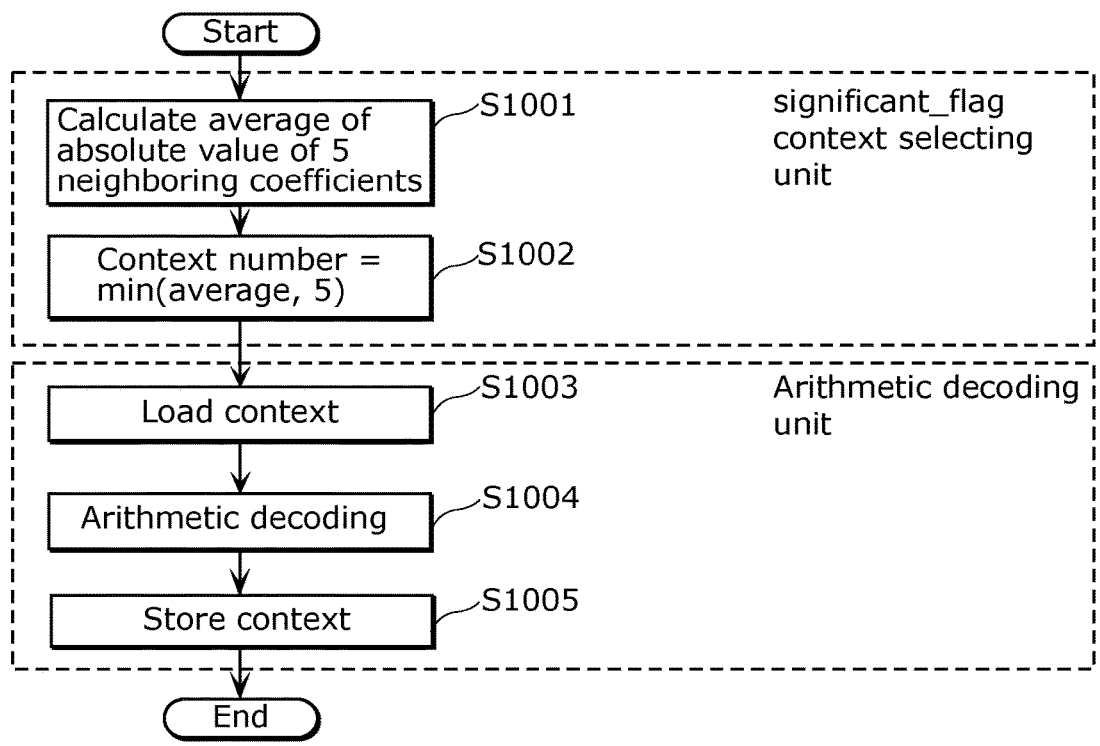
FIG. 23 is a flowchart illustrating significant_flag decoding according to Embodiment 3.

Next, a significant_flag decoding flow will be described with reference to FIG. 23.

(Step S1001 and Step S1002)

The significant_flag context selecting unit 2122 calculates an average of absolute values of five coefficients neighboring the current coefficient to be processed. The positions of the five neighboring coefficients are the same as those in Embodiment 1. The five neighboring coefficients are obtained from the coefficient absolute value memory 2110. Next, the significant_flag context selecting unit 2122 compares 5 and the average of the absolute values of the five neighboring coefficients, and sets a smaller one of the values as a context number.

(Step S1003 to Step S1005)

The arithmetic decoding unit 2121 loads, from the significant_flag context memory 2123, a context to be used according to the context number, executes arithmetic coding, and outputs the significant_flag. Then the arithmetic decoding unit 2121 stores the context updated by the arithmetic decoding to the significant_flag context memory 2123.

The image decoding method according to an aspect of present disclosure has been described above using Embodiment 3, and the image decoding method includes steps below.

The image decoding method is an image decoding method for decoding a bitstream generated by coding an image, the bitstream including a plurality of coefficient subsets each of which includes a plurality of frequency coefficients as coefficients each of which is replaced with a plurality of parameters and coded, the image decoding method comprising: selecting a context to be used in arithmetic coding, by referring to a value related to a coefficient neighboring a current coefficient to be decoded which is one of the coefficients included in each of the coefficient subsets (S1001); performing arithmetic decoding on a parameter corresponding to the current coefficient, using a symbol occurrence probability that is determined according to the selected context (S1004); reconstructing the current coefficient as a coefficient value, using the parameter that is arithmetically decoded (S914); generating a decoding block by combining the coefficient subsets each including the coefficients which are reconstructed (S917); generating a differential image by performing inverse frequency transformation on the decoding block (S802); generating a prediction image (S803); and generating a decoded image from the differential image and the prediction image (S803). In the performing of arithmetic decoding, the arithmetic decoding is performed, for each of the coefficients, on a related parameter among a plurality of parameters corresponding to the coefficient, the related parameter being a parameter related to a value which is referred to for selecting the context (S901 to A907), and the arithmetic decoding is performed, for each of the coefficient subsets, collectively on a plurality of unrelated parameters, among a plurality of parameters corresponding to the coefficients in the coefficient subset, the unrelated parameters being parameters not related to the value which is referred to for selecting the context (S913).

[Advantageous Effect]

As described above, according to Embodiment 3, it is possible to further provide deviation to the symbol occurrence probability by determining a context referring to not a neighboring coefficient parameter but a coefficient absolute value, thereby allowing decoding of a bitstream with enhanced coding efficiency. This has been accomplished by decoding, per coefficient, a parameter that is referred to by another coefficient; that is, a parameter related to a coefficient absolute value. To be more specific, data to be referred to needs to be present prior to data to be decoded. For example, the neighboring parameter to be referred to when decoding a coefficient needs to be already decoded. More specifically, the parameter related to the coefficient absolute value is decoded per coefficient, thereby allowing referring to a coefficient absolute value of an immediately before coefficient when decoding a next coefficient.

In addition, parameters which are not referred to by another coefficient are collectively decoded at the end in a coefficient sub-block, thereby achieving higher processing speed. More specifically, it is generally known that processing efficiency is enhanced by decoding the same parameters consecutively. For example, the types of contexts to be used are limited when the parameters are the same, and thus it is possible to load contexts in advance in a cache memory or a register to allow accessing at high speed. Furthermore, decoding logic is the same for the same parameters, and thus forming of pipeline processing is facilitated. In addition, it is possible to know the number of bits of a bitstream to be input prior to decoding and to eliminate the need to update a context, by collecting parameters of the bypass decoding in which a context is not used as in Embodiment 3, thereby making it possible to speed up the processing. Trade off exists between (i) which parameters are to be collected at the end and (ii) which parameters are to be made referable by another coefficient to improve coding efficiency as described above. In view of the above, the inventors have found that, coding efficiency of a Sign parameter (sign_flag) was not improved even when the Sign parameter was made referable by another coefficient, and thus collected only the Sign parameters at the end according to Embodiment 3.

Furthermore, it is possible to reduce the amount of coded data with almost none of image degradation, by eliminating the need to decode the Sign parameter of one coefficient. More specifically, the generated amount of coded data is reduced by not decoding the Sign parameters of one coefficient in a 4×4 coefficient block and determining the Sign parameters which are not decoded according to whether the sum of the coefficient absolute values in the 4×4 coefficient block is an even number or an odd number. Furthermore, the position of the last Sign parameter (the position of the non-zero coefficient) is clarified by collecting the Sign parameters at the end, thereby allowing deleting the last Sign parameter. When the Sign parameters are decoded per coefficient in the same manner as other parameters, it is hard to tell which of the coefficients is the last non-zero coefficient, and thus the coefficient of which the Sign parameters are not decoded cannot be found.

It is to be noted that, decoding is not performed on the sign_flag of the last non-zero coefficient in order of scanning according to Embodiment 3, however, the decoding is not always avoided, and performing/not-performing of the decoding may be switched according to the state of the flag or the coefficient value.

In addition, although five neighboring coefficients are referred to, there is no restriction on the number of coefficients to be referred to, and the number may be larger or smaller than five. Furthermore, a position distant from the current coefficient may be referred to. In addition, although an average of five neighboring coefficients is used, an intermediate value may be used instead of the average. Furthermore, although the average and five are compared and a smaller one of the values is set as the context number, the value to be compared with the average may be larger or smaller than five, and the average value itself may be set as the context number.

In addition, although the sum of the coefficient absolute value in the 4×4 coefficient block is used to determine the sign_flag of one coefficient SignTmp, a numerical value obtained by modifying the coefficient absolute value, such as "coefficient absolute value−1" or "coefficient absolute value−2", may be used instead of the coefficient absolute value.

Furthermore, although the Sign parameter of the last non-zero coefficient in order of scanning in the 4×4 coefficient block is not decoded, the subject is not necessarily the last non-zero coefficient, and the first non-zero coefficient or the Sign parameter of the intermediate non-zero coefficient may be set as the subject.

In addition, although a coefficient is represented using five parameters of significant_flag, greater1_flag, greater2_flag, level_minus3, and sign_flag, parameters to be used are not limited to the five parameters, and for example, a coefficient may be represented using three parameters of significant_flag, level_minus1, and sign_flag.

In addition, although the bypass decoding is performed on the level_minus3 and the sign_flag, the bypass decoding may also be performed on the significant_flag, the greater1_flag, and so on.

In addition, as to a coefficient to be referred to, coefficients outside the decoding block to be processed may be avoided from being referred to, or not only spatially neighboring coefficients but also temporally neighboring coefficients may be referred to. For example, a coefficient which is at the same position as the current coefficient in the picture immediately before may be referred to.

In addition, although the size of the decoding block is 32×32 at a maximum and 4×4 at a minimum, the size may be larger or smaller. Furthermore, the size of the decoding block may be fixed.

In addition, although the decoding block is divided into 4×4 coefficient blocks, the decoding block may be divided into 8×8 or 2×2 coefficient blocks, or into 4×8 rectangle. Furthermore, the decoding block may be divided not per block but for every 16 coefficients in order of scanning, for example.

Embodiment 4

[Overall Configuration and Operation (Entirety)]

The overall configuration and the overall operation of a video decoding apparatus according to Embodiment 4 are the same as those in Embodiment 3, and thus descriptions for them will be omitted.

[Configuration of the Coefficient Coding Unit]

Figure 24:
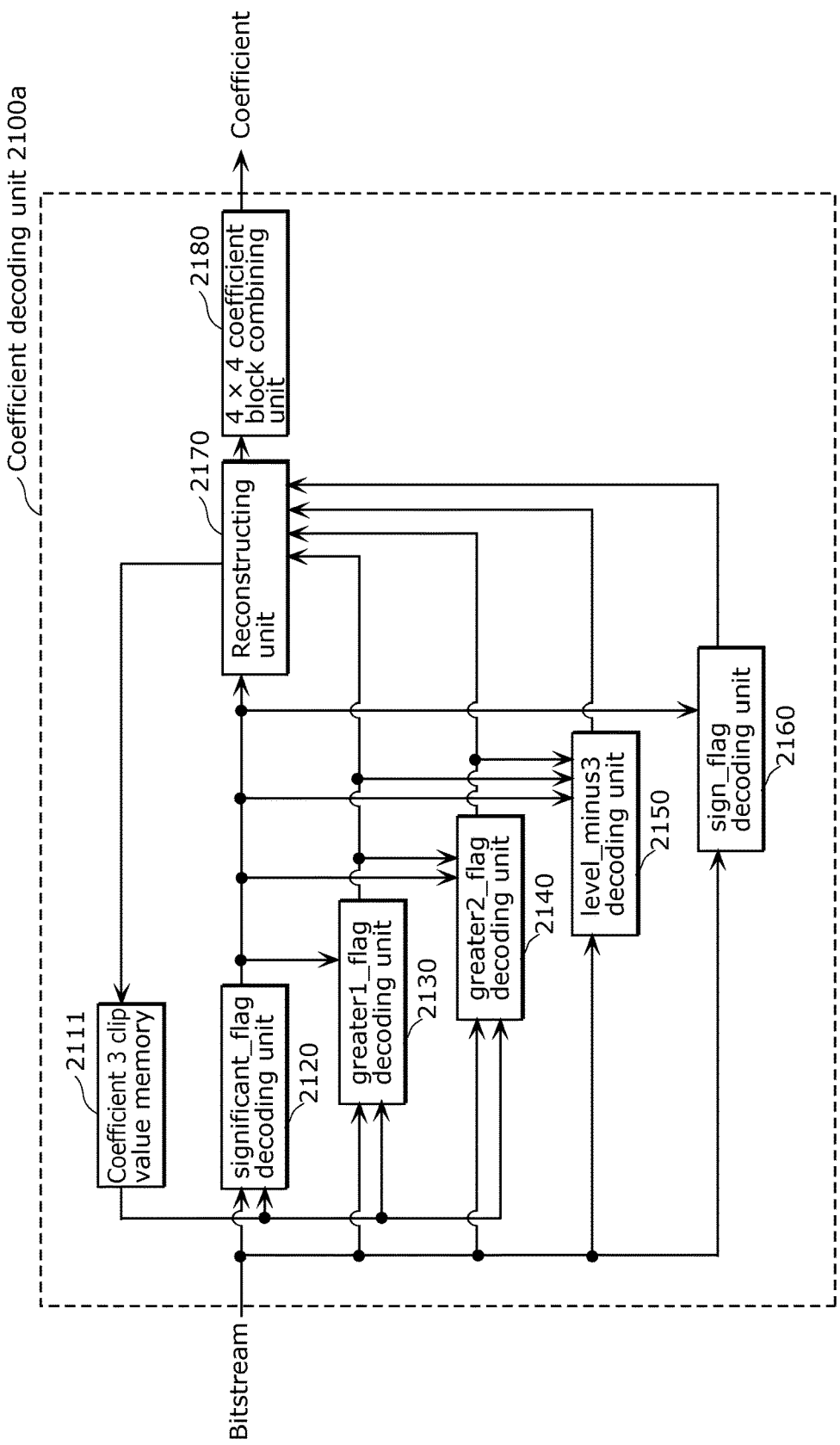
FIG. 24 is a diagram illustrating an internal configuration of a coefficient decoding unit according to Embodiment 4.

FIG. 24 illustrates an internal configuration of a coefficient decoding unit according to Embodiment 4.

A coefficient decoding unit 2100a includes: a coefficient 3 clip value memory 2111; a significant_flag decoding unit 2120; a greater1_flag decoding unit 2130; a greater2_flag decoding unit 2140; a level_minus3 decoding unit 2150; a sign_flag decoding unit 2160; a reconstructing unit 2170; and a 4×4 coefficient block combining unit 2180. In other words, the coefficient decoding unit 2100a according to Embodiment 4 has the same structural elements as those in Embodiment 3 other than that the coefficient coding unit 2100a includes the coefficient 3 clip value memory 2111 instead of the coefficient absolute value memory 2110 of Embodiment 3.

[Operation (Coefficient Coding)]

Figure 25:
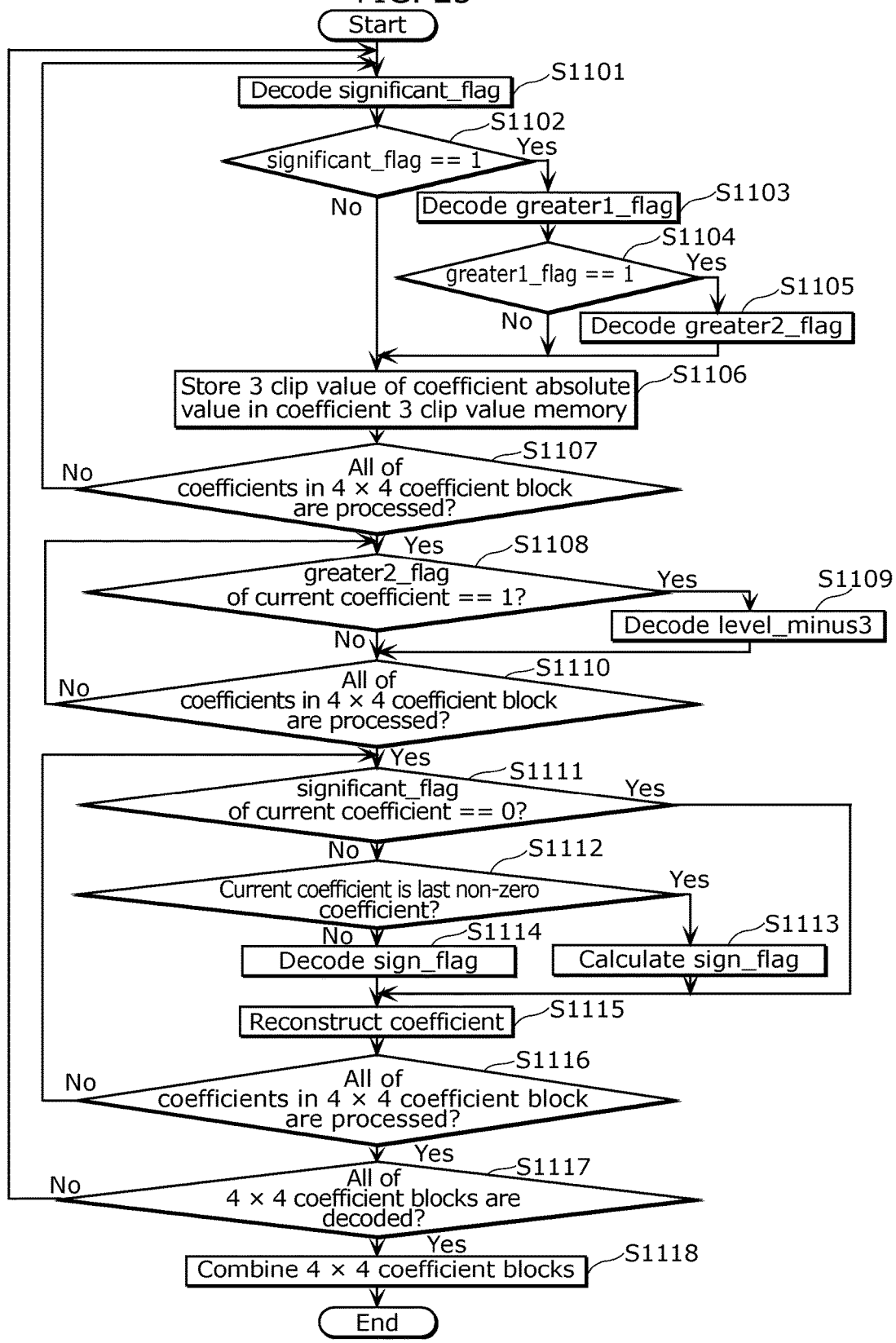
FIG. 25 is a flowchart illustrating coefficient decoding according to Embodiment 4.

Next, a coefficient decoding flow will be described with reference to FIG. 25. The coefficient decoding flow is the same as that in Embodiment 3 other than Step S1106 and Step S1108 to Step S1110, and thus description for Steps other than those will be omitted. In other words, Steps S1101 to S1105, S1107, and S1111 to S1118 according to Embodiment 4 are equivalent to Steps S901 to S905, S909, and S910 to S917 according to Embodiment 3.

(Step S1106)

The reconstructing unit 2170 obtains a value resulting from clipping a coefficient absolute value by 3, using the decoded significant_flag, greater1_flag, and greater2_flag. FIG. 28 illustrates the relationship between a parameter value and the value resulting from clipping by 3. It is to be noted that a value resulting from clipping the coefficient absolute value by 3 is called a 3 clip value. Then the reconstructing unit 2170 stores the 3 clip value in the 3 clip value memory 2111 so that the 3 clip value is used afterward for referring to a neighboring coefficient.

(Step S1108 to Step S1110)

The level_minus3 decoding unit 2150 decodes the level_minus3 of a coefficient having the greater2_flag indicating 1. The level_minus3 coding unit 2150 repeats this process until all of the coefficients in the 4×4 coefficient block are processed. The level_minus3 is decoded through the bypass decoding in which a context is not used.

The following describes in detail the significant_flag decoding unit 2120.

[Configuration of Significant_Flag Decoding Unit]

Figure 26:
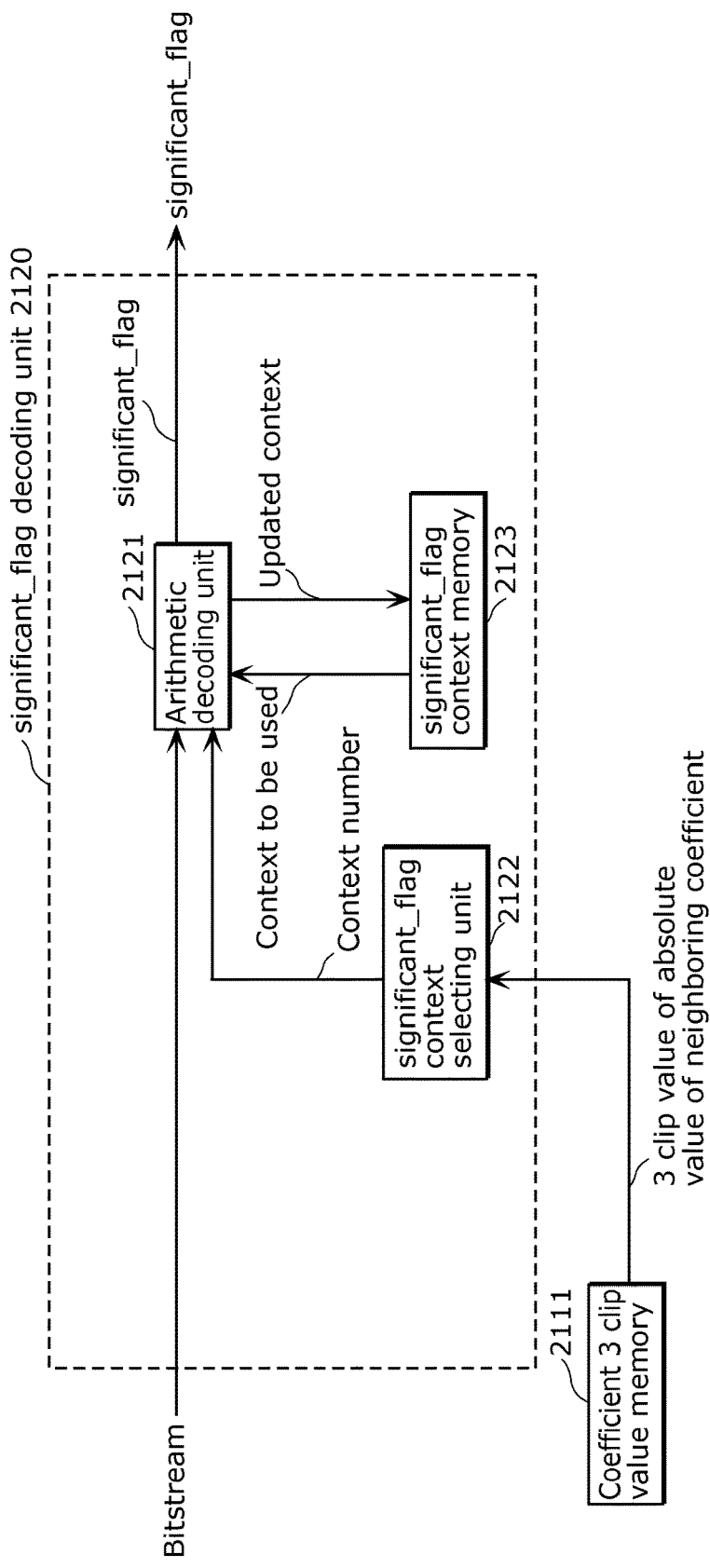
FIG. 26 is a diagram illustrating an internal configuration of a significant_flag decoding unit according to Embodiment 4.

FIG. 26 illustrates an internal configuration of the significant_flag decoding unit 2120.

The significant_flag decoding unit 2120 includes: a significant_flag context selecting unit 2122; an arithmetic decoding unit 2121; and a significant_flag context memory 2123 as with Embodiment 3. Here, the significant_flag context selecting unit 2122 according to Embodiment 4 uses the coefficient 3 clip value memory 2111 instead of the coefficient absolute value memory 2110 of Embodiment 3.

[Operation (Significant_Flag Decoding)]

Figure 27:
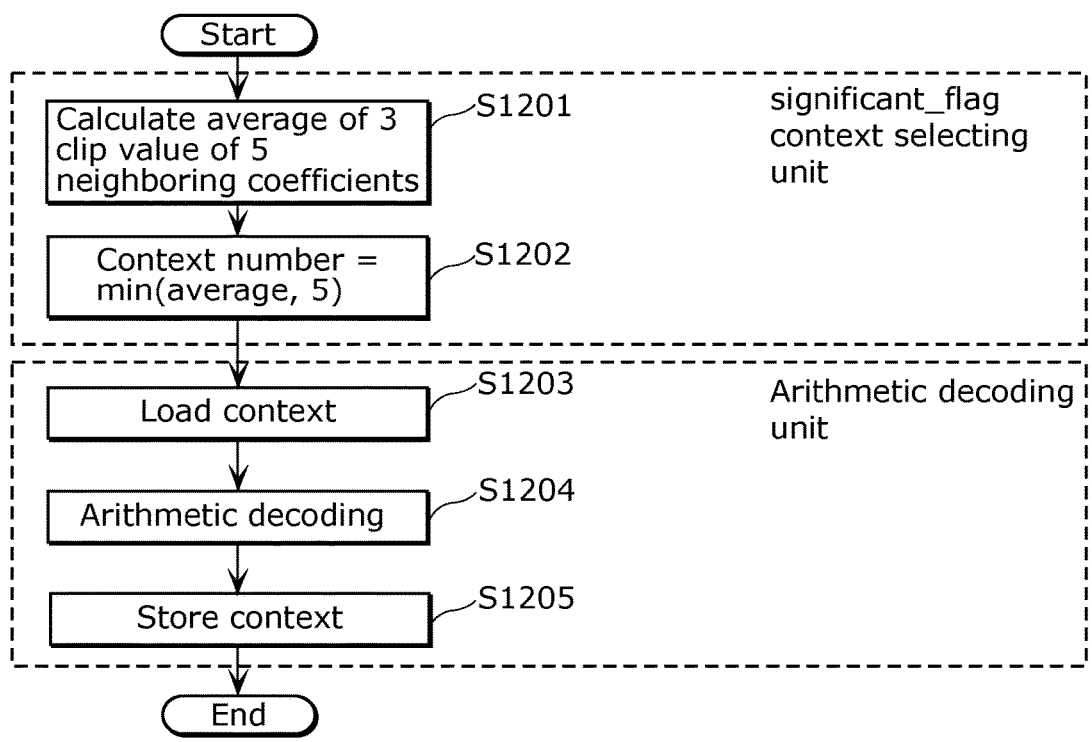
FIG. 27 is a flowchart illustrating significant_flag decoding according to Embodiment 4.

Next, a significant_flag decoding flow will be described with reference to FIG. 27. The significant_flag decoding flow is the same as that in Embodiment 3 other than Step S1201, and thus description for Steps other than that will be omitted. In other words, Steps S1201 to S1205 are equivalent to Steps S1002 to S1005 according to Embodiment 3.

(Step S1201)

The significant_flag context selecting unit 2122 calculates an average of 3 clip values of five coefficients neighboring the current coefficient to be processed. The positions of the five neighboring coefficients are the same as those in Embodiment 3. The 3 clip values of the five neighboring coefficients are obtained from the coefficient 3 clip value memory 2111.

[Advantageous Effect]

As described above, according to Embodiment 4, it is possible to further provide deviation to the symbol occurrence probability by determining a context referring to not a neighboring coefficient parameter but a value obtained by clipping a coefficient absolute value by 3, thereby allowing decoding of a bitstream with enhanced coding efficiency. This has been accomplished by coding, per coefficient, a parameter that is referred to by another coefficient; that is, a parameter related to a value obtained by clipping the coefficient absolute value by 3.

In addition, it is possible to reduce the capacity of a reference memory by using, for reference, not the coefficient value but the value obtained by clipping a coefficient absolute value by 3. According to the current HEVC standard, a coefficient value is data of 16 bits, and thus 16 bits are required per coefficient for referring to the coefficient value. However, only 2 bits are necessary per coefficient when the value obtained by clipping the coefficient absolute value by 3 is used for reference, making it possible to reduce the capacity of the reference memory by approximately 88%.

In addition, parameters which are not referred to by another coefficient are collectively decoded at the end in a coefficient sub-block, thereby achieving higher processing speed. More specifically, it is generally known that processing efficiency is enhanced by decoding the same parameters consecutively. For example, the types of contexts to be used are limited when the parameters are the same, and thus it is possible to load contexts in advance in a cache memory or a register to allow accessing at high speed. Furthermore, decoding logic is the same for the same parameters, and thus forming of pipeline processing is facilitated.

In addition, it is possible to know the number of bits of a bitstream to be input prior to decoding and to eliminate the need to update a context, by collecting parameters of the bypass decoding in which a context is not used as in Embodiment 4, thereby making it possible to speed up the processing. Trade off exists between (i) which parameters are to be collected at the end and (ii) which parameters are to be made referable by another coefficient to improve coding efficiency as described above. In view of the above, the inventors have found that, coding efficiency of the Sign parameter (sign_flag) was not improved even when the Sign parameter was made referable by another coefficient, and thus collected the Sign parameters at the end. Furthermore, the inventors also collected the level_minus3 at the end in view of the facts 1 to 3 below. That is, the first fact is that since coding of the level_minus3 is performed through the bypass coding, the advantageous effect of speeding up processing increases when the parameters are collected. In addition, the second fact is that the capacity of the reference memory is enlarged when the parameter is made referable. Furthermore, the third fact, which is the fact found by the inventors, is that the coding efficiency is not improved that much by making the parameters referable.

Furthermore, it is possible to reduce the amount of coded data with almost none of image degradation, by eliminating the need to decode the Sign parameter of one coefficient. More specifically, the generated amount of coded data is reduced by not decoding the Sign parameters of one coefficient in a 4×4 coefficient block and determining the Sign parameters which are not decoded according to whether the sum of the coefficient absolute values in the 4×4 coefficient block is an even number or an odd number. Furthermore, the position of the last Sign parameter (the position of the non-zero coefficient) is clarified by collecting the Sign parameters at the end, thereby allowing deleting the last Sign parameter. When the Sign parameters are decoded per coefficient in the same manner as other parameters, it is hard to tell which of the coefficients is the last non-zero coefficient, and thus the coefficient of which the Sign parameters are not decoded cannot be found.

It is to be noted that, although the value obtained by clipping the coefficient absolute value by 3 is referred to by another coefficient according to Embodiment 4, greater3_flag which indicates that the coefficient absolute value is greater than or equal to 4 may newly be provided and a value obtained by clipping the coefficient absolute value by 4 may be made referable by the other coefficient.

In addition, parameters of the greater2_flag may be collected in the 4×4 coefficient block as with the level_minus3, and a value obtained by clipping by 2 may be made referable by the other coefficient.

In addition, decoding is not performed on the sign_flag of the last non-zero coefficient in order of scanning, however, the decoding is not always avoided, and performing/not-performing of the decoding may be switched according to the state of the flag or the coefficient value.

In addition, although five neighboring coefficients are referred to, there is no restriction on the number of coefficients to be referred to, and the number may be larger or smaller than five.

Furthermore, a position distant from the current coefficient may be referred to. In addition, although an average of five neighboring coefficients is used, an intermediate value may be used instead of the average. Furthermore, although the average and five are compared and a smaller one of the values is set as the context number, the value to be compared with the average may be larger or smaller than five, and the average value itself may be set as the context number.

In addition, although the sum of the coefficient absolute value in the 4×4 coefficient block is used to determine the sign_flag of one coefficient SignTmp, a numerical value obtained by modifying the coefficient absolute value, such as "coefficient absolute value−1" or "coefficient absolute value−2", may be used instead of the coefficient absolute value.

Furthermore, although the Sign parameter of the last non-zero coefficient in order of scanning in the 4×4 coefficient block is not decoded, the subject is not necessarily the last non-zero coefficient, and the first non-zero coefficient or the Sign parameter of the intermediate non-zero coefficient may be set as the subject.

In addition, although a coefficient is represented using five parameters of significant_flag, greater1_flag, greater2_flag, level_minus3, and sign_flag, parameters to be used are not limited to the five parameters, and for example, a coefficient may be represented using three parameters of significant_flag, level_minus1, and sign_flag.

In addition, although the bypass decoding is performed on the level_minus3 and the sign_flag, the bypass decoding may also be performed on the significant_flag, the greater1_flag, and so on.

In addition, as to a coefficient to be referred to, coefficients outside the decoding block to be processed may be avoided from being referred to, or not only spatially neighboring coefficients but also temporally neighboring coefficients may be referred to. For example, a coefficient which is at the same position as the current coefficient in the picture immediately before may be referred to.

In addition, although the size of the decoding block is 32×32 at a maximum and 4×4 at a minimum, the size may be larger or smaller. Furthermore, the size of the decoding block may be fixed.

In addition, although the decoding block is divided into 4×4 coefficient blocks, the decoding block may be divided into 8×8 or 2×2 coefficient blocks, or into 4×8 rectangle. Furthermore, the decoding block may be divided not per block but for every 16 coefficients in order of scanning, for example.

In each of the above-described embodiments, each of the functional blocks can generally be implemented by an MPU (Micro-Processing Unit), a memory, and the like. In addition, processes performed by each of the functional blocks can be usually accomplished by software (program), and the software is recorded on a recording medium such as a ROM. Such software may be distributed through downloading or the like, or may be recorded on a recording medium such as a CD-ROM to be distributed. It is to be noted that each of the functional blocks can naturally be implemented by hardware (special circuit).

In addition, the processing described in each of the embodiments may be accomplished by integrated processing using a single apparatus (system), or may be accomplished by distributed processing using a plurality of apparatuses. In addition, a computer which executes the above-described program may be a single computer or may be a plurality of computers. Therefore, either integrated processing or distributed processing may be performed.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, a software that accomplishes the image coding method and the like according to each of the above-described embodiments is a program as below.

That is, the program causes a computer to execute the image coding method below. The image coding method is an image coding method comprising: dividing the current image into a plurality of coding blocks; generating a prediction image; generating a differential image from the prediction image and a corresponding one of the coding blocks; generating a plurality of coefficients by performing frequency transformation on the differential image; dividing a set including the coefficients into a plurality of coefficient subsets; replacing each of the coefficients in each of the coefficient subsets with a plurality of parameters; selecting a context to be used in arithmetic coding, by referring to a value related to a coefficient neighboring a current coefficient to be coded which is one of the coefficients included in the coefficient subset; and performing arithmetic coding on a parameter corresponding to the current coefficient, using a symbol occurrence probability that is determined according to the selected context, wherein in the performing of arithmetic coding, the arithmetic coding is performed, for each of the coefficients, on a related parameter among a plurality of parameters corresponding to the coefficient, the related parameter being a parameter related to a value which is referred to for selecting the context, and the arithmetic coding is performed, for each of the coefficient subsets, collectively on a plurality of unrelated parameters, among a plurality of parameters corresponding to the coefficients in the coefficient subset, the unrelated parameters being parameters not related to the value which is referred to for selecting the context.

In addition, the program causes a computer to execute the image decoding method below. The image decoding method is an image decoding method for decoding a bitstream generated by coding an image, the bitstream including a plurality of coefficient subsets each of which includes a plurality of frequency coefficients as coefficients each of which is replaced with a plurality of parameters and coded, the image decoding method comprising: selecting a context to be used in arithmetic coding, by referring to a value related to a coefficient neighboring a current coefficient to be decoded which is one of the coefficients included in each of the coefficient subsets; performing arithmetic decoding on a parameter corresponding to the current coefficient, using a symbol occurrence probability that is determined according to the selected context; reconstructing the current coefficient as a coefficient value, using the parameter that is arithmetically decoded; generating a decoding block by combining the coefficient subsets each including the coefficients which are reconstructed; generating a differential image by performing inverse frequency transformation on the decoding block; generating a prediction image; and generating a decoded image from the differential image and the prediction image, wherein in the performing of arithmetic decoding, the arithmetic decoding is performed, for each of the coefficients, on a related parameter among a plurality of parameters corresponding to the coefficient, the related parameter being a parameter related to a value which is referred to for selecting the context, and the arithmetic decoding is performed, for each of the coefficient subsets, collectively on a plurality of unrelated parameters, among a plurality of parameters corresponding to the coefficients in the coefficient subset, the unrelated parameters being parameters not related to the value which is referred to for selecting the context.

It should be understood that the present disclosure is not limited by the above-described embodiments, and various modifications may be made which are also included within the scope of the Claims of the present application. More specifically, the image coding method and the image decoding method according to a plurality of aspects have been described based on the embodiments; however, the present disclosure is not limited to these embodiments. Other forms in which various modifications apparent to those skilled in the art are applied to the embodiments, or forms structured by combining structural elements of different embodiments may be included within the scope of the plurality of aspects, unless such changes and modifications depart from the scope of the present disclosure.

Embodiment 5

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 29:
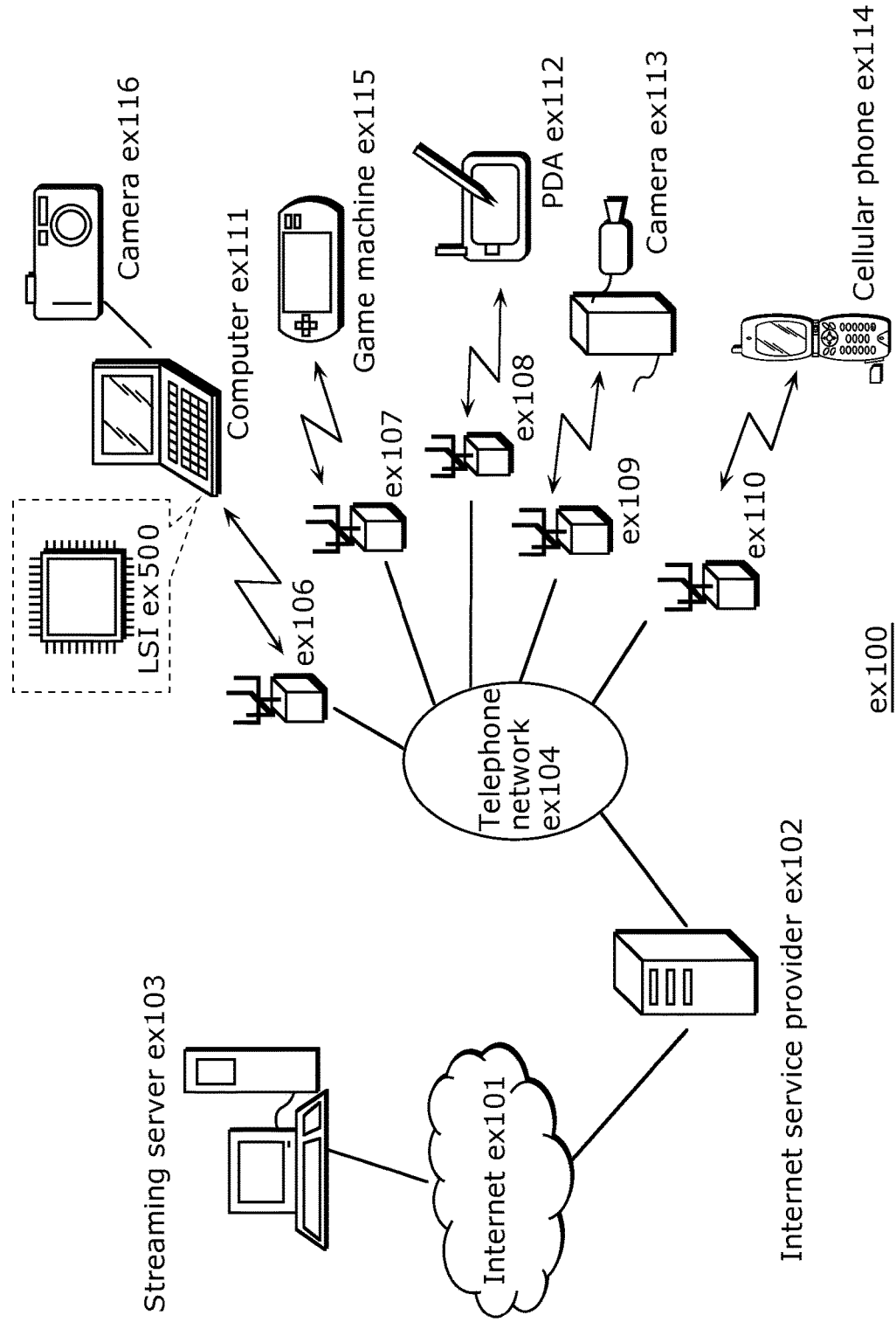
FIG. 29 shows an overall configuration of a content providing system for implementing content distribution services.

FIG. 29 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 29, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 30:
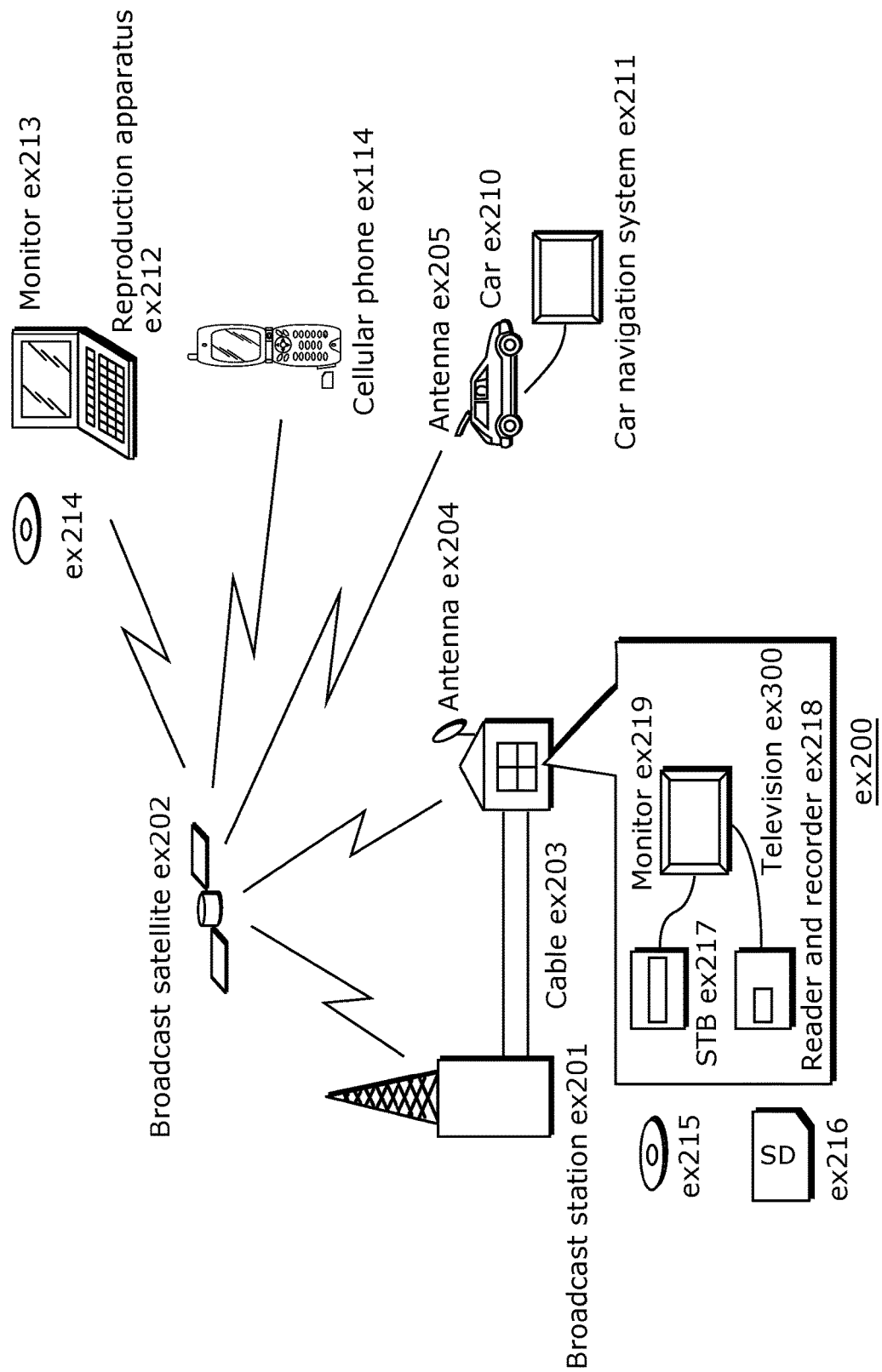
FIG. 30 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 30. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 31:
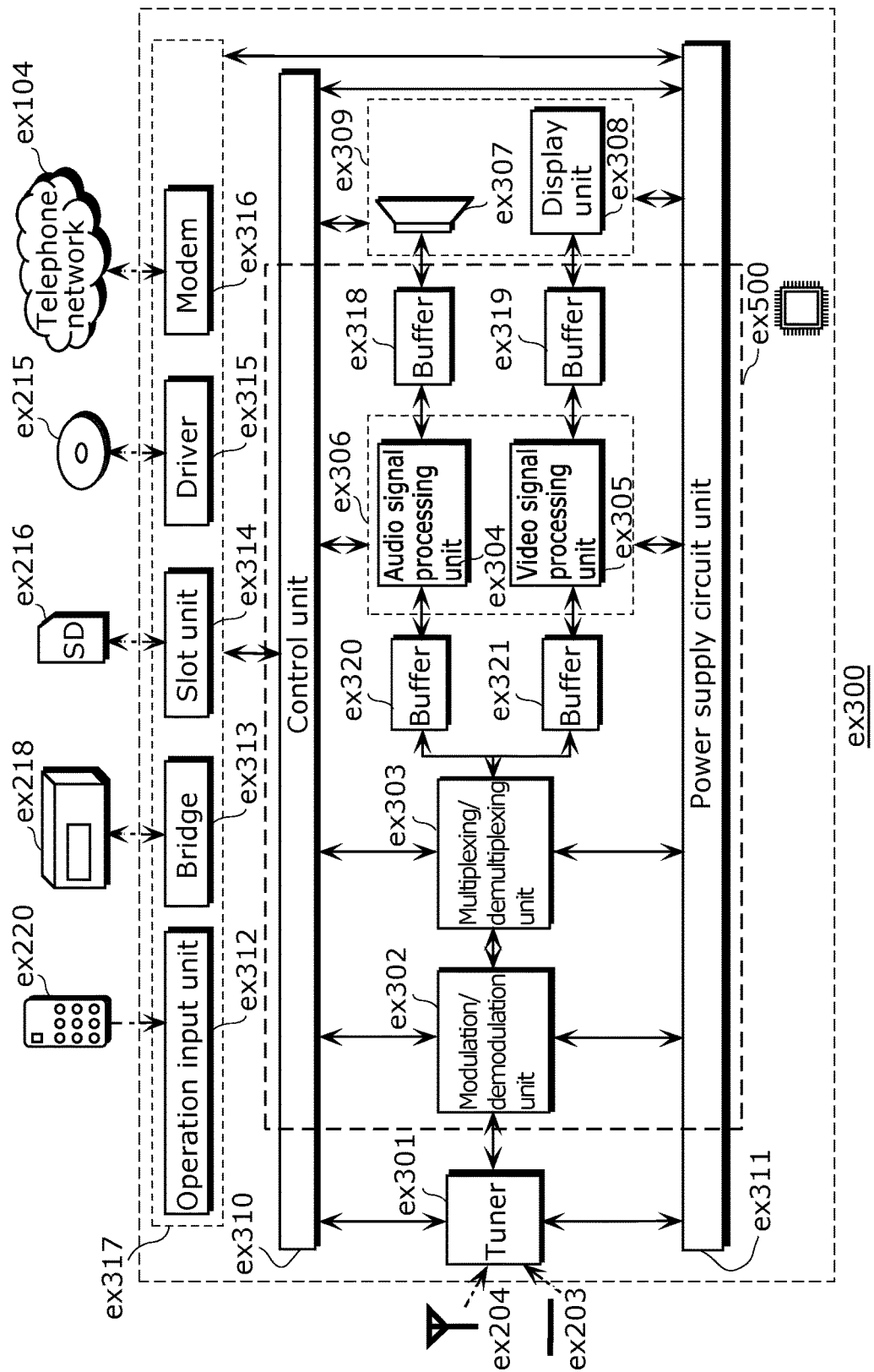
FIG. 31 shows a block diagram illustrating an example of a configuration of a television.

FIG. 31 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 32:
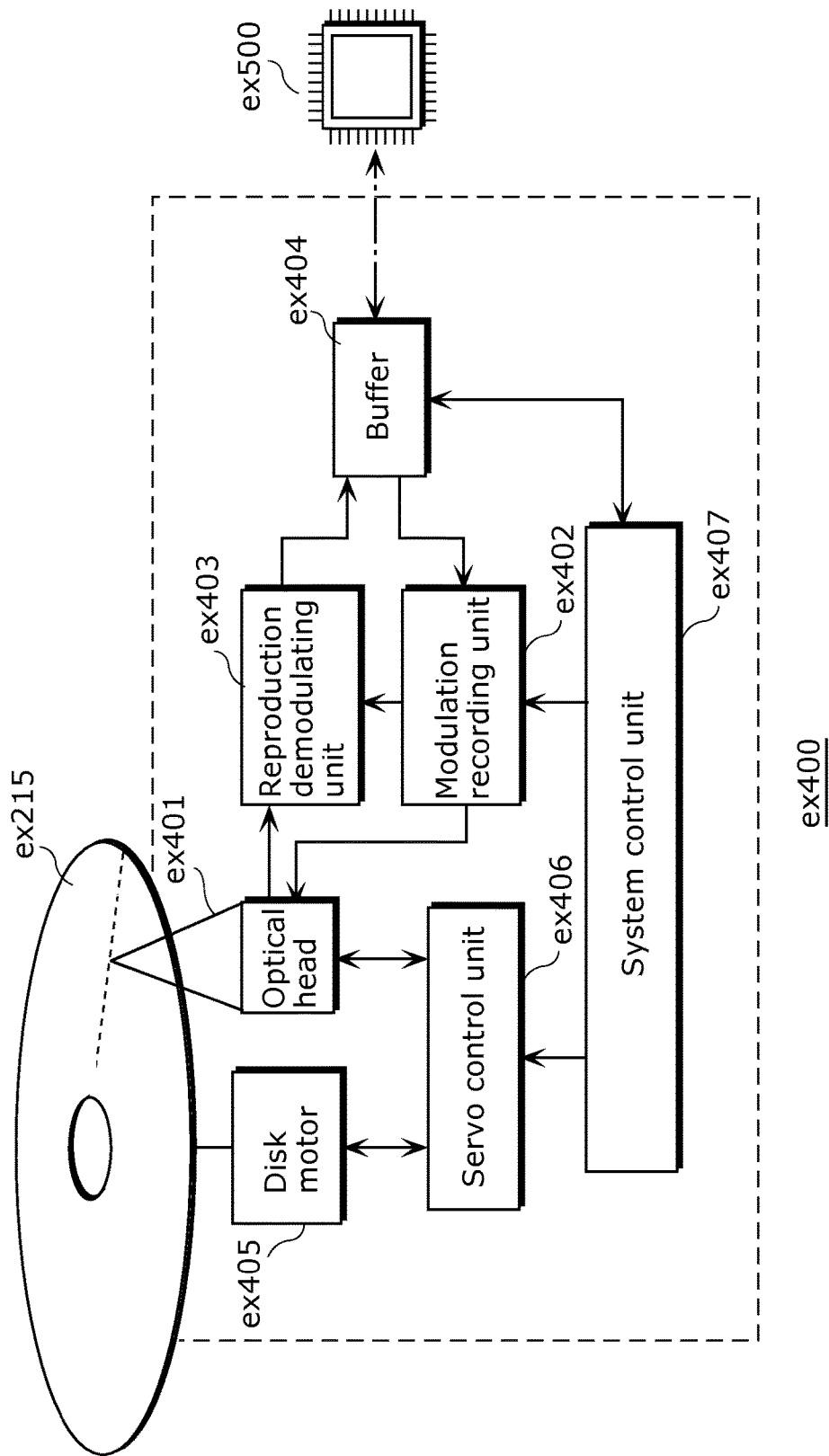
FIG. 32 shows a block diagram illustrating an example of a configuration of an information reproducing/recording unit that reads and writes information from and on a recording medium that is an optical disk.

As an example, FIG. 32 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 33:
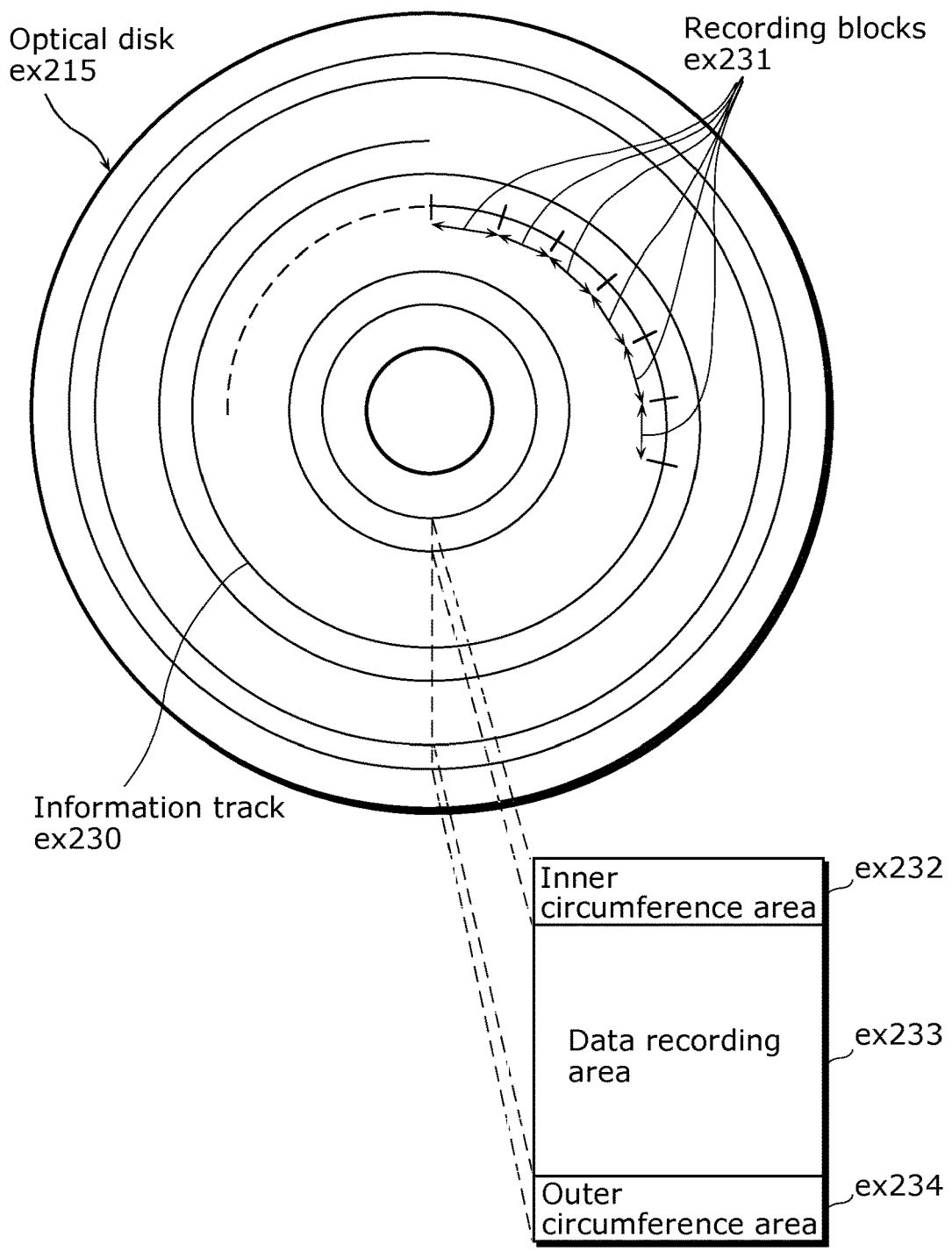
FIG. 33 is a diagram showing an example of a configuration of a recording medium that is an optical disk.

FIG. 33 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 31. The same will be true for the configuration of the computer ex111, the cellular phone ex114, and others.

Figure 34A:
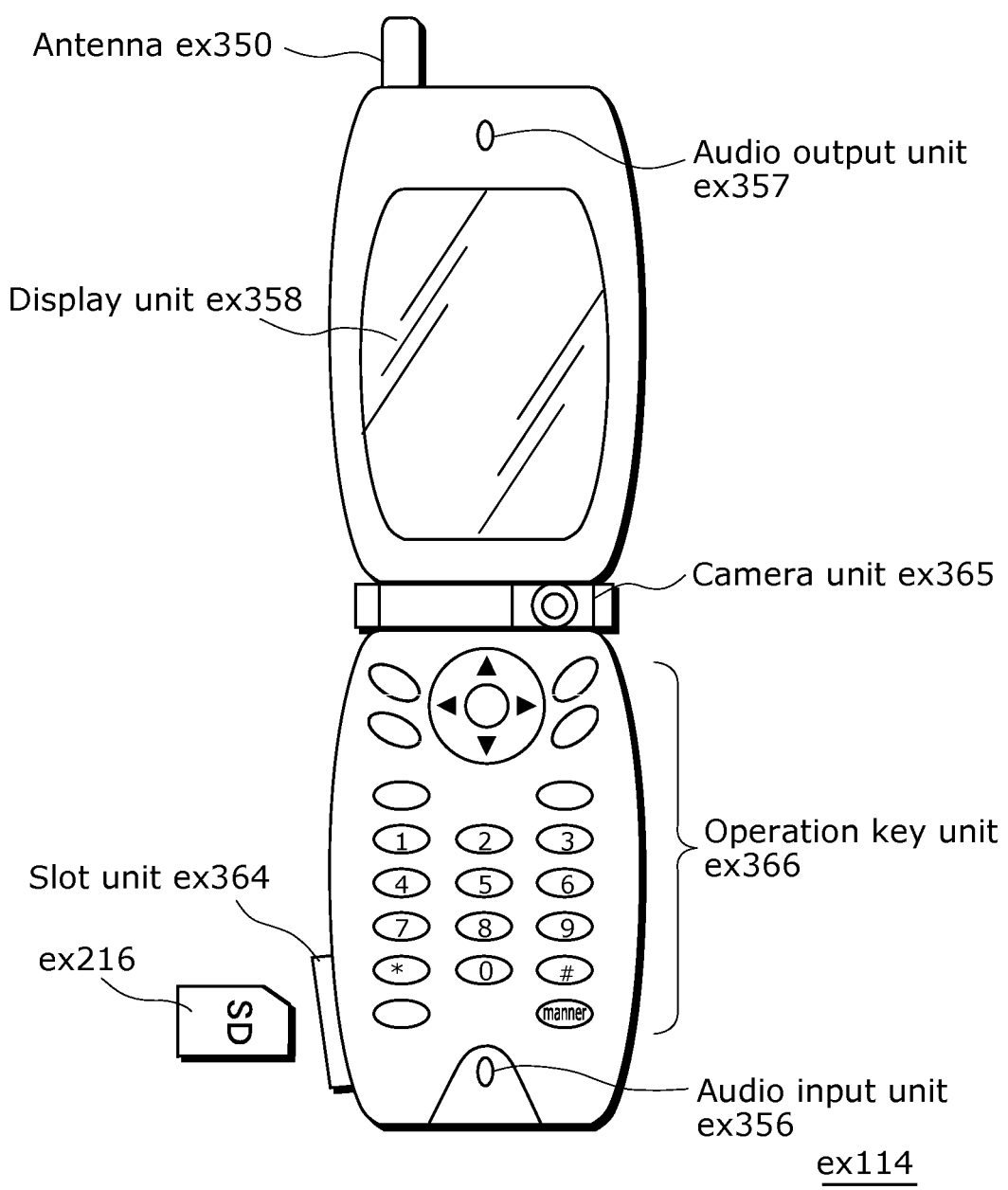
FIG. 34A shows an example of a cellular phone.

FIG. 34A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 34B:
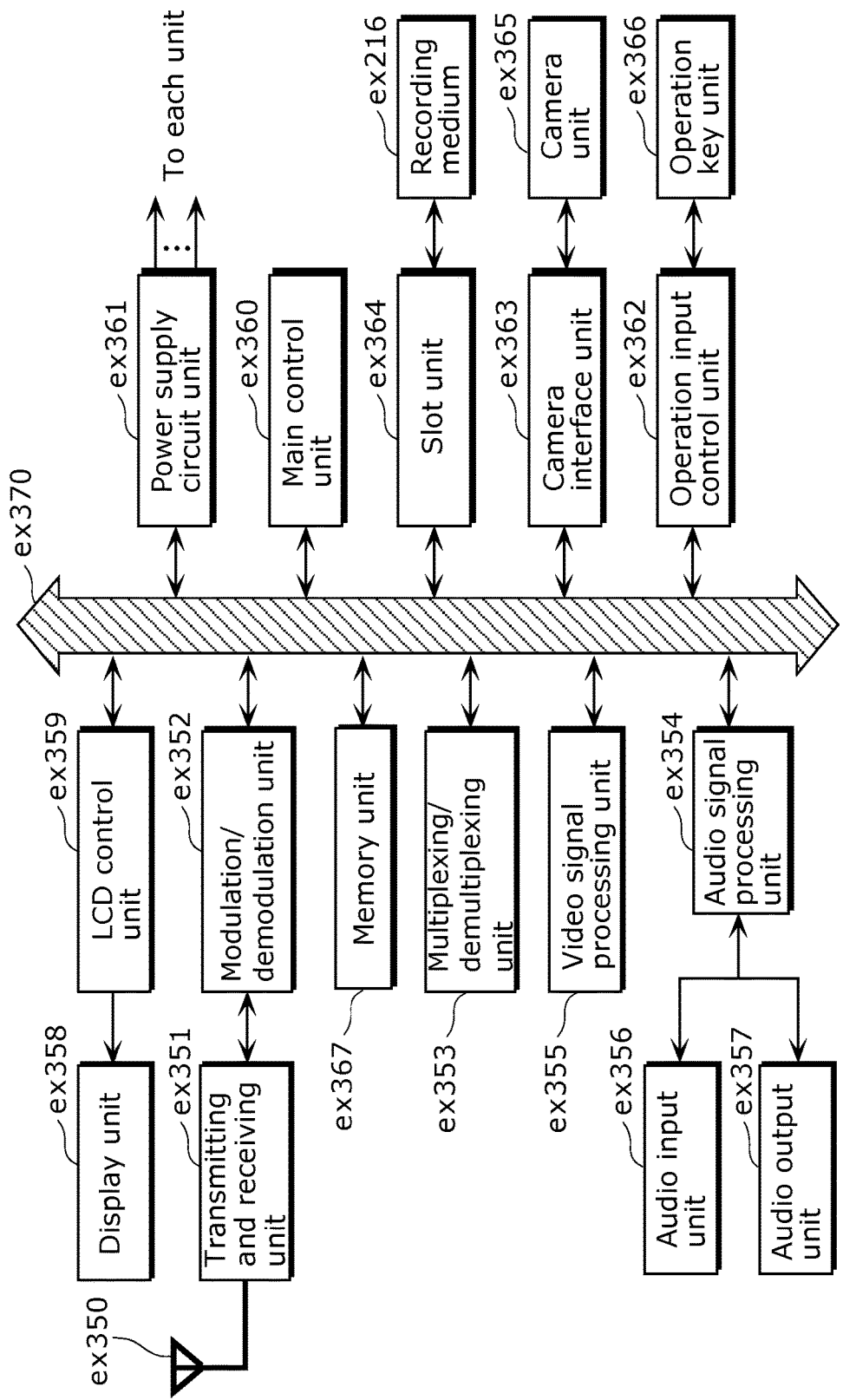
FIG. 34B is a block diagram showing an example of a configuration of a cellular phone.

Next, an example of a configuration of the cellular phone ex114 will be described with reference to FIG. 34B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 6

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 35:
FIG. 35 illustrates a structure of multiplexed data.

FIG. 35 illustrates a structure of the multiplexed data. As illustrated in FIG. 35, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 36:
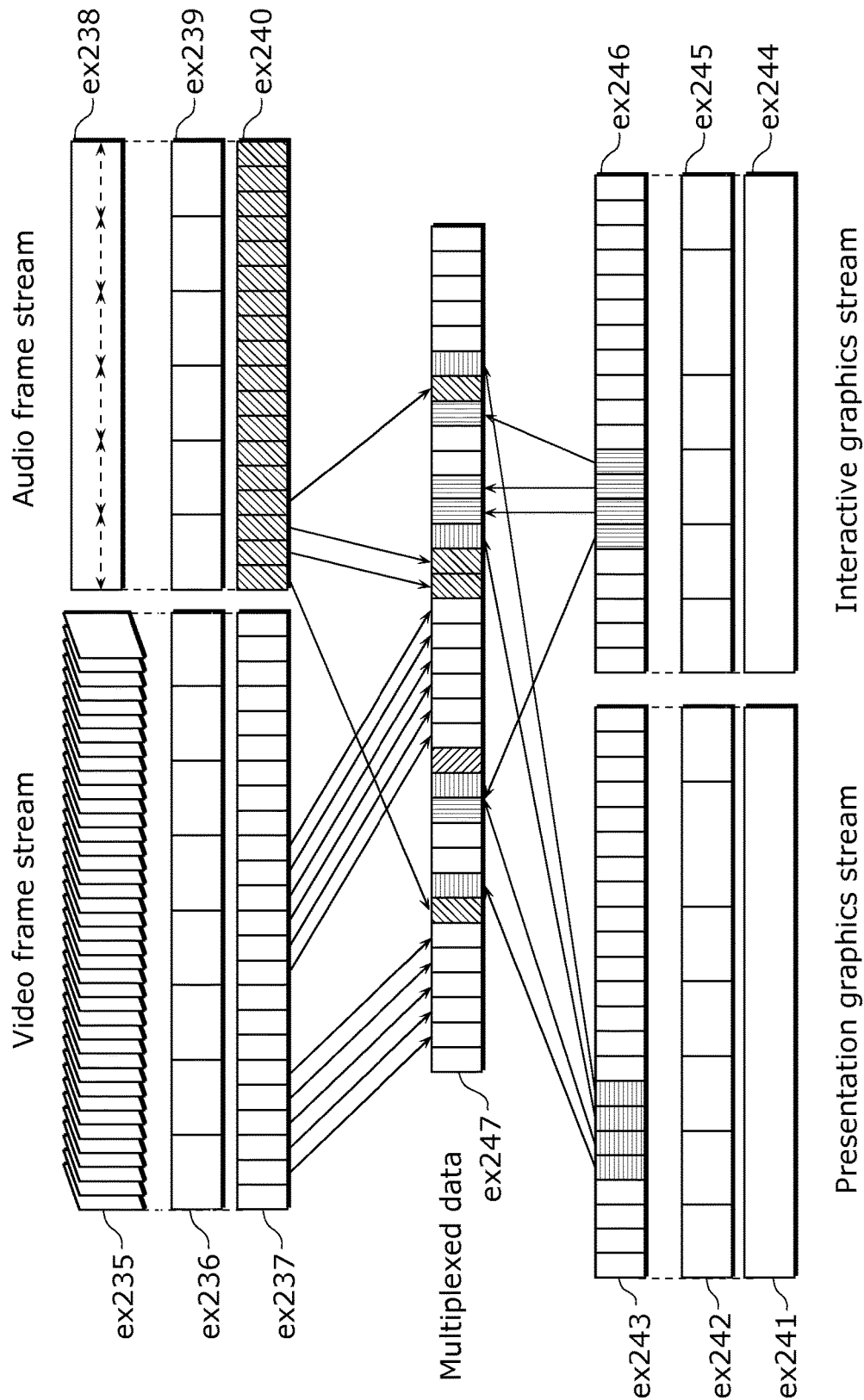
FIG. 36 schematically shows how each stream is multiplexed in multiplexed data.

FIG. 36 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 37:
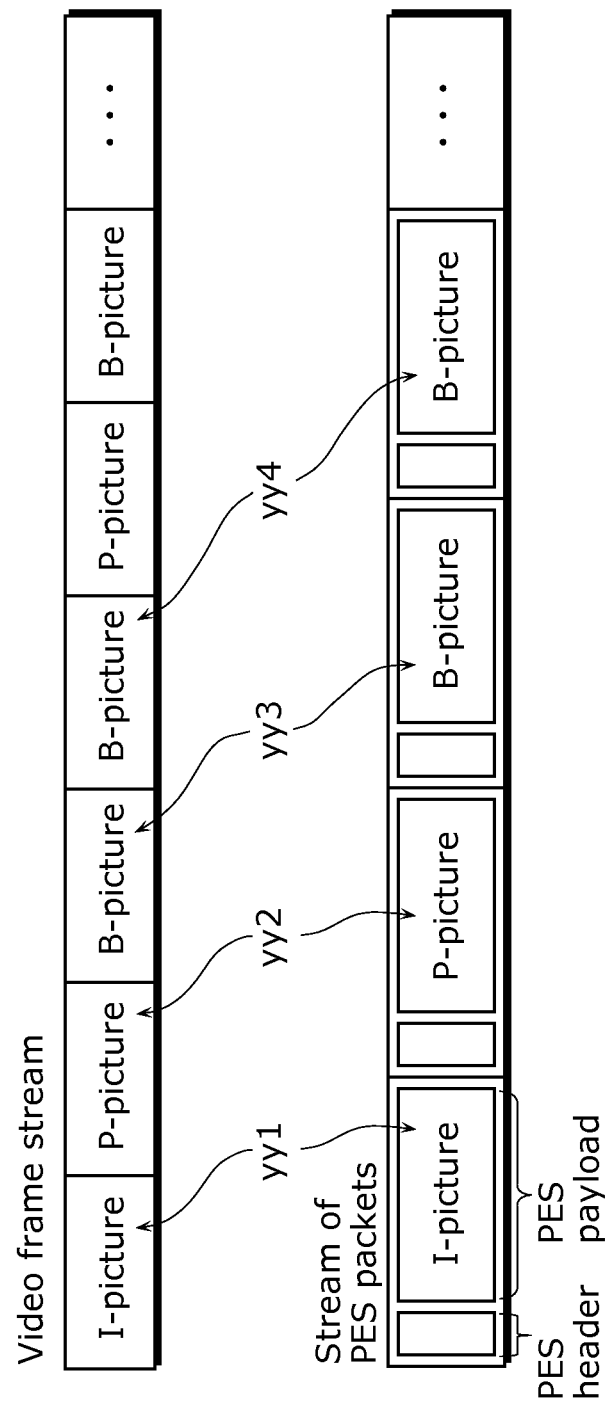
FIG. 37 shows how a video stream is stored in a stream of PES packets in more detail.

FIG. 37 illustrates how a video stream is stored in a stream of PES packets in more detail. The first bar in FIG. 37 shows a video frame stream in a video stream. The second bar shows the stream of PES packets. As indicated by arrows denoted as yy1, yy2, yy3, and yy4 in FIG. 37, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 38 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 38. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 39:
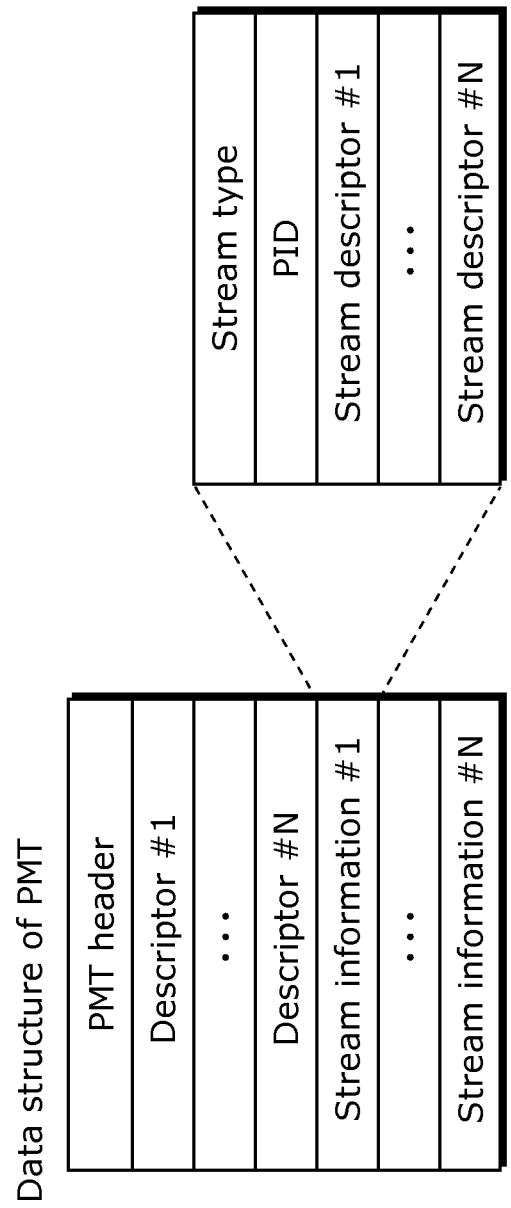
FIG. 39 shows a data structure of a PMT.

FIG. 39 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 40:
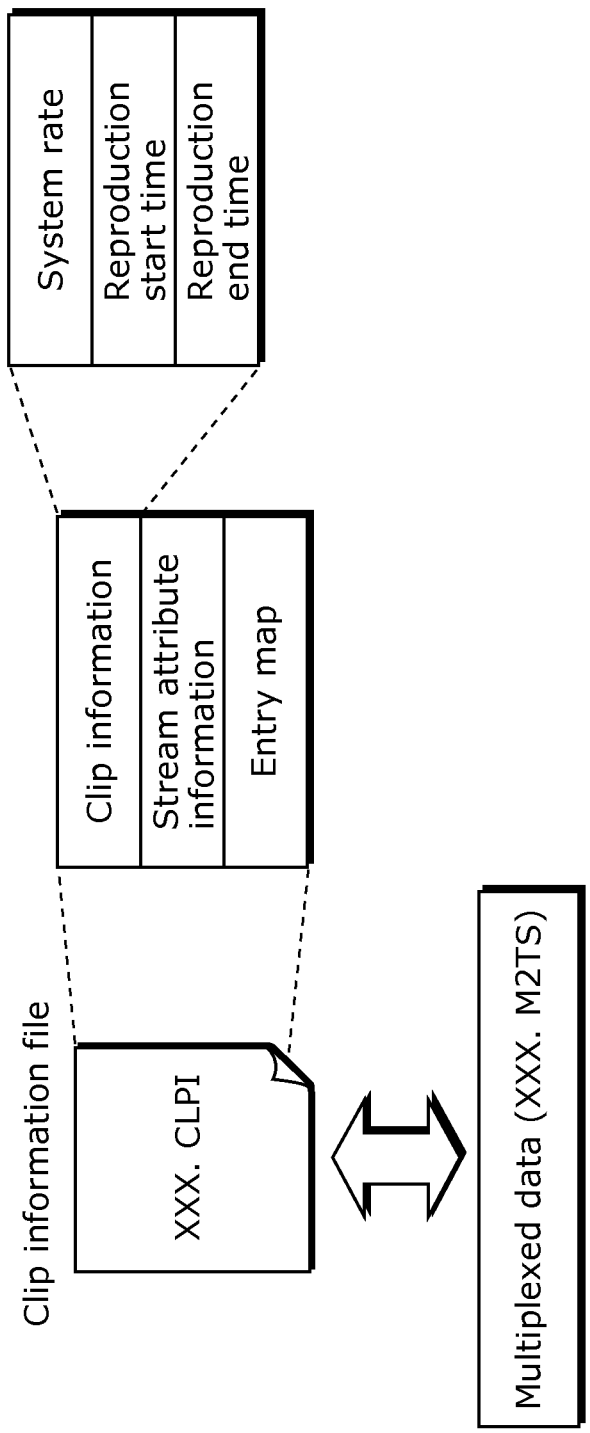
FIG. 40 shows an internal structure of multiplexed data information.

Each of the multiplexed data information files is management information of the multiplexed data as shown in FIG. 40. The multiplexed data information files are in one to one correspondence with the multiplexed data, and each of the files includes multiplexed data information, stream attribute information, and an entry map.

As illustrated in FIG. 40, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 41:
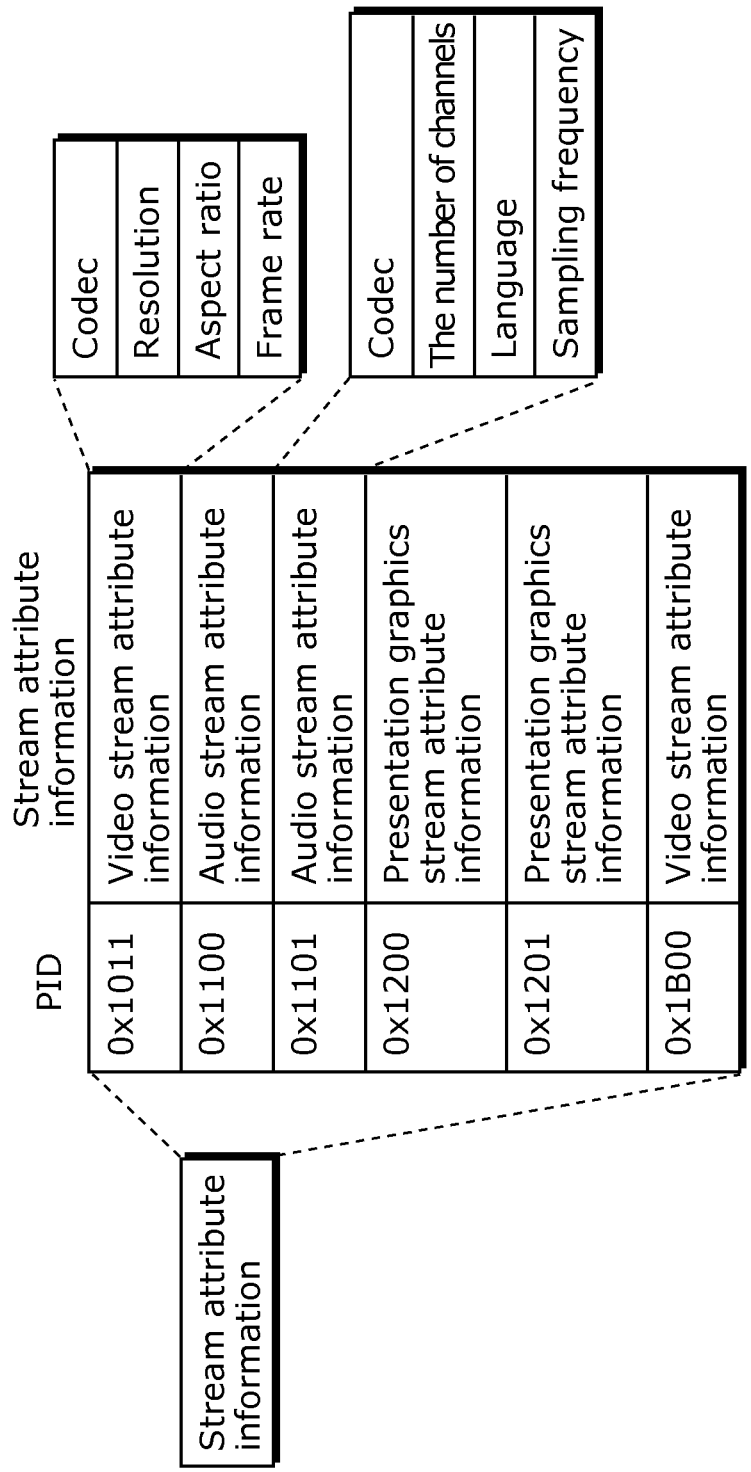
FIG. 41 shows an internal structure of stream attribute information.

As shown in FIG. 41, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 42:
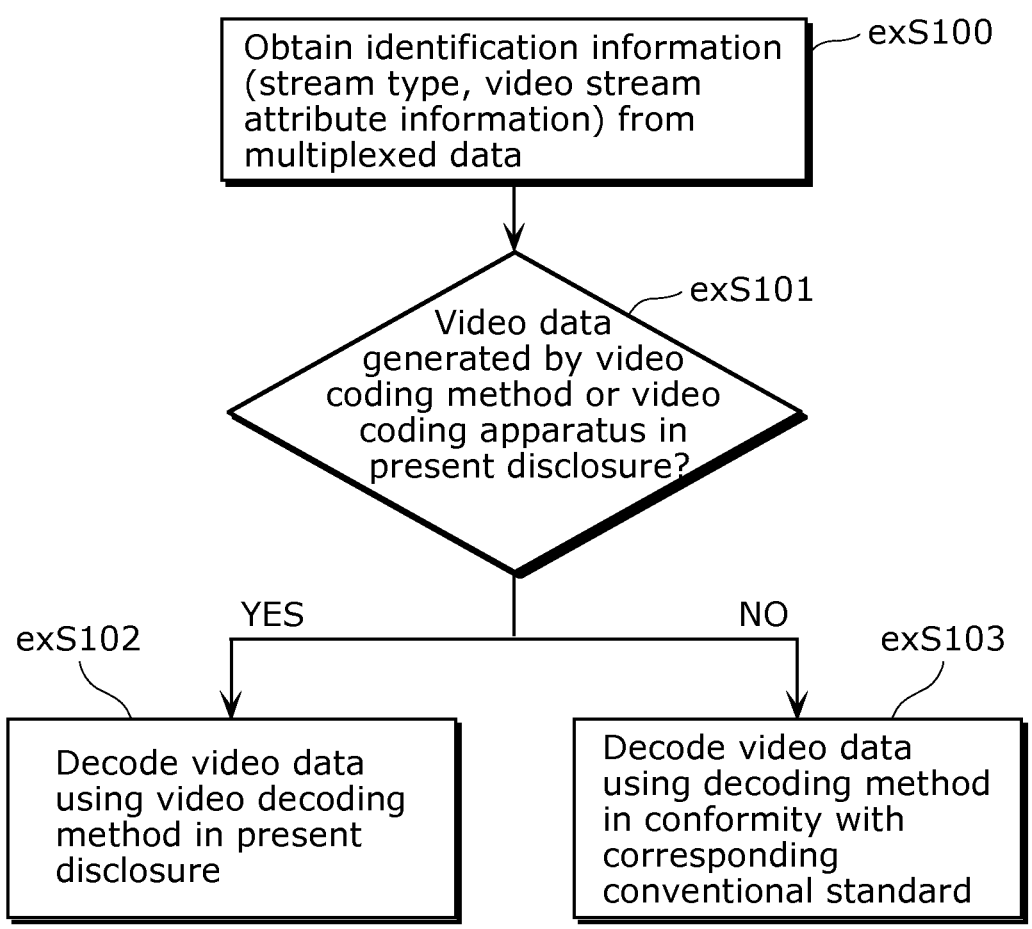
FIG. 42 shows steps for identifying video data.

Furthermore, FIG. 42 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 7

Figure 43:
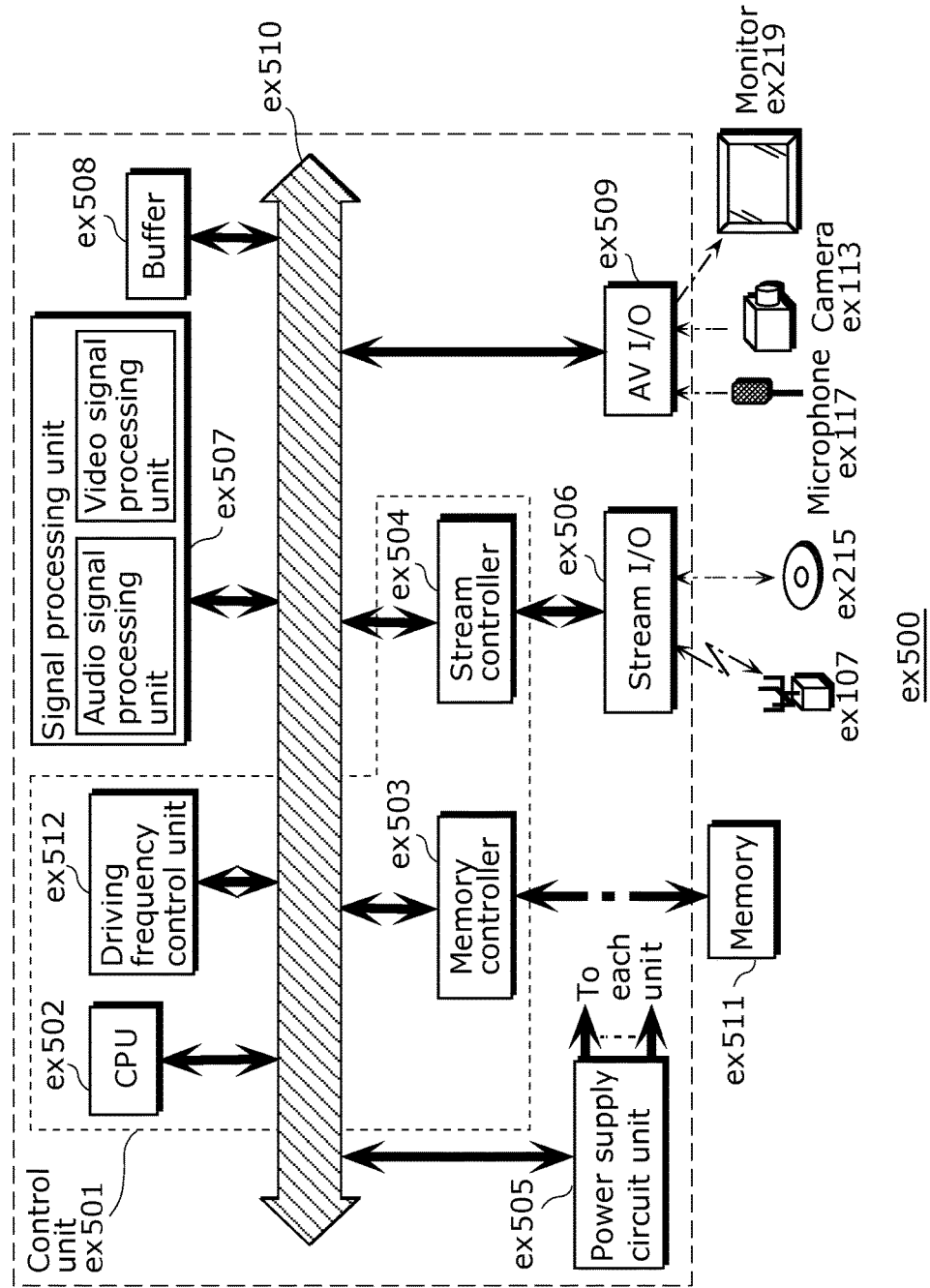
FIG. 43 shows an example of a configuration of an integrated circuit for implementing the video coding method and the video decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 43 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

Such a programmable logic device can typically execute the video coding method or the video decoding method described in the embodiments above, by loading or reading from a memory a program constituting software or firmware.

In the future, with advancement in semiconductor technology, a brand-new technology may replace LSI. The functional blocks can be integrated using such a technology. The possibility is that the present invention is applied to biotechnology.

Embodiment 8

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 44:
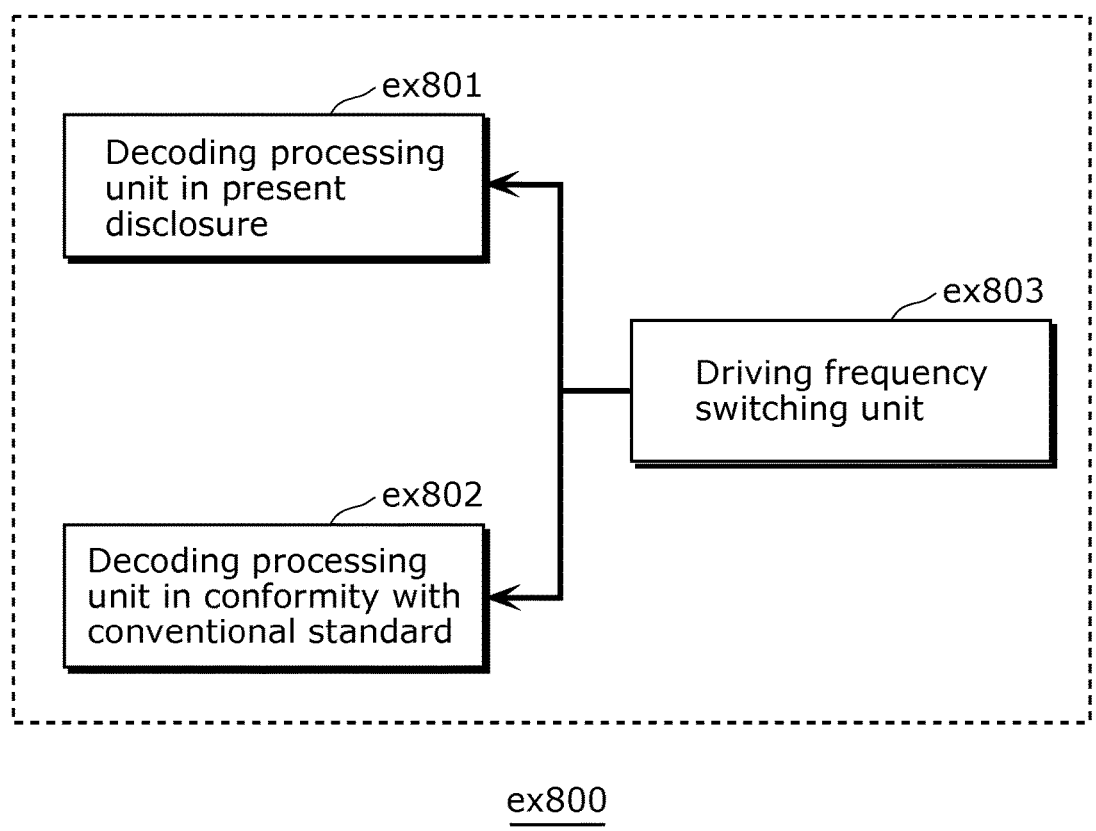
FIG. 44 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 44 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 43. Here, each of the decoding processing unit ex801 that executes the moving picture decoding method described in each of embodiments and the decoding processing unit ex802 that conforms to the conventional standard corresponds to the signal processing unit ex507 in FIG. 43. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 6 is used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 46. The driving frequency can be selected by storing the look-up table in the buffer ex508 and in an internal memory of an LSI, and with reference to the look-up table by the CPU ex502.

Figure 45:
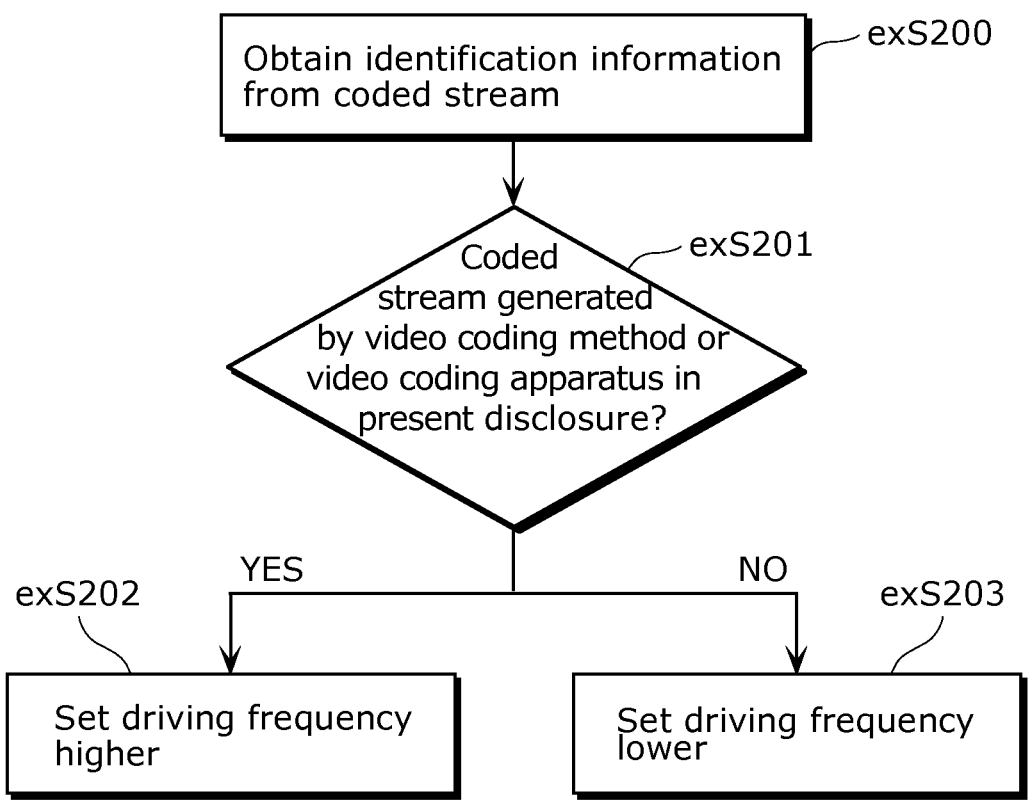
FIG. 45 shows steps for identifying video data and switching between driving frequencies.

FIG. 45 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 47A:
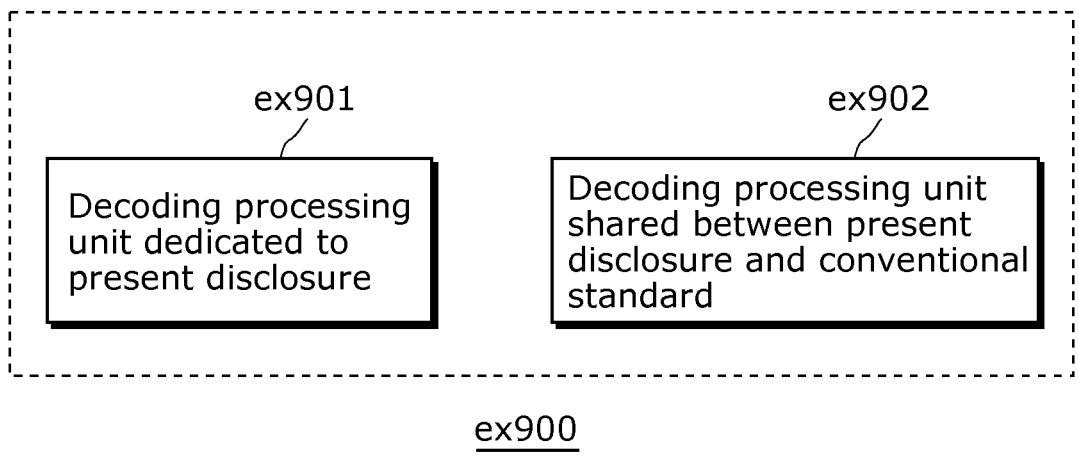
FIG. 47A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 47A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present invention and does not conform to MPEG-4 AVC. The decoding processing unit for implementing the moving picture decoding method described in each of embodiments may be shared for the processing to be shared, and a dedicated decoding processing unit may be used for processing unique to that of MPEG-4 AVC.

Figure 47B:
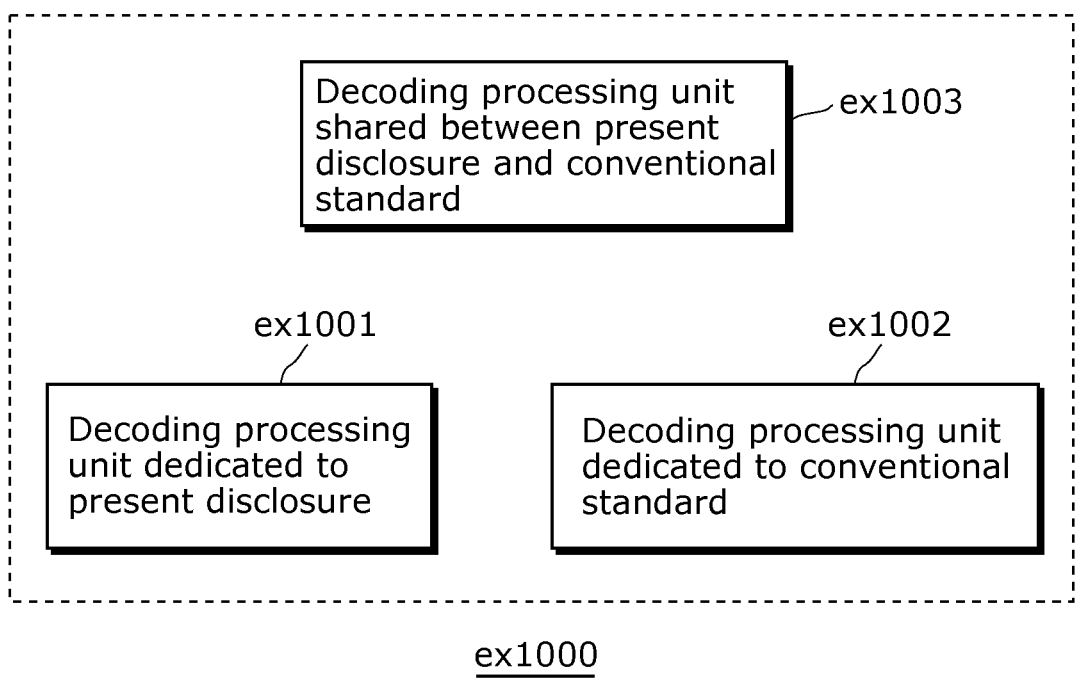
FIG. 47B is a diagram showing another example of a configuration for sharing a module of the signal processing unit.

Furthermore, ex1000 in FIG. 47B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The image coding apparatus and the image decoding apparatus according to an aspect of the present disclosure are applicable to, for example, a television receiver, a digital video recorder, a car navigation, a cellular phone, a digital camera, a digital video camera, and so on.

The invention claimed is:

1. An image decoding method for decoding a bitstream generated when an image is coded, the bitstream including a plurality of coefficient subsets each of which includes a plurality of frequency coefficients as coefficients each of which is coded by using a plurality of parameters, the plurality of parameters including plural related parameters which are parameters usable in determining which one of a plurality of contexts, each referenced in memory by a context number, for arithmetic decoding, and at least one unrelated parameter which is a parameter not used in determining context for arithmetic decoding, the image decoding method comprising:
  determining the context number of the context to be used in arithmetic decoding of a current coefficient to be decoded by calculating: context number=min (average, predetermined value), wherein average is an average of absolute values of a plurality of coefficients neighboring the current coefficient;
  performing arithmetic decoding on a parameter corresponding to the current coefficient, using the context referenced by the determined context number;
  reconstructing the current coefficient as a coefficient value, using the parameter that is arithmetically decoded;
  generating a decoding block by combining the coefficient subsets each including the coefficients which are reconstructed;
  generating a differential image by performing inverse frequency transformation on the decoding block;
  generating a prediction image; and
  generating a decoded image by using the differential image and the prediction image,
  wherein:
  the current coefficient is included in the coefficient subsets included in the bitstream, and in the performing of arithmetic decoding,
  the arithmetic decoding is performed on a related parameter of the current coefficient, for each of the coefficients, the related parameter of the current coefficient being a parameter type of the related parameter used for determining the context number, and
  the arithmetic decoding is performed collectively on the unrelated parameters of the coefficients of each coefficient subset together, wherein the unrelated parameters are of a different type from the related parameter used for determining the context number;
  wherein in the performing of arithmetic decoding, a value of a parameter which indicates whether a predetermined coefficient in the coefficient subset indicates positive or negative is determined depending on whether a sum of coefficient absolute values of all of the coefficients in the coefficient subset is an even number or an odd number; and wherein the plural related parameters include: significant_flag, greater1_flag, greater2_flag, and level_minus3; and the at least one unrelated parameter includes sign_flag.

2. The image decoding method according to claim 1, wherein in the performing of arithmetic decoding, the arithmetic decoding is performed on the related parameters which are related to the absolute values, and the arithmetic decoding is performed collectively on the unrelated parameters indicating whether each of the coefficients is positive or negative.

3. An image decoding apparatus for decoding a bitstream generated by coding an image, the image decoding apparatus comprising a processor and a non-transitory memory having stored thereon a instructions that cause the processor to execute the image decoding method according to claim 1.

4. An image decoding method for decoding a bitstream generated when an image is coded, the bitstream including a plurality of coefficient subsets each of which includes a plurality of frequency coefficients as coefficients each of which is coded by using a plurality of parameters, the plurality of parameters including plural related parameters which are parameters usable in determining which one of a plurality of contexts, each referenced in memory by a context number, for arithmetic decoding, and at least one unrelated parameter which is a parameter not used in determining context for arithmetic decoding, the image decoding method comprising:

deriving a clip value, for each of a plurality of coefficients neighboring a current coefficient to be decoded, by comparing an absolute value of the respective neighboring coefficient with an upper limit, and when the absolute value is greater than the upper limit, storing the upper limit as the clip value, and when the absolute value is smaller than or equal to the upper limit, storing the absolute value as the clip value, and determining the context number of the context to be used in arithmetic decoding of the current coefficient, by calculating: context number=min (average, predetermined value), wherein average is an average clip value of the plurality of coefficients neighboring the current coefficient;

performing arithmetic decoding on a parameter corresponding to the current coefficient, using the context referenced by the determined context number;

reconstructing the current coefficient as a coefficient value, using the parameter that is arithmetically decoded;

generating a decoding block by combining the coefficient subsets each including the coefficients which are reconstructed;

generating a differential image by performing inverse frequency transformation on the decoding block;

generating a prediction image; and generating a decoded image by using the differential image and the prediction image, wherein:

the current coefficient is included in the coefficient subsets included in the bitstream, the arithmetic decoding is performed on a related parameter of the current coefficient, for each of the coefficients, the related parameter of the current coefficient being a parameter type of the related parameter used for determining the context number, and the arithmetic decoding is performed collectively on the unrelated parameters of the coefficients of each coefficient subset together, wherein the unrelated parameters are of a different type from the related parameter used for determining the context number;

wherein in the performing of arithmetic decoding, a value of a parameter which indicates whether a predetermined coefficient in the coefficient subset indicates positive or negative is determined depending on whether a sum of coefficient absolute values of all of the coefficients in the coefficient subset is an even number or an odd number; and wherein the plural related parameters include: significant_flag, greater1_flag, greater2_flag, and level_minus3; and the at least one unrelated parameter includes sign_flag.

* * * * *